United States Patent
Bird

(10) Patent No.: US 12,040,677 B2
(45) Date of Patent: Jul. 16, 2024

(54) ELECTROMAGNETIC CONFIGURATIONS AND ASSEMBLY METHODS FOR A HALBACH ROTOR MAGNETIC GEAR

(71) Applicant: Portland State University, Portland, OR (US)

(72) Inventor: Jonathan Bird, Portland, OR (US)

(73) Assignee: Portland State University, Portland, OR (US)

( * ) Notice: Subject to any disclaimer, the term of this patent is extended or adjusted under 35 U.S.C. 154(b) by 0 days.

(21) Appl. No.: 17/035,471

(22) Filed: Sep. 28, 2020

(65) Prior Publication Data

US 2021/0099069 A1    Apr. 1, 2021

Related U.S. Application Data

(60) Provisional application No. 62/907,409, filed on Sep. 27, 2019.

(51) Int. Cl.
*H02K 49/10*    (2006.01)

(52) U.S. Cl.
CPC .................. *H02K 49/102* (2013.01)

(58) Field of Classification Search
CPC . H02K 7/00; H02K 7/11; H02K 49/00; H02K 49/03; H02K 49/031; H02K 49/10
See application file for complete search history.

(56) References Cited

U.S. PATENT DOCUMENTS

| | | | | |
|---|---|---|---|---|
| 3,334,254 A | * | 8/1967 | Kober | H02K 1/2795 310/156.41 |
| 4,645,961 A | * | 2/1987 | Malsky | H02K 37/14 310/216.115 |
| 4,869,811 A | * | 9/1989 | Wolanski | B03C 1/18 209/636 |

(Continued)

FOREIGN PATENT DOCUMENTS

| | | | | |
|---|---|---|---|---|
| CN | 103023260 | * | 4/2013 | ............. H02K 21/46 |
| CN | 204947863 | * | 1/2016 | ............. H02K 21/46 |

(Continued)

OTHER PUBLICATIONS

Frandsen et al., "Motor Integrated Permanent Magnet Gear in a Battery Electrical Vehicle," IEEE Trans. on Industry Applications, vol. 51, No. 2, pp. 1516-1525 (2015).

(Continued)

*Primary Examiner* — Tran N Nguyen
(74) *Attorney, Agent, or Firm* — Klarquist Sparkman, LLP

(57) ABSTRACT

The disclosure presents configurations and analyses of magnetic gears, which may be used in the second stage of a multistage magnetically geared generator for a marine hydrokinetic generator application and/or other applications as described. In order to reduce field harmonics and maximize the torque density, a Halbach rotor topology is utilized. One feature of the disclosed configuration is a unique magnet arrangement that enables inner and outer Halbach (Continued)

rotor magnets to be more easily assembled, even with dimensional tolerance inaccuracies. The disclosed Halbach magnet rotor topology makes use of the internal magnet forces to retain the magnets in position, and the disclosed configuration also helps with the assembly process.

18 Claims, 44 Drawing Sheets

(56) References Cited

U.S. PATENT DOCUMENTS

| | | | | |
|---|---|---|---|---|
| 5,280,209 | A * | 1/1994 | Leupold | H02K 1/17 |
| | | | | 310/156.55 |
| 5,610,465 | A * | 3/1997 | Sakamoto | H02K 17/165 |
| | | | | 310/211 |
| 7,053,508 | B2 * | 5/2006 | Kusase | H02K 1/278 |
| | | | | 310/156.31 |
| 8,446,054 | B2 * | 5/2013 | Toyota | H02K 41/031 |
| | | | | 310/156.43 |
| 9,559,577 | B2 | 1/2017 | Bird | |
| 9,641,059 | B2 | 5/2017 | Bird | |
| 11,128,209 | B2 | 9/2021 | Bird | |
| 2003/0102764 | A1 * | 6/2003 | Kusase | H02K 1/27 |
| | | | | 310/67 R |
| 2004/0066107 | A1 * | 4/2004 | Gery | H02K 49/106 |
| | | | | 310/114 |
| 2004/0139596 | A1 * | 7/2004 | Hsu | H02K 15/024 |
| | | | | 29/598 |
| 2010/0181858 | A1 * | 7/2010 | Hibbs | H02K 1/27 |
| | | | | 310/156.07 |
| 2014/0210291 | A1 * | 7/2014 | Bird | H02K 49/102 |
| | | | | 310/103 |
| 2015/0180291 | A1 * | 6/2015 | Senoo | H02K 15/03 |
| | | | | 29/598 |
| 2021/0054897 | A1 | 2/2021 | Bird | |
| 2021/0057977 | A1 | 2/2021 | Bird et al. | |

FOREIGN PATENT DOCUMENTS

| | | | | |
|---|---|---|---|---|
| JP | 2878860 | B2 * | 4/1999 | |
| JP | 2005051979 | | * 2/2005 | H02K 21/46 |

OTHER PUBLICATIONS

Baninajar et al., "Electromagnetic and Mechanical Design of a Hermetically Sealed Magnetic Gear for a Marine Hydrokinetic Generator," IEEE Energy Conversion Congress and Exposition, pp. 4987-4993 (2018).

Agenbach et al., "Force and Vibration Analysis of Magnetic Gears," XIII Intern. Conf. Elect. Mach. (ICEM), pp. 752-758 (2018).

Li et al., "Designing and Experimentally Testing a Magnetic Gearbox for a Wind Turbine Demonstrator," IEEE Trans. on Industry Applications, vol. 55, No. 4, pp. 3522-3533 (2019).

Atallah et al., "A Novel Pseudo Direct-Drive Brushless Permanent Magnet Machine," IEEE Trans. on Magnetics, vol. 44, No. 11, pp. 4349-4352 (2008).

* cited by examiner (a)

(b)

(a)

(b)

(a)

(b)

(a)

(b)

(a)

(b)

(a)

(b)

Mechanical angle on low speed rotor [degrees]

Time [s]

Mechanical angle on low speed rotor [degrees]

Time [s]

(A)

(B)

(a)

(b)

(a)  (b)

ELECTROMAGNETIC CONFIGURATIONS AND ASSEMBLY METHODS FOR A HALBACH ROTOR MAGNETIC GEAR

CROSS-REFERENCE TO RELATED APPLICATIONS

This application claims the benefit of U.S. Provisional Application No. 62/907,409 filed Sep. 27, 2019, and entitled "Electromagnetic Configurations and Assembly Methods for a Halbach Rotor Magnetic Gear," which is herein incorporated by reference in its entirety.

ACKNOWLEDGMENT OF GOVERNMENT SUPPORT

This invention was made with government support under Grant/Contract number DE-EE0008100 awarded by The United States Department of Energy's (DOE's) Office of Energy Efficiency and Renewable Energy (EERE) and under Grant/Contract number 1827801 awarded by The National Science Foundation (NSF). The government has certain rights in the invention.

FIELD

This application relates to a magnetic gear for a Halbach rotor and related systems in which the magnetic gear may be deployed.

BACKGROUND

Rotary based ocean power generation systems must be able to operate at low input speeds and very high torques. Due to the high torque density of a mechanical gearbox, such gearboxes are often considered for use in marine hydrokinetic generators. However, the performance characteristics of these mechanical gearboxes have reached a plateau and design engineers are increasingly evaluating other technologies to improve their reliability, eliminate lubricants, reduce acoustic emissions, and decrease their size compared to direct-drive alternatives. The use of a coaxial magnetic gear (MG) could potentially offer many of these improvements. A coaxial MG uses a contactless mechanism for speed amplification. There are a range of different MG rotor typologies that have been proposed the most studied is the coaxial typology. An example of a Halbach rotor coaxial MG configuration 100 is shown in FIG. 1. The rotor includes an inner rotor 102, with $p_4$ pole-pair rotating at $\omega_4$, a central cage rotor 104 with $n_5$ ferromagnetic slots rotating at $\omega_5$, and an outer rotor 106 with $p_6$ pole-pair that can rotate at $\omega_6$. The configuration also includes an inner rotor back-iron 108, for supporting magnets of the inner rotor 102, and outer rotor laminations 110, for supporting magnets of the outer rotor 106. In this disclosure, magnetic pole directionality is represented via arrows within each illustrated magnet (e.g., where the arrow of each magnet represents a magnetic domain alignment and points to a respective north magnetic pole of that magnet). In order to create field coupling and maximize torque the following condition must be met:

$$n_5 = p_4 + p_6. \quad (1)$$

The rotational speed relationship between the rotors is then:

$$\omega_4 = G_{45}\omega_5 - (G_{45}-1)\omega_6. \quad (2)$$

where $G_{45} = n_5/p_4$ is the gear ratio. If the outer rotor 106 is held fixed, $\omega_6 = 0$, the torque and gear ratio are both maximized.

In 2001, Atallah et al. calculated that a torque density of up to 100N·m/L is achievable when using a surface mounted permanent magnet coaxial MG. More recently a flux-focusing coaxial MG typology was presented by Uppalapati et al. that achieved an experimentally tested torque density of 239N·m/L. Whilst using a flux-focusing rotor typology can increase the airgap field more than using a surface mounted design it also creates a relatively large 3rd and 5th order field harmonic, and this therefore generates a significant amount of loss within the MG structure thereby degrading performance. In contrast, the Halbach rotor structures are well-known for creating a highly sinusoidal field distributions. In 2009, Jian et al. first studied the torque density and torque ripple performance of a Halbach rotor MG design. Jian's design had a 1:4.25 gear ratio and a measured torque density of 108 N·m/L. Jian concluded that using a Halbach rotor provides both a near-sinusoidal field and increased torque. Other researchers have also recently built Halbach rotor MGs. For example, in 2019, Wong et al. tested a Halbach rotor MG and experimentally demonstrated a torque density of 261.4N·m/L. Whilst Cameron et al. tested a Halbach MG for a NASA electric aircraft application that attained a torque density of 161.2 N·m/L and 45 N·m/kg. Wong's design used Halbach magnets that were all the same geometric shape, doing so can make the assembly more challenging. Whilst Cameron used insert slots between each magnet to hold the magnets in place. This helped with assembly but degrades the torque performance.

SUMMARY

In this disclosure a different type of Halbach rotor typology is presented that takes into account tolerance inaccuracies. The presented configuration also makes use of the radial magnet forces created by the tangentially magnetized magnets in order to assist with the magnet retaining structure and assembly process. The magnetic gear (MG) examples presented in this disclosure may be used in a multistage marine hydrokinetic generator demonstrator and/or other applications, such as other ocean energy generation devices, wind energy generation devices, factory/manufacturing devices, robotics, etc. Before presenting the improved Halbach rotor structures a 2-D and 3-D finite element analysis (FEA) parametric design analysis is conducted.

An example magnetic gear includes an inner rotor formed of a first group of opposing pairs of radially-magnetic magnets and a second group of opposing pairs of tangentially-magnetic magnets arranged sequentially around an outer circumference of an inner support structure, an outer rotor axially aligned with the inner rotor and formed of a third group of opposing pairs of radially-magnetic magnets and a fourth group of opposing pairs of tangentially-magnetic magnets arranged sequentially around an inner circumference of an outer support structure, and a cage axially aligned with the inner rotor and the outer rotor and positioned between the inner rotor and the outer rotor, where the magnets in the first group of magnets and third group of magnets have a longer radial length than the magnets in the second group of magnets and fourth group of magnets, respectively, and where the tangentially-magnetic magnets in the second and fourth groups increase in width along a respective radial length in a direction extending away from the respective inner and outer support structures.

The foregoing and other objects, features, and advantages of the invention will become more apparent from the following detailed description, which proceeds with reference to the accompanying figures.

DETAILED DESCRIPTION

Figure 1:
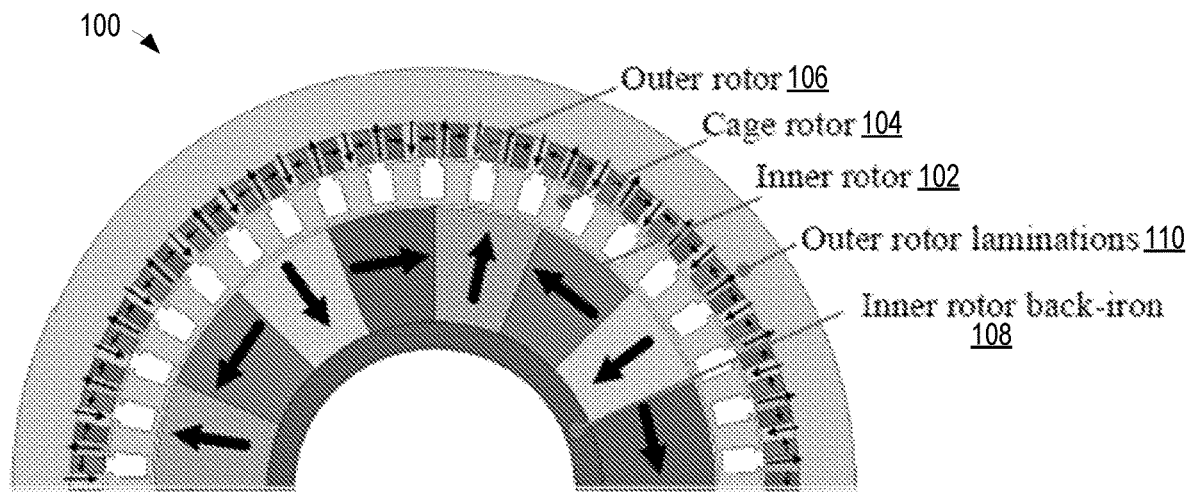
FIG. 1 shows a half cut-away view of an example Halbach rotor coaxial magnetic gear.

As used in this application, the singular forms "a," "an," and "the" include the plural forms unless the context clearly dictates otherwise. Additionally, the term "includes" means "comprises." Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

The disclosure describes configurations for a magnetic gear (MG), which may be used in any of a number of applications, such as magnetically geared generators for wind generation applications, ocean/wave generation applications, industrial and other robotic applications, and/or other applications. The magnetic gear described herein may include coaxially-mounted inner and outer rotors formed of radially-magnetic magnets and tangentially-magnetic magnets, which have a shorter radial length and a wider angular width than the radially-magnetic magnets. Some configurations of the magnetic gear may include a bridgeless cage rotor positioned between the inner and outer rotors. The disclosure also includes a method of assembling a magnetic gear by inserting the radially-magnetic magnets of the inner and outer rotors into grooves of a respective support structure before inserting the tangentially-magnetic magnets between adjacent radially-magnetic magnets of the respective rotor. The magnetic gear configurations and assembly methods described herein may increase a durability and performance (e.g., torque) of the magnetic gear while decreasing assembly difficulty and manufacturing costs relative to other magnetic gear configurations and assembly methods.

Components of the magnetic gear examples described herein may be composed of different materials to contribute to the operation and structural integrity of the magnetic gear. For example, as described above, magnetic gears may include an inner rotor and an outer rotor, each comprising a plurality of magnets disposed on a respective support structure, and a cage rotor comprising a cage structure and a plurality of non-conductive, non-magnetic elements disposed within the cage structure. Example materials for each of the magnets of the inner and outer rotor may include any suitable magnetic material that produces the magnetic field and has the polarity (e.g., tangentially-directed or radially-directed) described for an associated one of the magnets. The inner and outer rotor support structures may include the same or similar material, or may be composed of different materials. Example materials for the non-conductive, non-magnetic elements disposed in gaps of the cage rotor structure include any suitable non-conductive element, such as Garolite bars.

Figure 2:
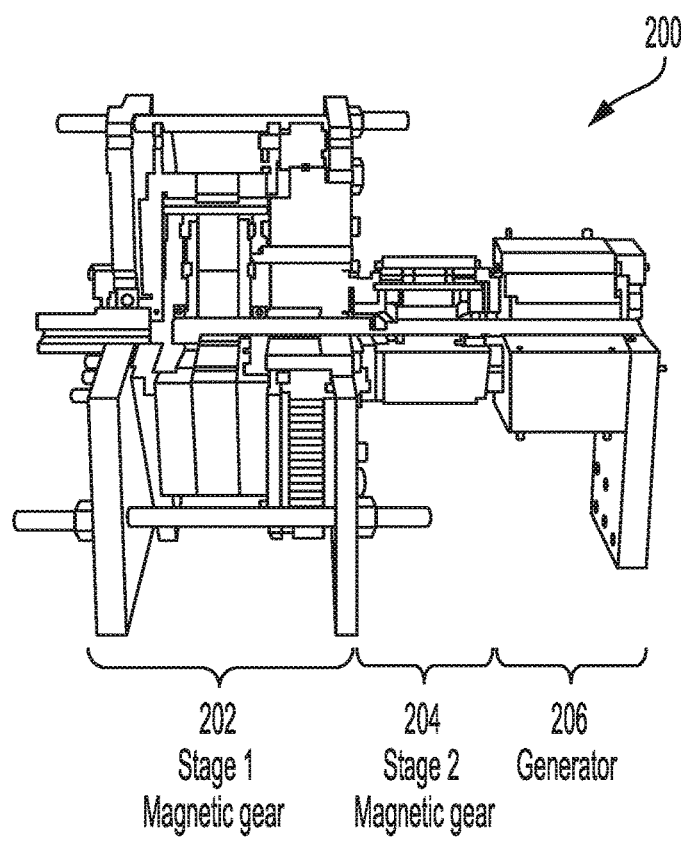
FIG. 2 shows a cut-away view of an example multistage magnetically geared generator.

As described above, a magnetic gear may be included in a generator for various applications. A cut-away view of an example complete 5 kW multistage magnetically geared generator 200 is shown in FIG. 2. As shown, the generator includes a dual-stage MG (e.g., stage 1 magnetic gear 202 and stage 2 magnetic gear 204) in series with a permanent magnet generator 206. A dual stage series connected typology rather than a nested magnetically geared generator typology was selected as it provides greater modularity and traditional, well designed, high-speed off-the-shelf generators can be used in conjunction with the MGs. Furthermore, the nesting of multiple rotating rotors creates significant mechanical construction challenges. The marine hydrokinetic (MHK) generator configuration specifications for the stage 1 and stage 2 MG are stated in Table 1 below. This disclosure focuses on meeting the stage 2 MG configuration specifications.

TABLE 1

| Configuration Specifications | | | |
|---|---|---|---|
| | Specification | Value | Unit |
| Stage 1 | Input speed, $\omega_3$ | ≤40 | RPM |
| | Rated power | 5 | kW |
| | Input torque, $T_3$ | ≥1193 | N·m |
| | Gear ratio, $G_{13} = p_3/p_1$ | 6.66 | — |
| Stage 2 | Output speed, $\omega_3$ | 2000 | RPM |
| | Efficiency | ≥93 | % |
| | Torque ripple | ≤3 | % |
| | Input rotor torque, $T_5$ | ≥180 | N·m |

TABLE 1-continued

| Configuration Specifications | | |
|---|---|---|
| Specification | Value | Unit |
| Output rotor torque, $T_4$ | ≥19 | N·m |
| Gear ratio, $G_r$ | ≥50 | — |

In an example MG typological study, the pole combination of $(p_4, n_5, p_6)=(4, 38, 34)$ was selected which gives a gear ratio of $G_{45}=n_5/p_4=9.5$. This pole-slot combination is a multiple of the base pole combination (2, 19, 17) in which two of the three pole combinations are prime numbers. As the magnetic rotors only create large odd harmonic terms multiplying the base pole combination by a factor of 2 should not create additional torque ripple harmonics. This pole combination was selected rather than its base pole combination as the cage rotor includes an even number of slots which prevents an unbalanced radial force from being exerted on the bearings. The total gear ratio for the multi-stage MG is $G_r=G_{13}G_{45}=63.3$, which satisfies the configuration specification.

In order to account for discrepancies between the finite element analysis (FEA) model and the actual constructed prototype a design safety factor of $k_s=1.2$ is being used, where $$T_5^{3D} \geq (k_s)T_5. \quad (3)$$

The specified configuration torque then increases to 216 N·m. In addition, to reduce the computational burden, the stage 2 configuration analysis is initially conducted using 2-D FEA. However, due to axial edge effects the 2-D FEA models overestimate the actual torque values. Therefore, in the following analysis an edge-effect factor, $k_d=0.85$ is used. This results in the specified 2-D FEA calculated torque being $$T_5^{2D} \geq T_5^{3D}/k_d. \quad (4)$$

The specified 2-D FEA configuration torque is then $T_5^{2D} \geq 255$ N·m.

Figure 3:
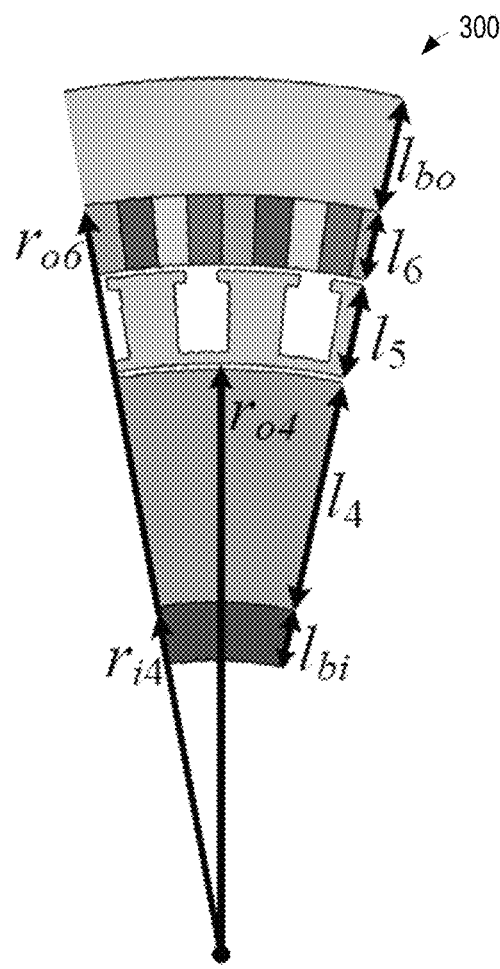
FIG. 3 shows a detailed view of a portion of an example Halbach rotor coaxial magnetic gear and associated geometric parameter definitions.

The radial geometric parameters used in the MG analysis are defined as shown in the portion cut-away view of the magnetic gear 300 of FIG. 3, where the inner rotor length $l_4$ is:

$$l_4 = r_{o4} - r_{i4} \quad (5)$$

and the cage bar length $l_5$ is defined as:

$$l_5 = r_{o5} - r_{i5}. \quad (6)$$

The outer rotor length, $l_6$, is related to equations (5) and (6) by:

$$l_6 = r_{o6} - (r_{i4} + l_4 + l_5 + 2g). \quad (7)$$

The airgap length g between rotor is fixed at g=0.5 mm and the inner rotor back-iron thickness $l_{bi}$ and outer rotor lamination radial thickness $l_{bo}$ are set to $l_{bi}=5$ mm and $l_{bo}=10$ mm, respectively. The angular spans of the magnets and cage rotor modulator slots are kept equal. The identification of the geometric parameters illustrated in FIG. 3 may be applied to similar views of magnetic gears, such as magnetic gears 700c-700e of FIG. 7 (described in more detail below).

Figure 4:
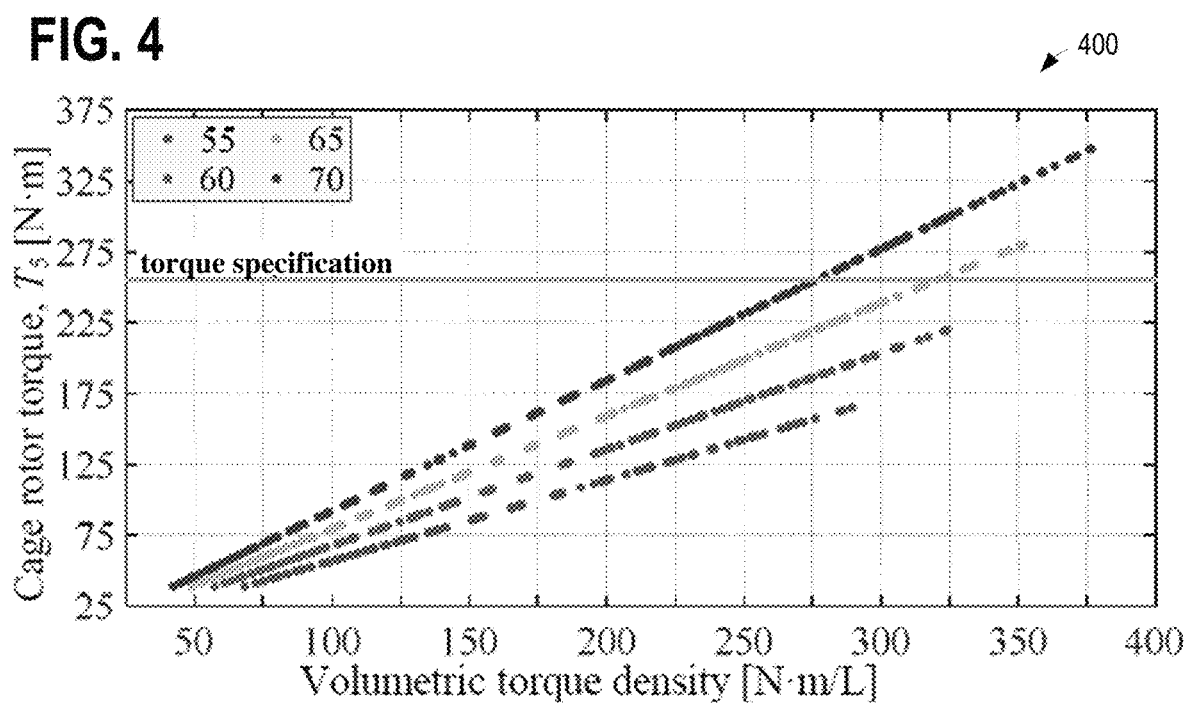
FIG. 4 is an example plot of torque versus volumetric torque density for different outer radius values for a magnetic gear.

The geometric parameters were initially swept across the range of 2-D values specified in Table 2 below. For each geometric configuration, the volumetric torque density was calculated using:

$$T_v = T_5^{2D}/(\pi r_{o6}^2 d). \quad (8)$$

where d=axial width. FIG. 4 shows a plot 400 of the simulation results where the legend specifies the different outer radius, $r_{o6}$, values. It can be seen that the torque density is highest for the largest radius configuration. The $r_{o6}$=65 mm design has the smallest simulated radius that meets the torque specification.

TABLE 2

Configuration Sweep Parameters

| Description | Sweep values [mm] |
|---|---|
| Inner radius, $r_{i4}$ | 15 |
| Inner rotor radial length, $l_4$ | [10, 11, . . . , $r_{o6}$ − $l_5$ − 17] |
| Cage bar length, $l_5$ | [8, 9, 10, 11, 12] |
| Outer radius, $r_{o6}$ | [55, 60, 65, 70] |
| Axial length, d | 60 |

Figure 5:
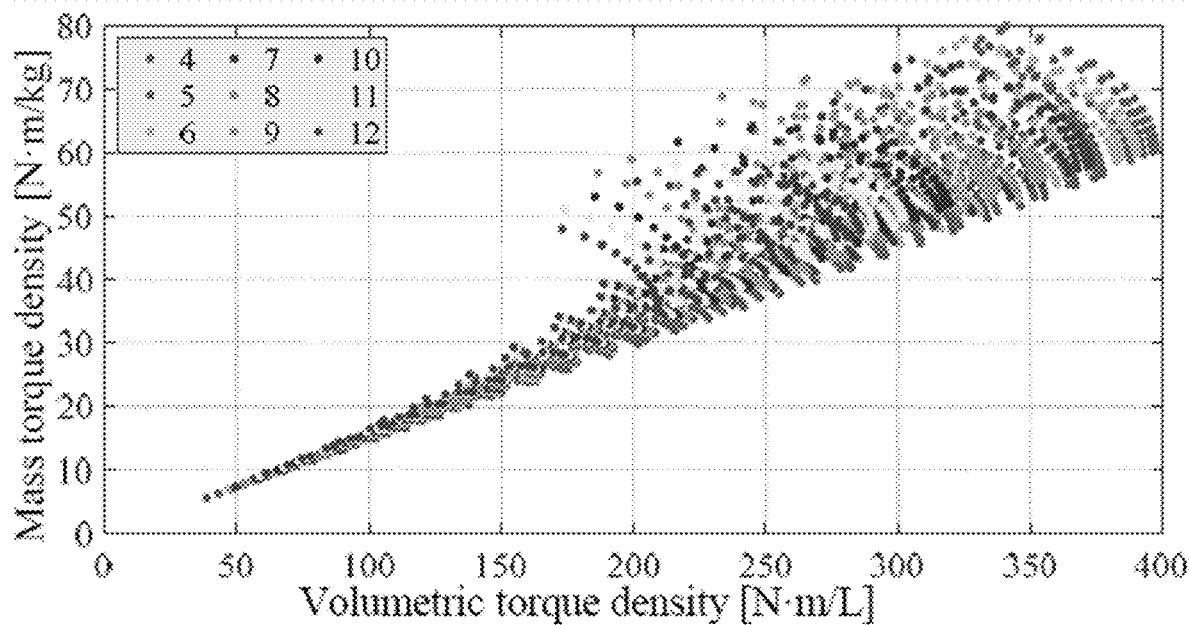
FIG. 5 is an example plot of mass torque density versus volumetric torque density for a selected outer radius value for a magnetic gear when cage bar length and inner rotor length of the magnetic gear are varied.
Figure 6:
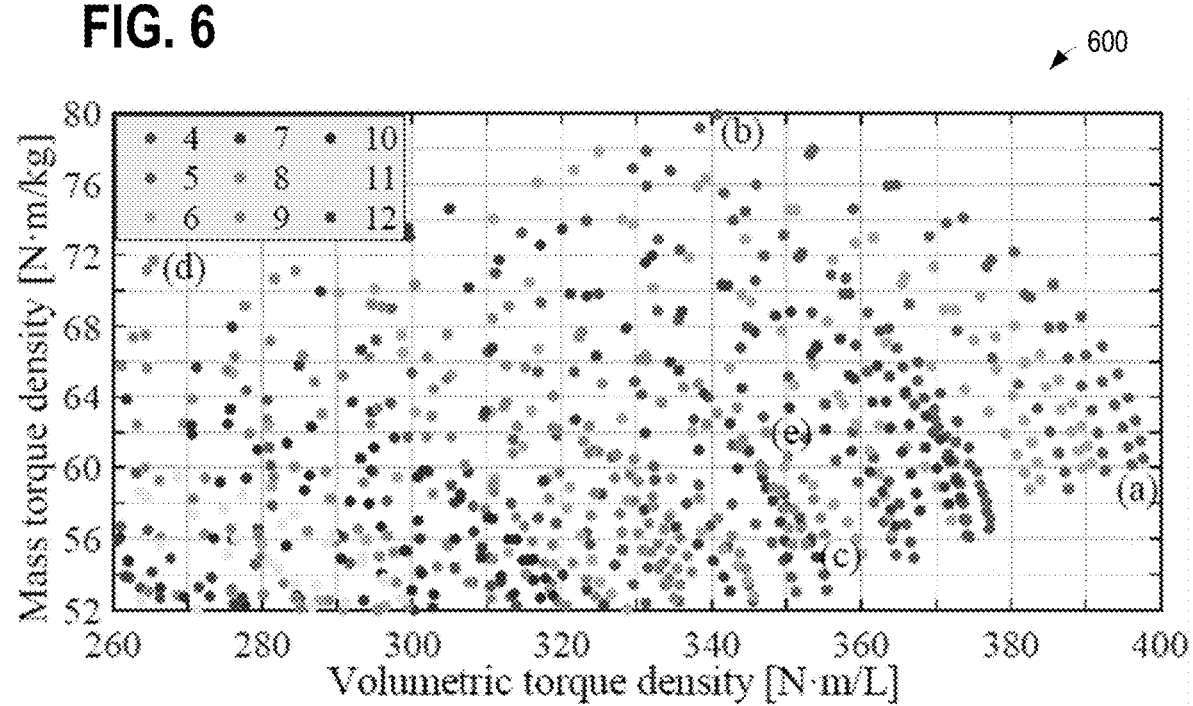
FIG. 6 is a detailed view of a portion of the plot of FIG. 5.
Figure 7:
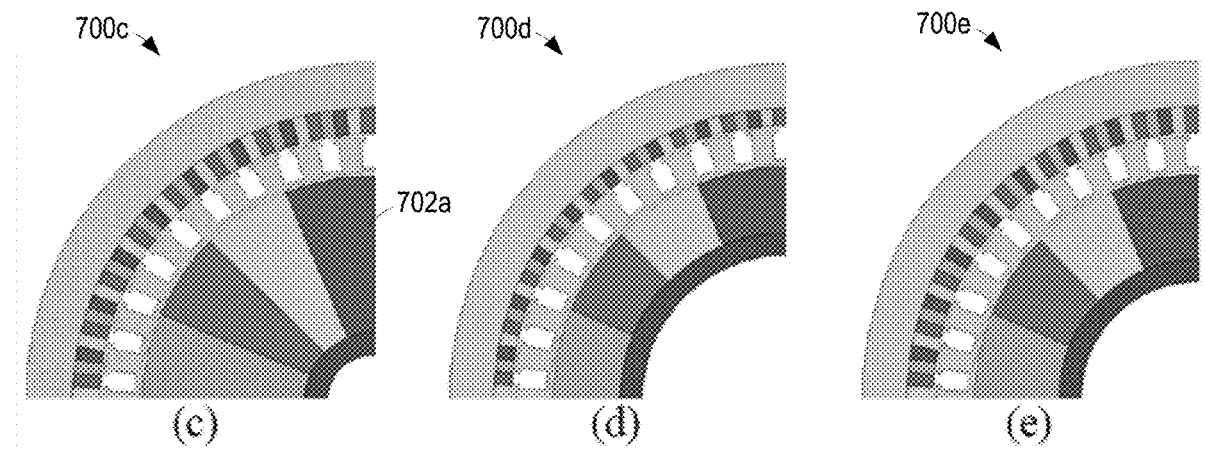
FIG. 7 is a quarter cut-away view of different example configurations of magnetic gears.

The inner radius of the inner rotor, $r_{i4}$, was intentionally kept small as this will then yield the configuration with the highest volumetric torque density for a given outer radii. To understand how the mass torque density changes with geometric parameters a further sweep analysis was then conducted when $r_{o6}$=65 and the cage bar length was swept between $l_5$=[4, 12] mm with 1 mm increments and the inner radius was swept across the parameter range $r_{i4}$=[15,43] mm with 2 mm increments. The active material mass torque density was calculated using $$T_m = T_5^{2D}/(m_s + m_m), \quad (9)$$

where $m_s$=ferromagnetic steel mass and $m_m$=magnet material mass. The analysis results are shown in plot 500 of FIG. 5. The legend shows the cage bar lengths, $l_5$. FIG. 6 shows a plot 600 that provides a zoomed in view near the Pareto front. The configurations that achieve the highest volumetric and mass torque density have a cage bar length of is $l_5$=5 mm and are marked as (a) and (b) respectively in FIG. 6. Using a is $l_5$=5 mm cage bar length will cause mechanical deflection concerns and therefore it was decided to utilize a cage bar length of is $l_5$=8 mm. The configurations that attain the highest volumetric and mass torque density when is $l_5$=8 mm are marked as (c) and (d) in FIG. 6. However, the configuration (e) was selected for further study as this configuration achieved close to the peak volumetric torque density whilst also achieving a high mass torque density. The geometric and performance values for each are summarized in Table 3 below and the geometric appearance for each of the configuration options is shown in FIG. 7. It can be visually seen how the inner rotor inner radius, $r_{i4}$, impacts the magnet mass quantity. For example, volumetric configuration (c), a quarter cut-away view of which is shown at 700c, has a shortest inner rotor inner radius (e.g., distance from the center of the rotor to the innermost edge of the magnets 702a of the inner rotor, as defined in FIG. 3) and a correspondingly highest peak torque and volumetric torque density and lowest mass torque density (as shown in Table 3 below). Mass configuration (d), a quarter cut-away view of which is shown at 700d, has a longest inner rotor inner radius and a correspondingly smallest peak torque and volumetric torque density and highest mass torque density (as shown in Table 3 below). Balanced configuration (e), a quarter cut-away view of which is shown at 700e, has a moderately large inner rotor radius, which increases the mass torque density of the configuration in relation to configuration (d) while also maintaining a larger peak torque and volumetric torque density relative to configuration (e) (as shown in Table 3 below).

TABLE 3

Configuration Choices When $R_{o6}$ = 65 mm

| | Maximum Torque Density | | | |
|---|---|---|---|---|
| Parameter | Volumetric (c) | Mass (d) | Balanced (e) | Unit |
| Inner rotor inner radius, $r_{i4}$ | 15 | 37 | 30 | mm |
| Inner rotor outer radius, $r_{o4}$ | 50 | 52 | 50 | mm |
| Cage rotor radial length, $l_5$ | 8 | 8 | 8 | mm |
| Inner radius of outer rotor, $r_{i6}$ | 59 | 61 | 59 | mm |
| Peak torque, $T_5$ | 282.8 | 211.3 | 277.9 | N · m |
| Volumetric torque density | 355.2 | 265.4 | 348.9 | N · m/L |
| Mass torque density | 56.2 | 71.7 | 62.1 | N · m/kg |

Figure 8:
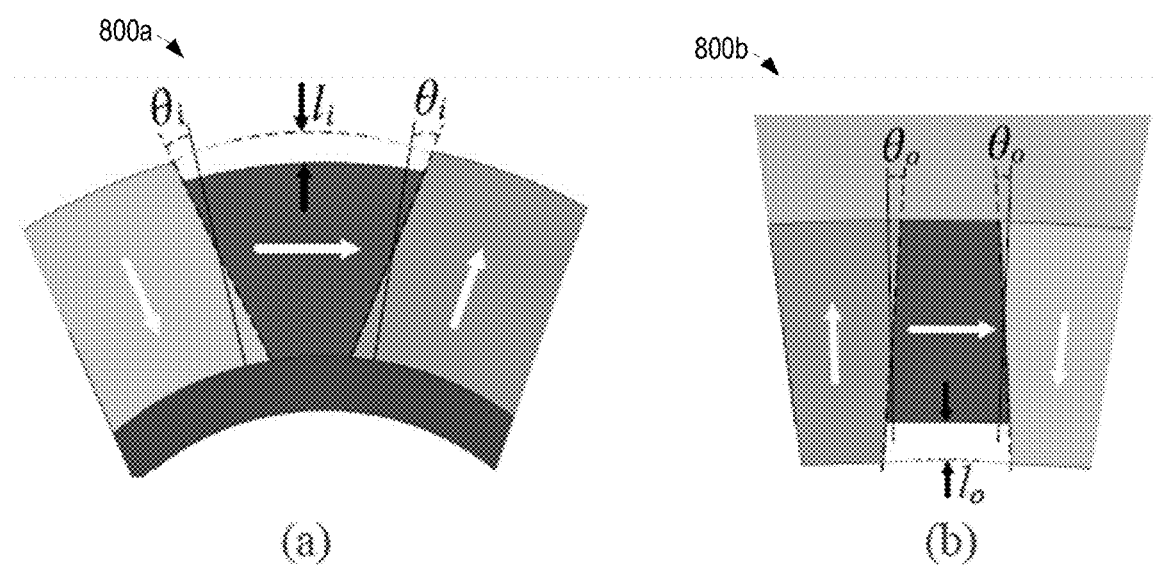
FIG. 8 shows detailed views of example inner rotor magnet geometric parameters and outer rotor magnet geometric parameters.

In order to construct the Halbach MG, the magnets ideally fit precisely together (e.g., to prevent magnet movement after assembly); this is challenging to achieve for a Halbach rotor assembly due to the tolerance inaccuracies. Therefore, a parameter analysis was conducted on configuration (e) with respect to re-shaping the tangentially magnetized magnets angle and the radial length for the inner and outer rotor magnets. The parameters under study in one example are defined as shown in a partial cut-away view of an inner rotor 800a and a partial view of a outer rotor 800b of FIG. 8, where the radial inner and outer rotor magnet insert length (e.g., radial length) is defined as $l_i$ and $l_o$, respectively, and the inner and outer rotor angular span is defined as $\theta_i$ and $\theta_o$, respectively. The angular offset is referenced to the center of the magnet.

Figure 9:
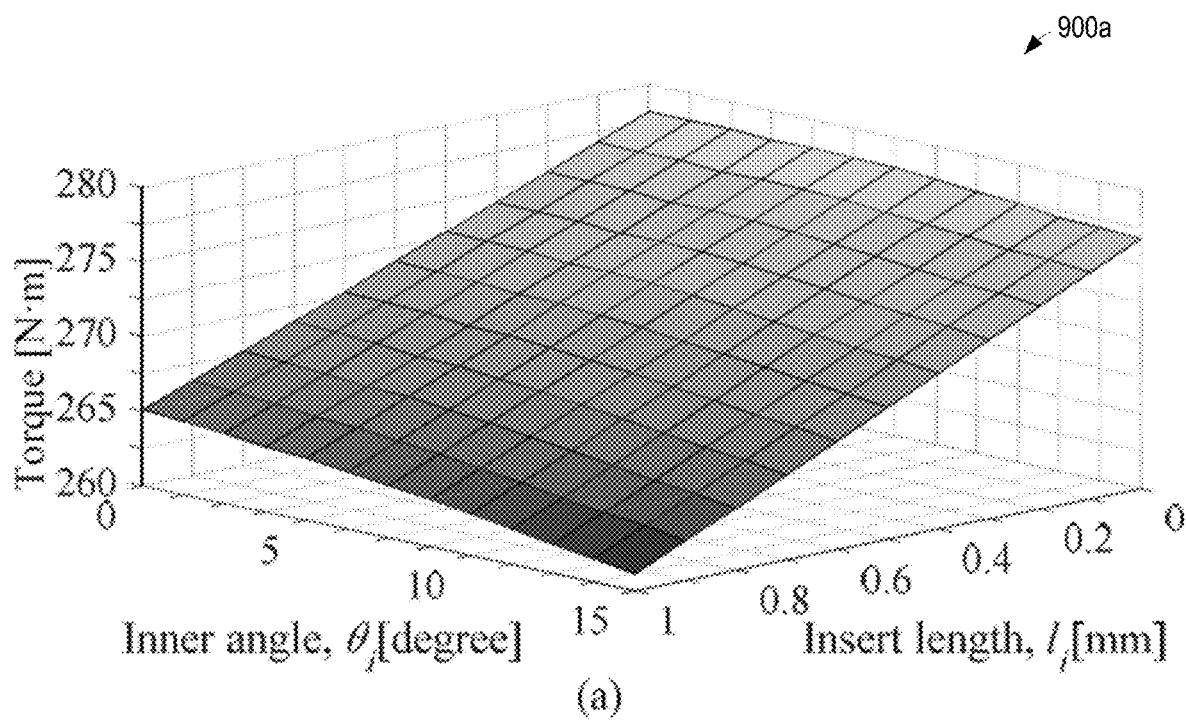
FIG. 9 shows example plots of 2-D calculated torque with varying tangential magnet insert length and angle for inner and outer rotors, respectively, of a magnetic gear.
Figure 9:
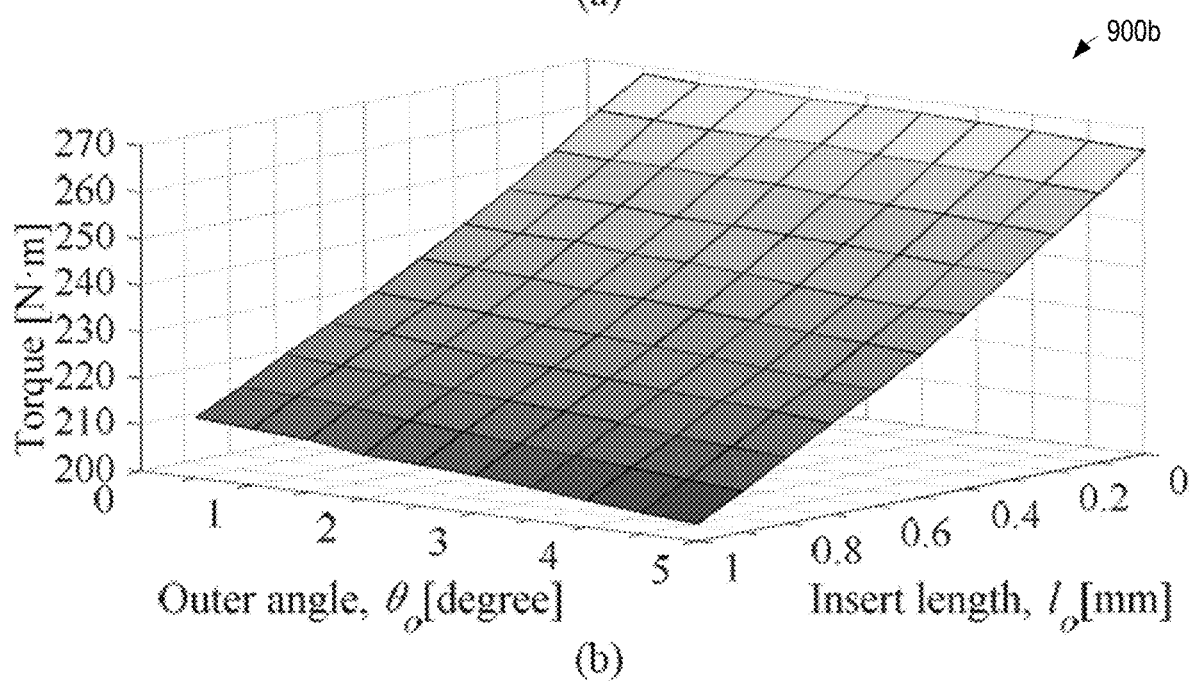
Figure 10:
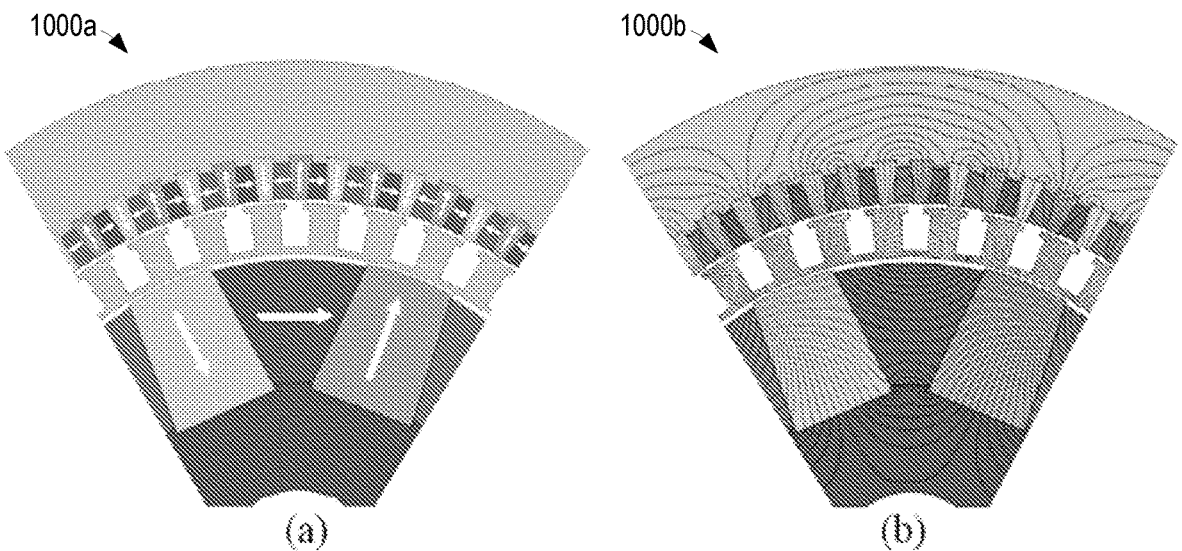
FIG. 10 shows cut-away views of a portion of an example Halbach rotor coaxial magnetic gear including indications of magnetic properties and field lines.

If the radial length of the tangentially magnetized magnets is made slightly smaller than the length of the radially magnetized magnets, then when this is combined with having an angled magnet size (e.g., where the magnets change width along an associated radial length) it will allow the magnets to fit into place without any airgaps between the magnets. This will then maximize torque. FIG. 9 shows plots 900a and 900b of the FEA simulation results for the inner and outer rotors, respectively. It can be noted that the magnet angle does not significantly impact the torque, however, changing the insert length does (e.g., increasing insert length causes the torque to decrease). With this in mind the inner and outer rotor tangential magnets were selected to have the values ($l_i$, $\theta_i$)=(0.5, 15) and ($l_o$, $\theta_o$)=(0.2, 5) respectively. The insert lengths were selected based on magnet tolerance requirements. In this way, the plots 900a and 900b may be used to select an inner angle and insert length for magnets of the inner rotor and outer angle and insert length for magnets of the outer rotor to meet conditions of a magnetic gear based on the illustrated relationship between insert length, magnet angle, and torque (e.g., based on operating conditions/torque requirements, manufacturing resources/tolerance robustness, etc.). After this configuration change the MG rotor structure took the form as shown in quarter cut-away views of a magnetic gear 1000a and 1000b in FIG. 10. To create the radial length difference each radial magnet was placed within a groove on the inner and outer back iron. The grooves help prevent the radial magnets from moving radially outwards which is important during the assembly. The grooves also act as an auxiliary glue bonding retainer and help with positioning the magnets during assembly. With these changes and with $(l_{bo}, l_{bi})=(15, 17.3)$ mm the 2-D FEA calculated torque and torque density reduced to $T_s^{2D}=257.9$ N·m and $T_v=314.1$ N·m/L, respectively. This still easily meets the design criteria. The back-iron thickness, $l_{bo}$, was increased so as to provide sufficient mechanical mounting support.

Figure 11:
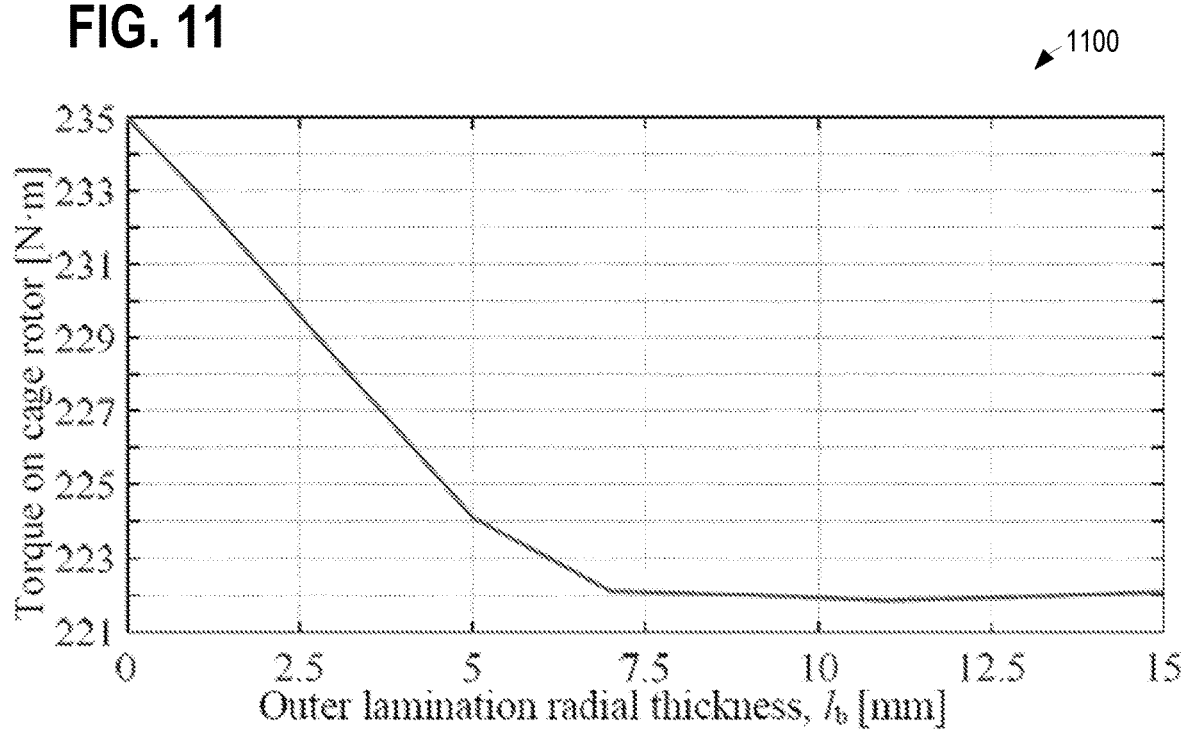
FIG. 11 is an example plot of calculated cage rotor torque versus outer back-iron radial thickness for a magnetic gear using 3-D finite element analysis (FEA).
Figure 12:
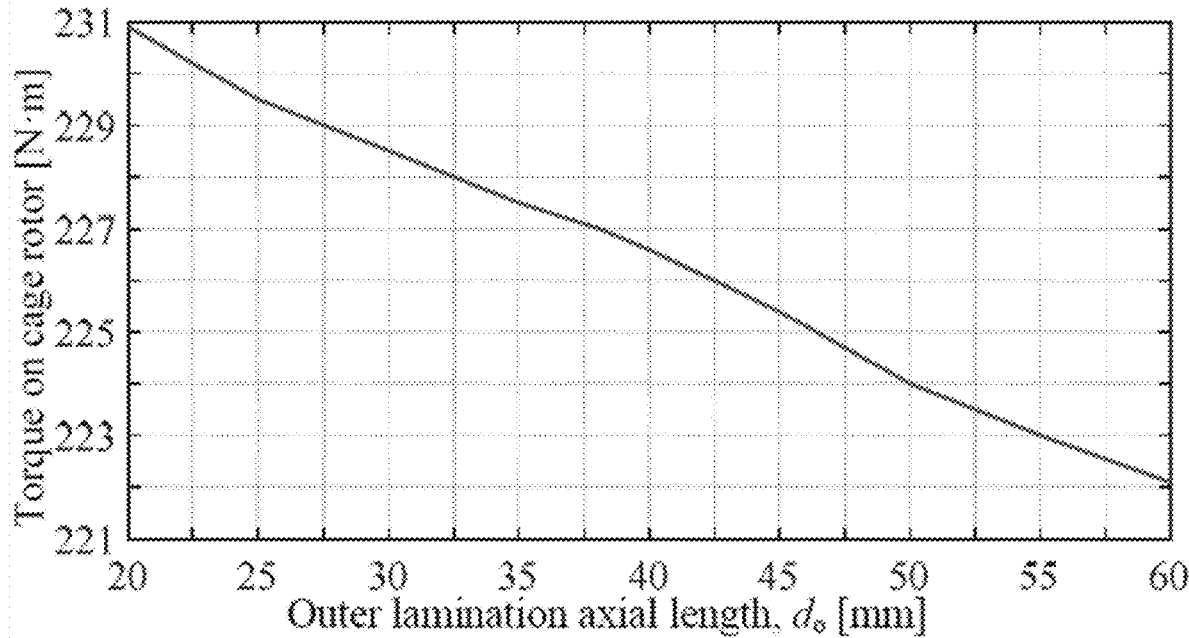
FIG. 12 is an example plot of cage rotor torque versus outer back-iron axial length for a magnetic gear using 3-D FEA at a selected outer back-iron radial thickness.
Figure 13:
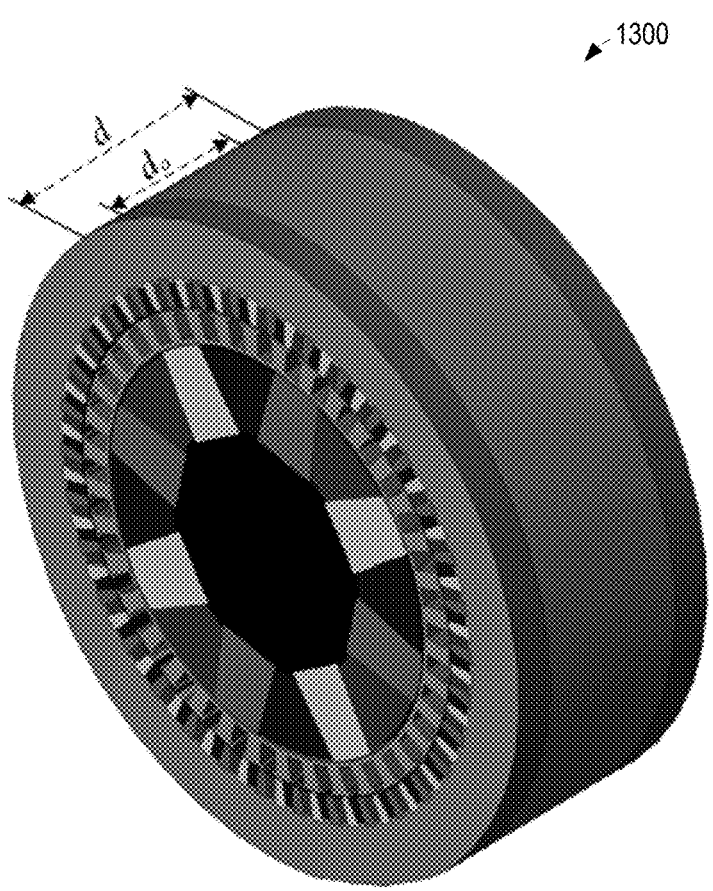
FIG. 13 shows a 3-D view of a configuration for a magnetic gear.

Due to the small magnet flux path on the outer rotor the use of outer rotor laminations does have a marked impact on torque. However, the use of ferromagnetic material behind the inner rotor magnets only negligibly impacts torque. As the outer rotor laminations greatly assists with the assembly process an analysis was conducted to try to ameliorate the torque reduction impact of using outer rotor laminations. Both the lamination length, $l_{bo}$, and axial width, $d_o$, were varied whilst keeping the other parameters fixed. The analysis results are shown in plot 1100 of FIG. 11 and plot 1200 of FIG. 12. The outer rotor lamination width is defined in the 3-D view of an example magnetic gear 1300 in FIG. 13, showing the magnetic gear configured according to the above parameters. It can be seen that by increasing the radial length, $l_{bo}$, the torque decreases whilst reducing the axial width, $d_o$, increases torque. In order to provide sufficient mounting bolt hole support the outer rotor lamination length was selected to be $l_{bo}=15$, whilst the lamination width was selected to be $d_o=38.1$ mm. The axial sides of the laminations were supported using Delrin in one example. The perspective view of the example MG 1300 is schematically shown in FIG. 13. While the use of two different materials (e.g., the back-iron material shown in green and the lamination material shown in grey) is helpful to strengthen the assembly, it can be understood that the axial width of the lamination may not be to scale as shown in FIG. 13. For example, the axial width $d_0$ of the lamination may be much smaller than it appears in FIG. 13. In some examples, only the outer rotor may utilize the laminations due to associated changing magnetic fields.

The magnet insertion assembly process for the Halbach rotor magnets may be extremely challenging for some configurations and so despite its known performance advantages the Halbach rotor is not widely used in commercial motors. If a ferromagnetic rotor back-iron is used and if the magnet geometry is changed to that specified in this disclosure, then the assembly process for the Halbach rotor typology may be greatly simplified.

Figure 14:
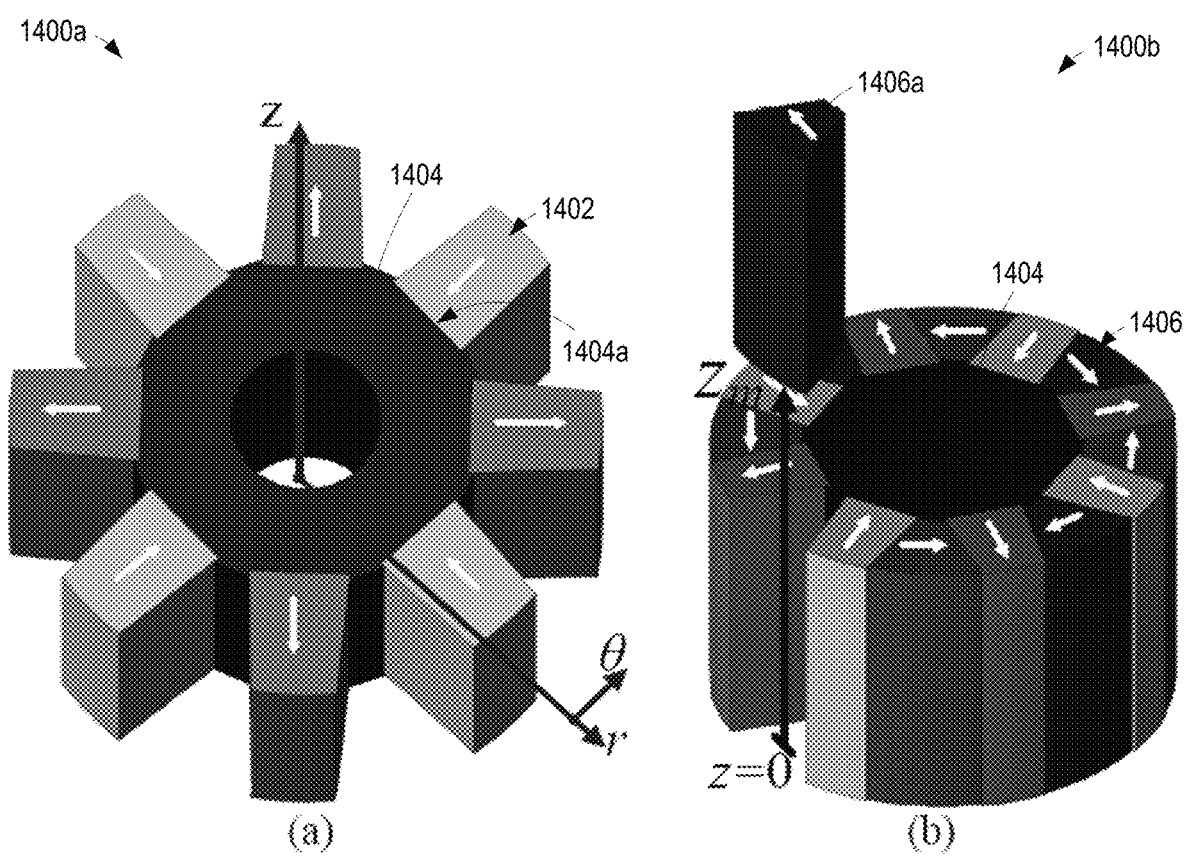
FIG. 14 shows example arrangements of magnets at different stages of assembling a magnetic gear.
Figure 15:
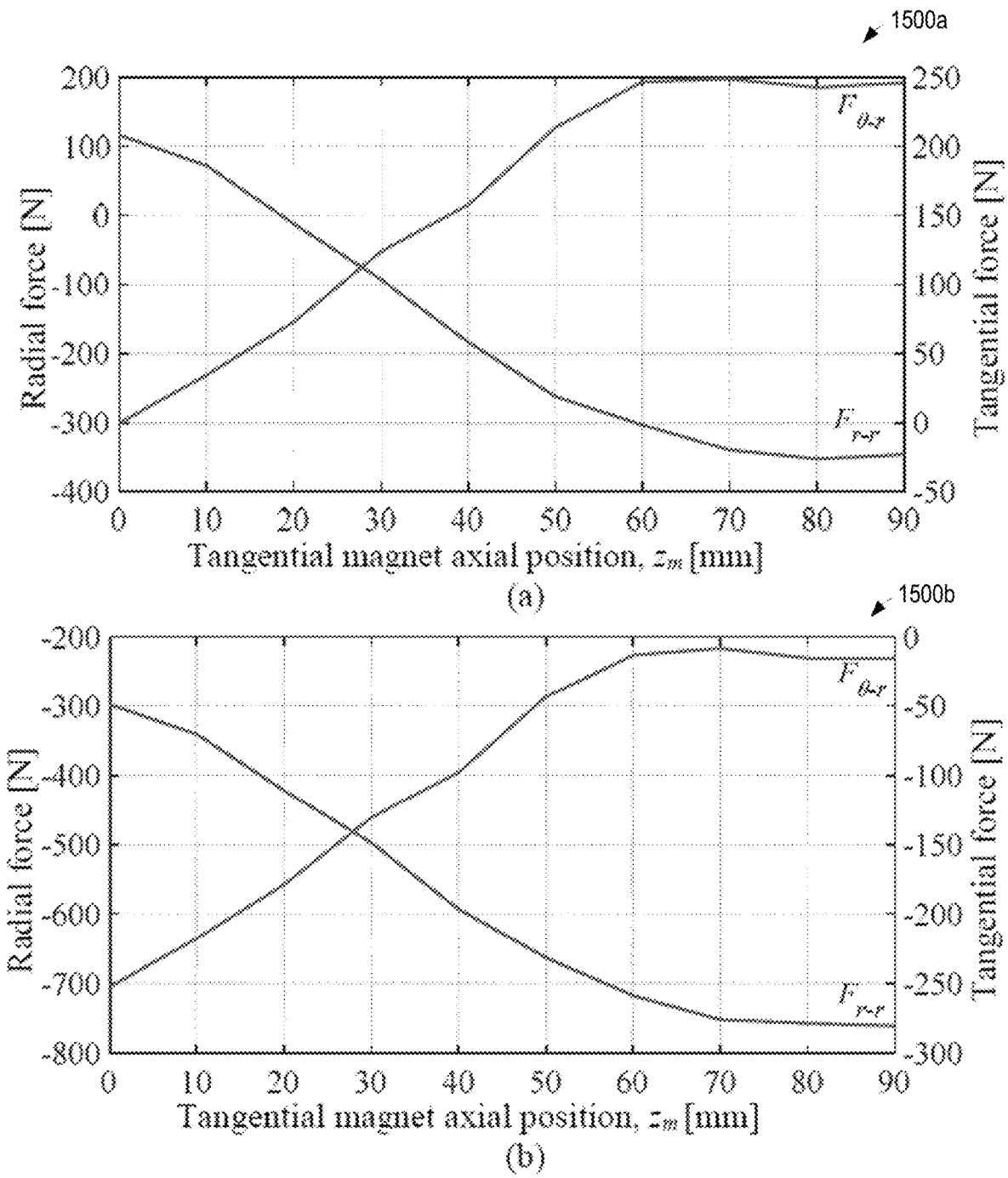
FIG. 15 shows example plots of radial force and azimuthal force on an adjacent radial magnet versus tangential magnet axial position while a first and last tangential magnet are inserted, respectively, to assemble a magnetic gear.

FIG. 14 shows a rotor of a magnetic gear 1400a in a first stage of assembly and the rotor of the magnetic gear 1400b in a second stage of assembly. The assembly stages shown in FIG. 14 may be performed individually for each of the inner rotor and the outer rotor of a magnetic gear (e.g., any of the magnetic gear examples described herein). In order to assemble the Halbach array according to an example of the present disclosure, first all the radial magnets 1402 are affixed onto the ferromagnetic rotor support 1404 into the predefined slots (an example of which is shown at 1404a) as shown in FIG. 14(*a*). There is then a peak radial force of $F_{r-r}=760$ N on each radial magnet between the back-iron (e.g., rotor support 1404) and the respective magnet. This causes the radial magnets to remain strongly bound in position. When the tangentially magnetized magnets 1406 are axially inserted, as illustrated in FIG. 14(*b*), the radial force on the radial magnets 1402 changes from being a radially inwards force to a radially outwards force with a value of $F_{r-r}=116$ N at $z_m=0$. This force change is shown in plot 1500a of FIG. 15(*a*) for the insertion of the last tangential magnet (1406a in FIG. 14(*b*)). Whilst the radial force on the radially magnetized magnets is repulsive for the final assembly, during the assembly process the radial force can still be inwards, as is for the case shown in plot 1500b of FIG. 15(*b*) for the first tangential magnet to be inserted. As further security, the radial magnets have been inserted into an angled slot in the example assembly process, so that the radial magnets are physically prevented from exiting by the structure of the slot.

Figure 16:
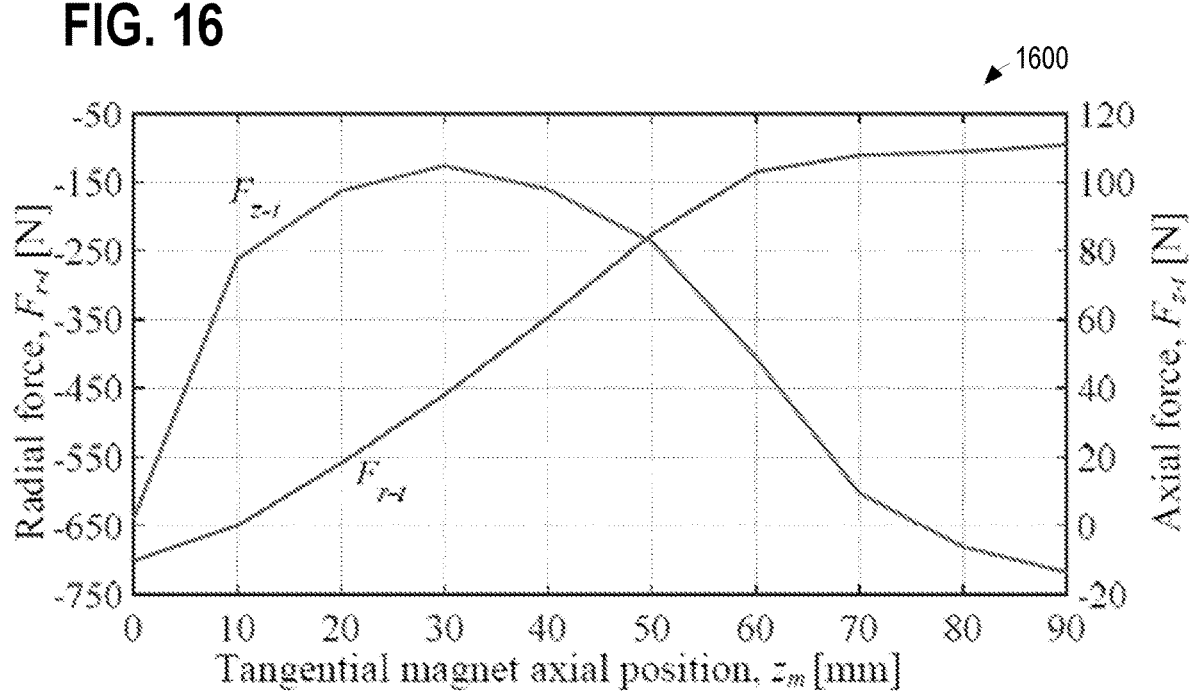
FIG. 16 shows example plots of radial force and axial force on tangentially magnetized magnets as a function of the tangential magnet's axial position in a magnetic gear.
Figure 17:
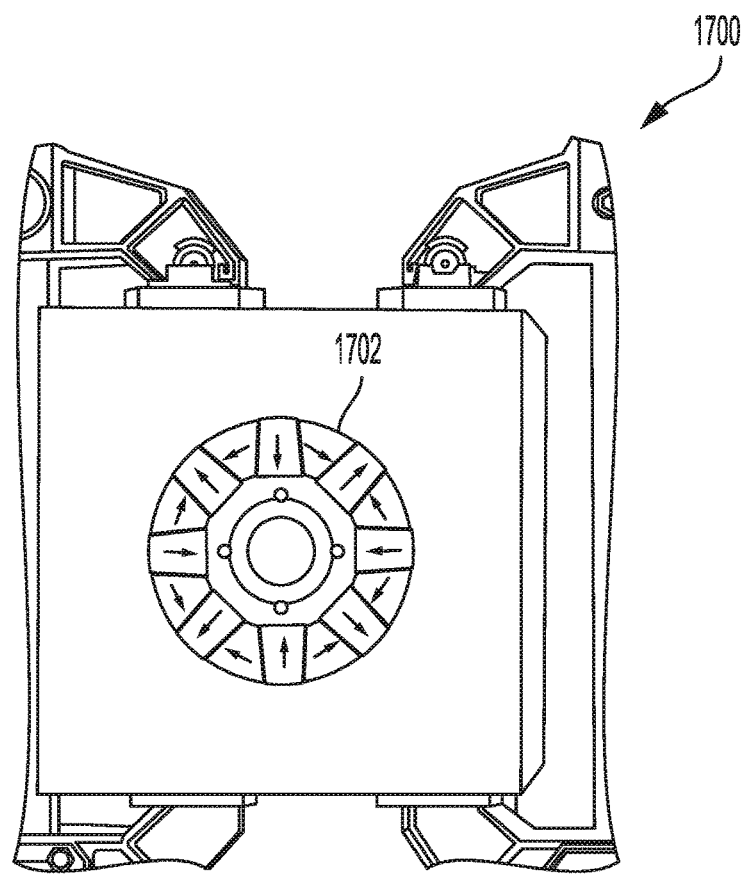
FIG. 17 shows an example assembly fixture for an inner rotor of a magnetic gear.

The force on the tangentially magnetized magnets is always radially inwards, as shown in plot 1600 of FIG. 16, and has a maximum value of $F_{r-t}=-702$ N at $z_m=0$. Therefore, since $F_{r-t}>F_{r-r}$ the tangential magnets geometric shape help retain the radial magnets in place thereby holding the rotor typology together. Note that the tangential magnets do have a significant axial force, $F_{z-t}$ and a fixture may be used to axially insert the tangential magnets into place. An example of a fixture 1700 used for the tangential magnet insertion process is shown in FIG. 17. In the illustrated example, the fixture 1700 is used to insert the tangential magnets for an inner rotor 1702. It is to be understood that the fixture 1700 may be used to insert tangential magnets for any of the example rotors described herein.

Figure 18:
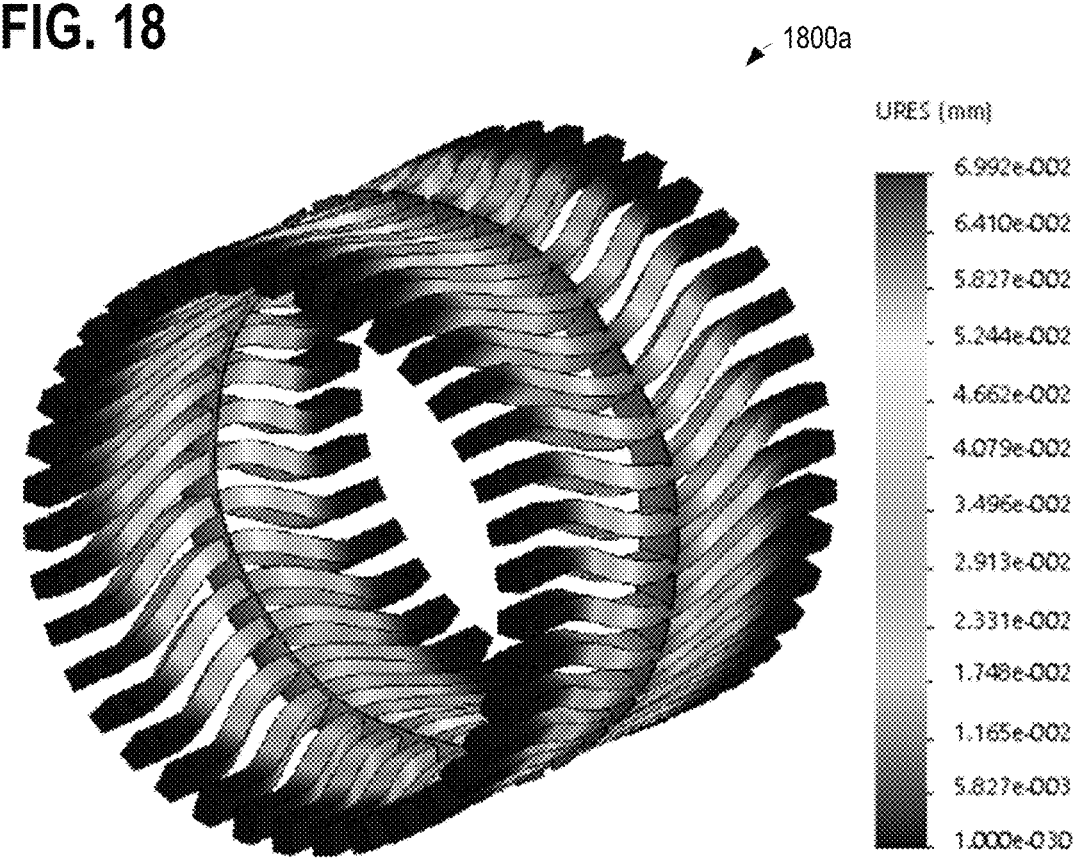
FIG. 18 shows example deflection and stress analysis results for a cage rotor of a magnetic gear.
Figure 18:
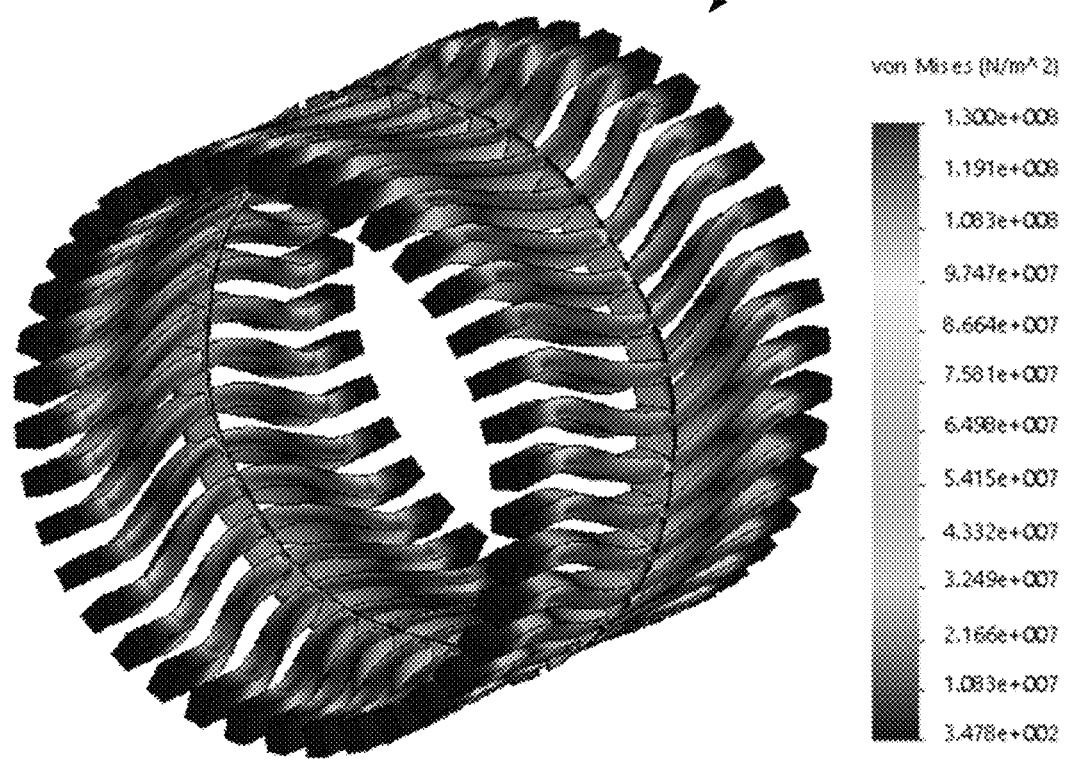
Figure 19:
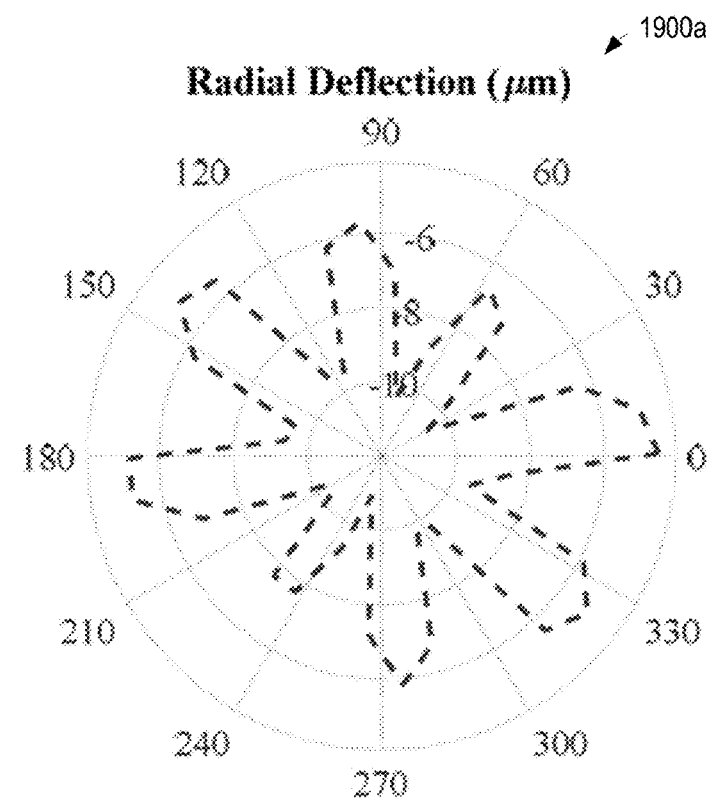
FIG. 19 shows example radial and tangential deflection results of cage bars in a magnetic gear.
Figure 19:
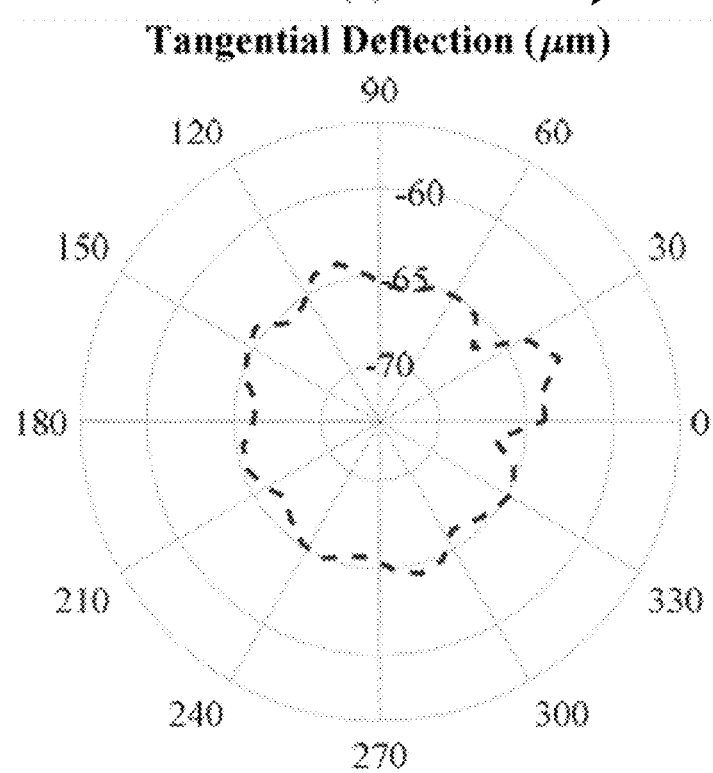
Figure 20:
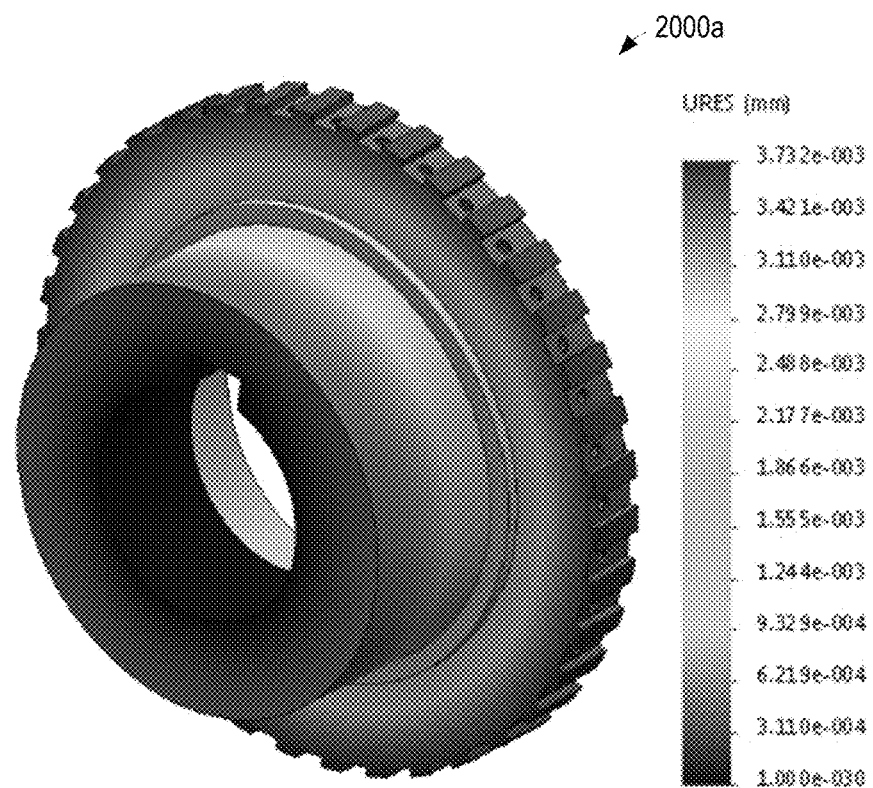
FIG. 20 shows example deflection analysis results for a cage rotor endplate on a high torque side of a magnetic gear and an outer rotor endplate of the magnetic gear.
Figure 20:
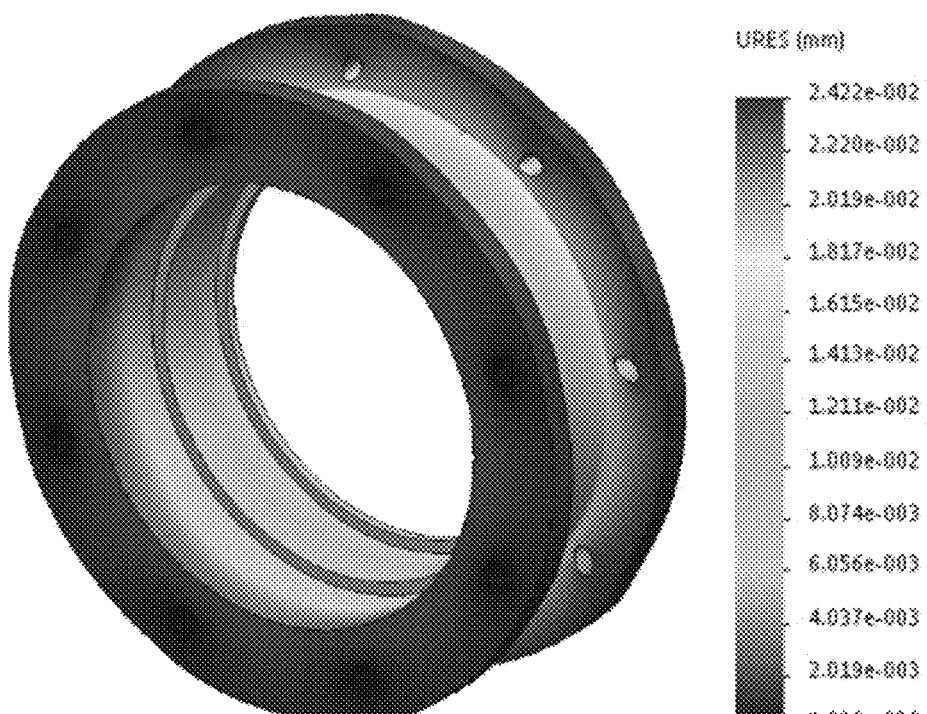

A deflection analysis was conducted on the MG components which were under the highest loads. These were identified as the cage rotor bars (e.g., Garolite bars), high-torque side endplate and outer rotor end plate support. The FEA magnetic analysis computed the forces on each of the Garolite bars, which were then applied to the static analysis developed using SolidWorks Simulation. The Garolite bars were retained in place using screws. There are also two rings between the active region and the fixed section preventing the Garolite bars from radially deflecting inward, as modeled with a sliding boundary condition. The effect of the laminations on the cage was partially modeled by including only a single lamination in the middle. FIG. 18 shows a schematic view of the resultant deflection (view 1800a) and von Mises stress (view 1800b) analysis results for the cage rotor Garolite bars. The radial (plot 1900a) and tangential (plot 1900b) quantitative deflection results are shown in FIG. 19. The maximum radial and tangential deflections in this example were computed to be 0.011 mm and 0.067 mm. This is less than 20% of the airgap (g=0.5 mm) and is within the configuration criteria for the configuration. The deflection analysis on the high-torque side cage rotor endplate (view 2000a) and outer rotor end plate (view 2000b) is shown in FIG. 20. The computed maximum deflection for both parts in this example was very small (<5% of the 0.5 mm airgap).

Figure 21:
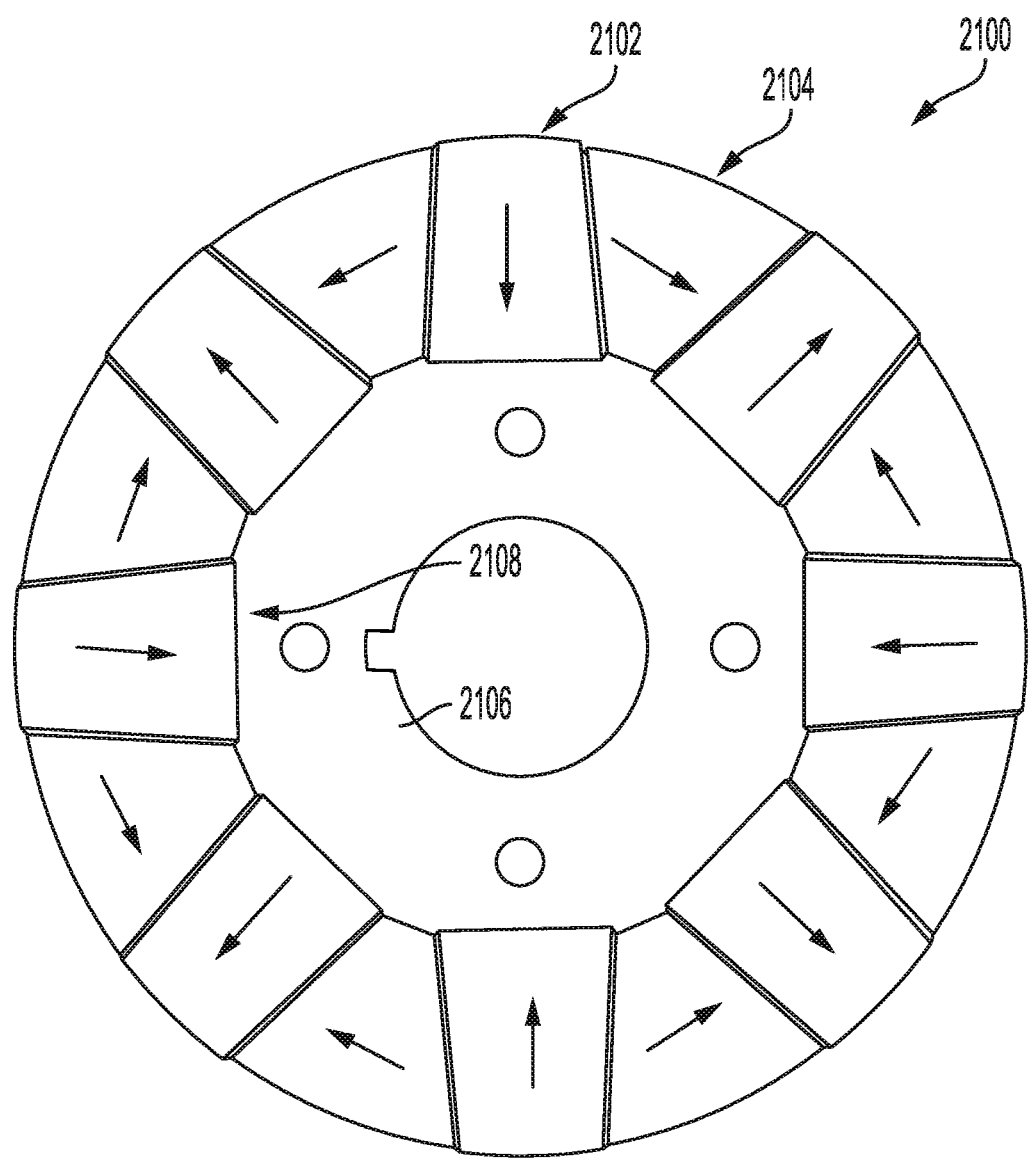
FIG. 21 shows an example of an assembled inner rotor of a magnetic gear.

All three MG rotors may be fabricated separately and assembled. An example inner rotor assembly 2100 is shown in FIG. 21. The inner rotor assembly 2100 includes a plurality of radially-magnetic magnets 2102 (placed in alternating polarity order with gaps in between), a plurality of tangentially-magnetic magnets 2104 (placed in alternating polarity order within the gaps between the radially-magnetic magnets 2102) and an inner rotor support structure 2106 (e.g., a back-iron) that includes slots 2108 along an outer surface (e.g., along an outer circumference) of the rotor support structure to accept and secure the radially-magnetic magnets 2102. As used herein the tangentially-magnetized magnets may have a magnetic polarity that is directed in a tangential direction relative to the circumference of the associated rotor and/or the magnetic gear, while the radially-magnetized magnets may have a magnetic polarity that is directed in a radial direction relative to the circumference of the associated rotor and/or the magnetic gear. Accordingly, a radially-magnetized magnet may have a polarity that is approximately perpendicular to an adjacent tangentially-magnetized magnet (and vice versa).

Figure 22:
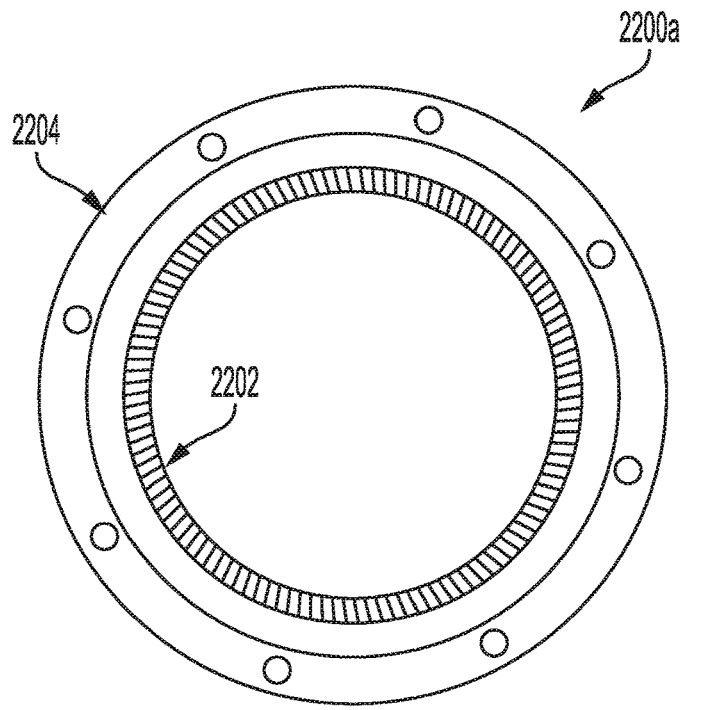
FIG. 22 shows an example of an assembled outer rotor and cage rotor of a magnetic gear.
Figure 22:
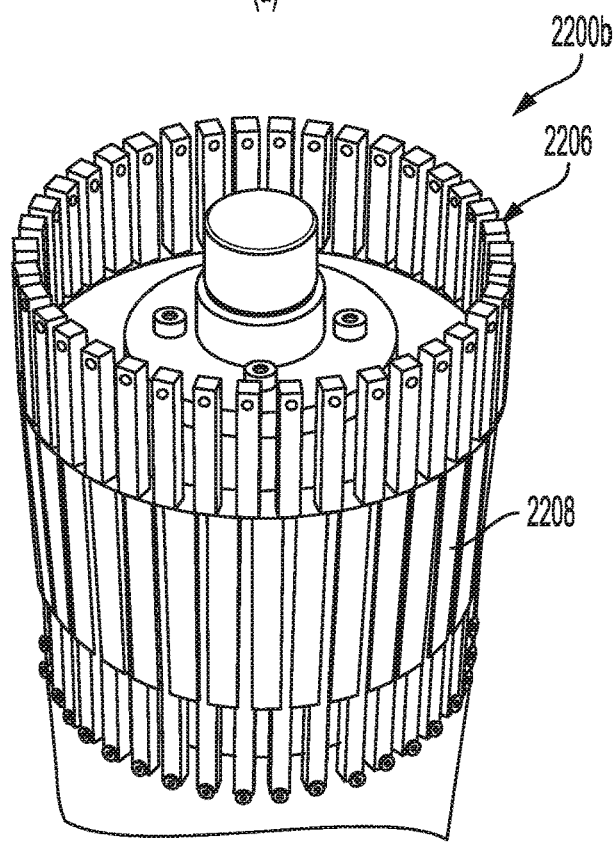

An example outer rotor assembly 2200a and an example cage rotor assembly 2200b are shown in FIG. 22. The outer rotor assembly 2200a includes a plurality of magnets 2202 inserted into and/or otherwise disposed around an inner surface (e.g., along an inner circumference) of an outer rotor support structure 2204. The magnets 2202, which include radially-magnetic magnets and tangentially-magnetic magnets, may have a same configuration (e.g., positioning, polarity, and dimensionality relative to one another) as the magnets 2102 and 2104 of the inner rotor assembly 2100 of FIG. 21 and may be scaled down relative to the magnets 2102 and 2104 (e.g., each magnet 2202 may have the same shape and polarity as, and may be approximately one tenth of the size of, a corresponding magnet 2102 or 2104). The outer rotor support structure 2204 may include a plurality of slots, similarly to the inner rotor support structure 2106 of FIG. 21, to accept and secure the radially-magnetic magnets of magnets 2202.

The cage rotor assembly 2200b includes a plurality of non-conductive rods 2206 (e.g., Garolite bars) positioned within slots of a bridged cage 2208. The rods 2206 in the illustrated example are rectangular in shape, however, the rods may be shaped differently in other examples. For example, as will be described below with reference to a bridgeless cage example, the rods may have a circular shape. The rods 2206 within the half-closed slots of the cage rotor may be inserted by using dry ice. This ensures a tight fit once assembled.

Figure 23:
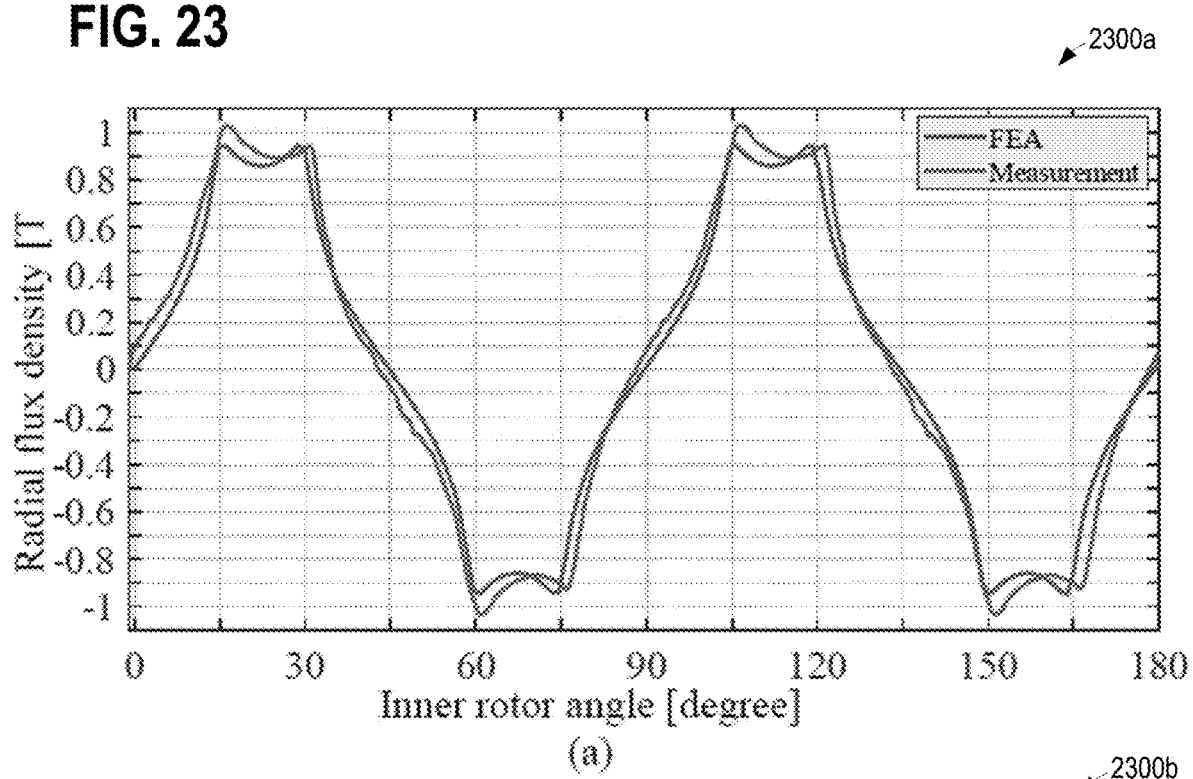
FIG. 23 shows example plots of inner rotor radial flux density and harmonic components of inner rotor radial flux density for a magnetic gear.
Figure 23:
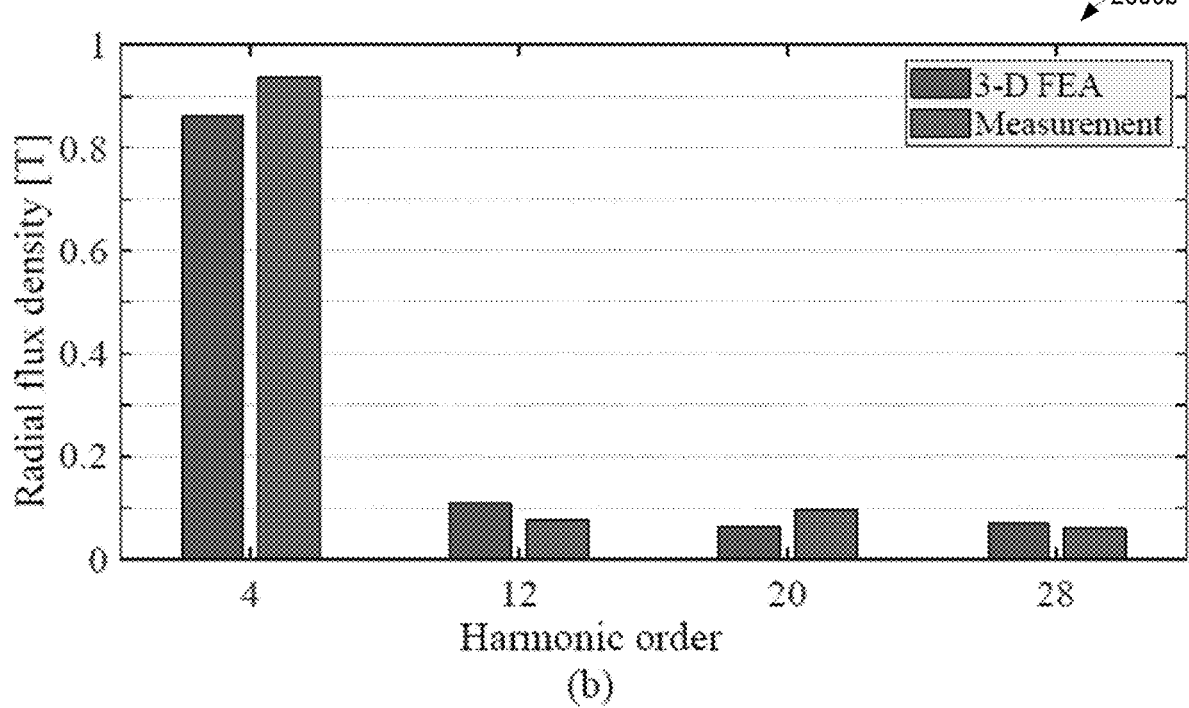
Figure 24:
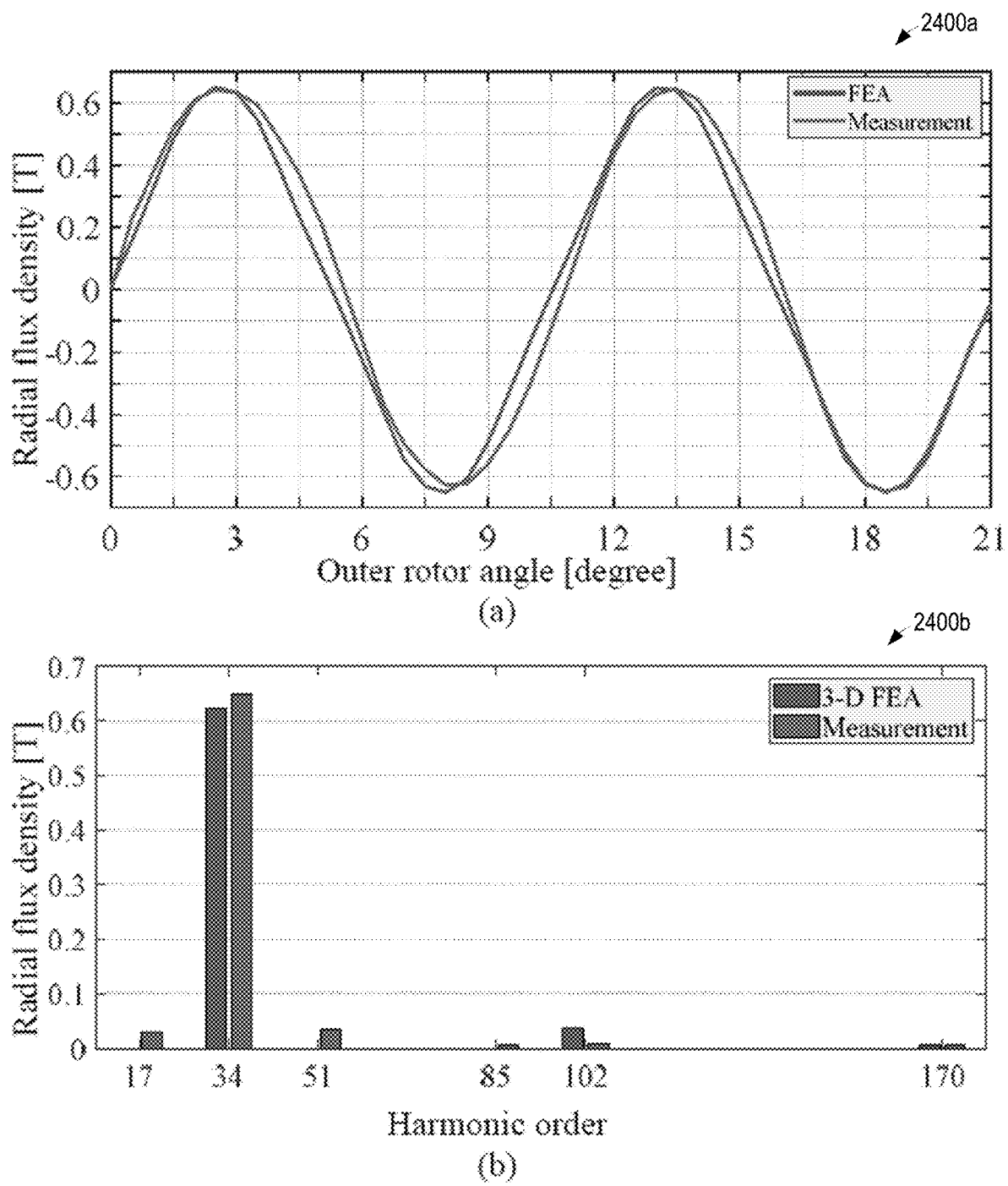
FIG. 24 shows example plots of outer rotor radial flux density and harmonic components of outer rotor radial flux density for a magnetic gear.

After the rotors were fully assembled the radial magnetic flux density around the inner and outer rotor were measured and compared with the FEA model in an example analysis. This comparison is shown in FIG. 23 and FIG. 24. A harmonic analysis of the field is also shown. For example, plot 2300a of FIG. 23(a) shows an inner rotor radial flux density measured at (r, z)=(50.9, 30) mm and plot 2300b of FIG. 23(b) shows harmonic components of inner rotor radial flux density. Plot 2400a of FIG. 24(a) shows an outer rotor radial flux density measured at (r, z)=58.1, 30) mm and plot 2400b of FIG. 24(b) shows harmonic components of outer rotor radial flux density. The measured fundamental field on the inner rotor and outer rotor is 8% and 4% higher than was calculated. This increased value, relative to the measurement, at first seems unlikely. However, unlike in most machines, the reduction in the performance of the outer rotor ferromagnetic material will increase the field performance. Therefore, the increased measured field value may be due to (a) neglecting the outer rotor stacking factor in the FEA analysis and (b) errors in the saturation modeling of the inner and outer ferromagnetic material.

Figure 25:
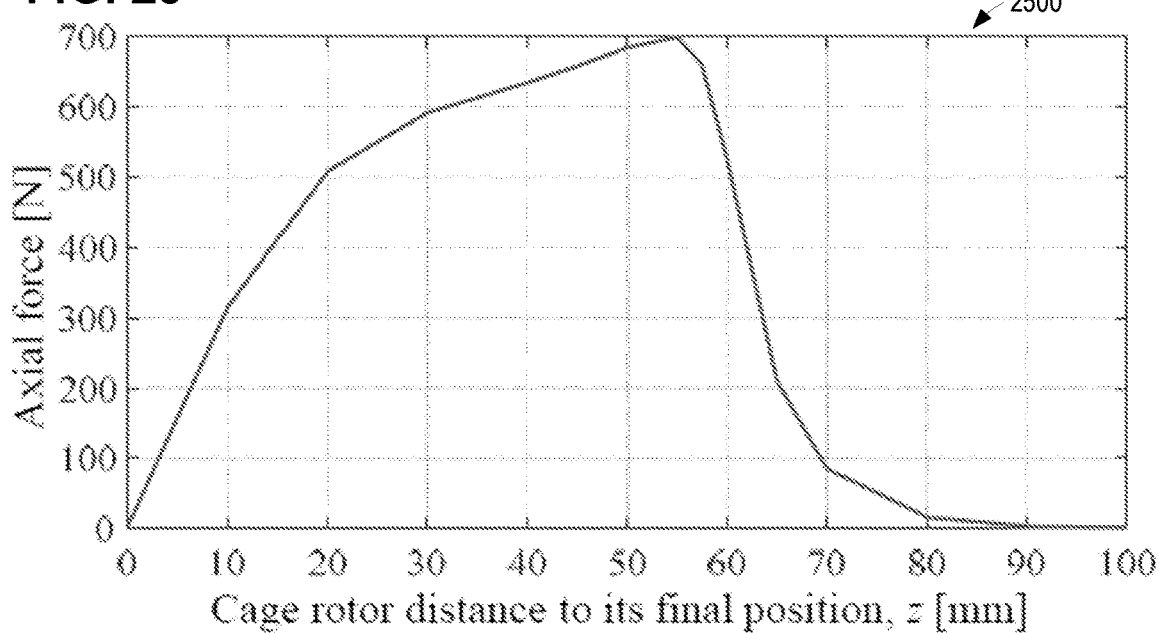
FIG. 25 shows an example plot of axial force exerted on a cage rotor as a function of axial position of the cage rotor of a magnetic gear.
Figure 26:
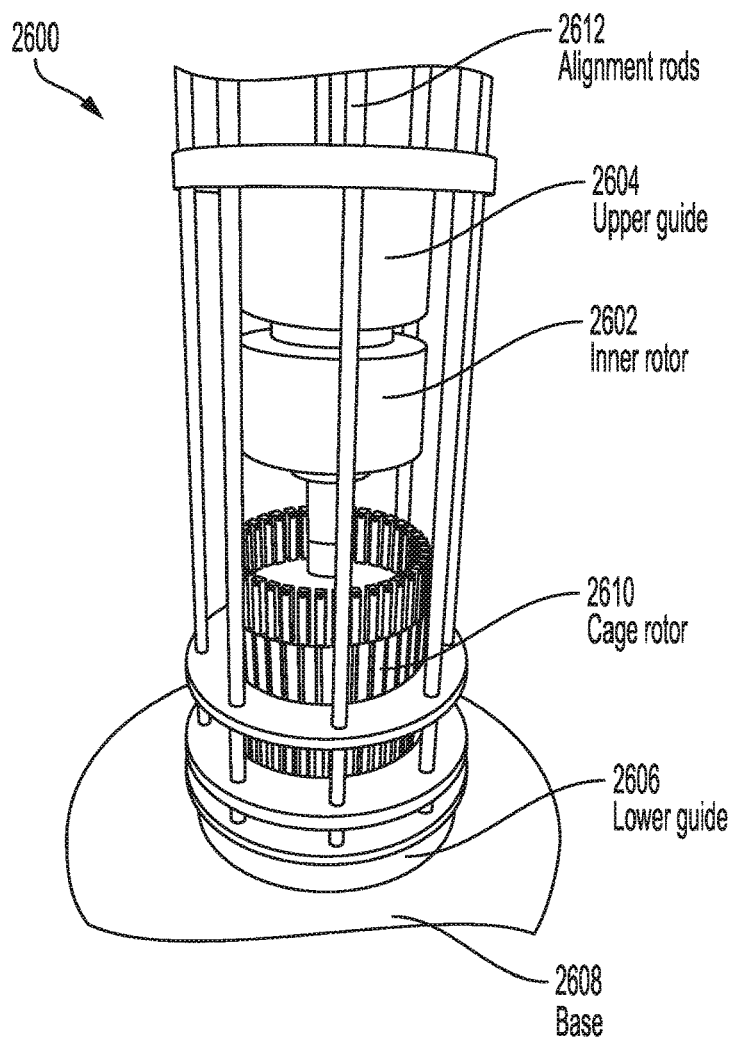
FIG. 26 shows an example assembling jib for feeding an inner rotor into a cage rotor of a magnetic gear.

A large axial attractive force exists between the cage rotor and inner rotor as shown in plot 2500 of FIG. 25, which shows the axial force exerted on the cage rotor as a function of axial position of the cage rotor (e.g., where the final position is z=0). Also, if the cage rotor is eccentric a large unbalanced radial force is created. The large axial force and the possible radial forces exerted on the cage rotor can easily close the airgap and damage the cage rotor laminations and the inner rotor magnets during the assembly process. In order to allow the inner rotor and cage rotor to be successfully assembled without using a large quantity of shims, an assembling jig, such as example assembling jig 2600 of FIG. 26, may be used to feed the inner rotor into the cage rotor. An inner rotor 2602 (e.g., an example of any of the inner rotors described herein, such as inner rotor 2100 of FIG. 21) may be fixed between upper guide 2604 and lower guide 2606 (e.g., positioned near a base 2608 of the jig), and a cage rotor 2610 (e.g., an example of any of the cage rotors described herein, such as cage rotor 2200b of FIG. 22) may then be free to move upward and prevented from moving radially. Alignment rods 1612 may be used to align the components and/or constrain/guide radial movement of the inner rotor and/or cage rotor during assembly. This allows the cage rotor 2608 to be successfully assembled.

Figure 27:
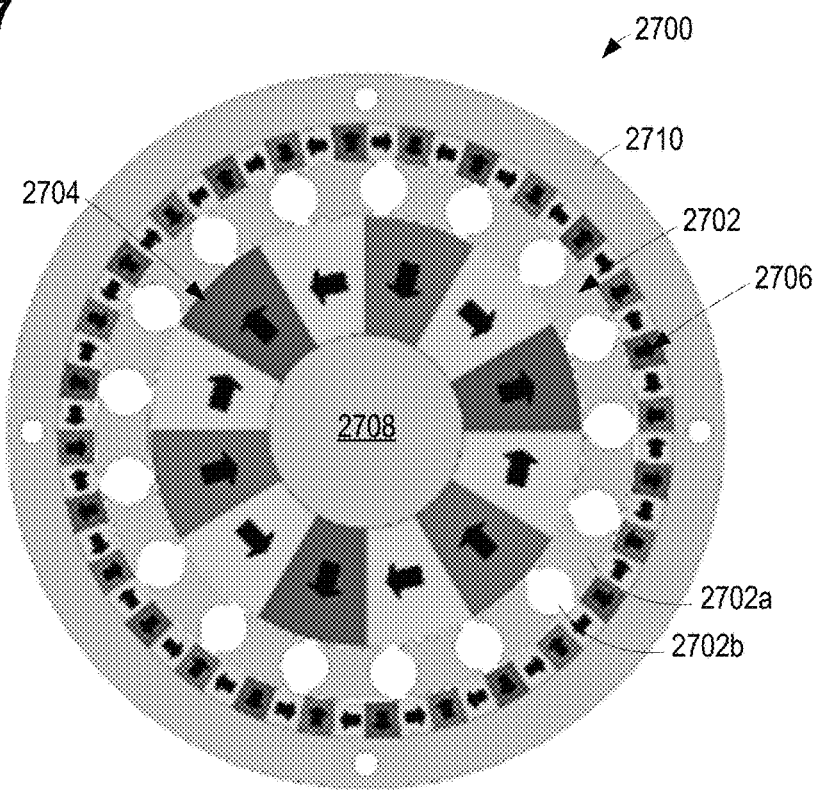
FIG. 27 shows an example half cut-away view of a Halbach rotor coaxial magnetic gear with a bridgeless cage.
Figure 28:
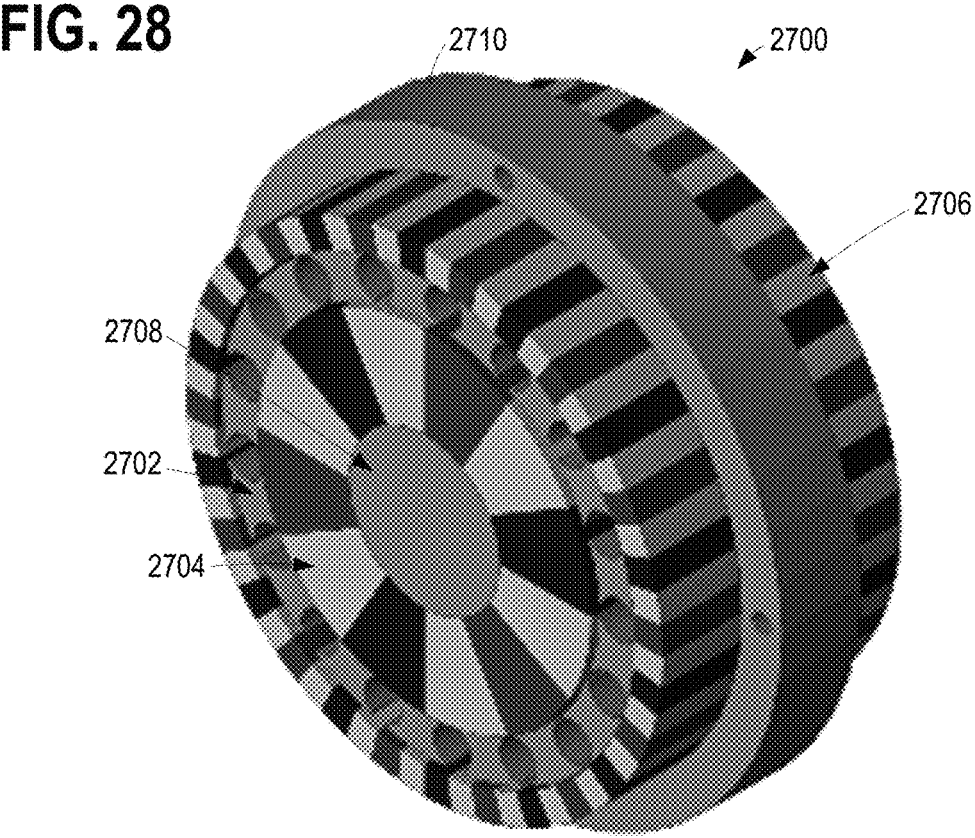
FIG. 28 shows an example isometric view of the Halbach rotor coaxial magnetic gear of FIG. 27.

FIG. 27 shows an example half cut-away view of a Halbach rotor coaxial magnetic gear 2700 with a bridgeless cage rotor 2702. FIG. 28 shows an example isometric view of the Halbach rotor coaxial magnetic gear 2700. The bridgeless cage rotor 2702 is positioned between inner rotor magnets 2704 and outer rotor magnets 2706. The inner rotor magnets are supported by an inner rotor support structure 2708 to form an inner rotor, while the outer rotor magnets are supported by an outer rotor support structure 2710 to form an outer rotor. The configuration of magnets within the inner and outer rotor illustrated in FIGS. 27 and 28 is exemplary in nature, and any suitable configuration may be used with the bridgeless cage rotor 2702. An example of a bridgeless cage rotor used with inner and outer rotors configured similarly to the magnetic gear examples of FIGS. 10 and 13 (for example) is described in more detail below with respect to FIGS. 36 and 37.

The bridgeless cage 2702 includes a plurality of bridge segments, an example of which is shown at 2702a, radially spaced from one another via a plurality of gaps, an example of which is shown at 2702b. The gaps may be at least partially occupied by rods of non-conductive material, such as Garolite rods. As shown, the gaps radially separate adjacent bridge segments from one another, such that each bridge segment may be manufactured individually and/or as an individual piece from one another. Such a bridgeless configuration may enable the magnetic gear to be scaled more easily than configurations using a bridged cage that is one continuous piece of material due to the relatively greater capacity machining resources used for producing a single, large cage rotor versus the relatively smaller capacity machining resources that may be used to produce a series of smaller cage rotor bridge segments. The bridge segments may have inwardly-curving side portions to create substantially circular gaps between adjacent segments. This allows the gaps to be filled with cylindrical non-conductive rods (e.g., Garolite bars), which may be more easily resourced and/or manufactured than rectangular or otherwise shaped non-conductive rods. It is to be understood that the bridge sections may have other shapes without departing from the scope of the disclosure.

Figure 29:
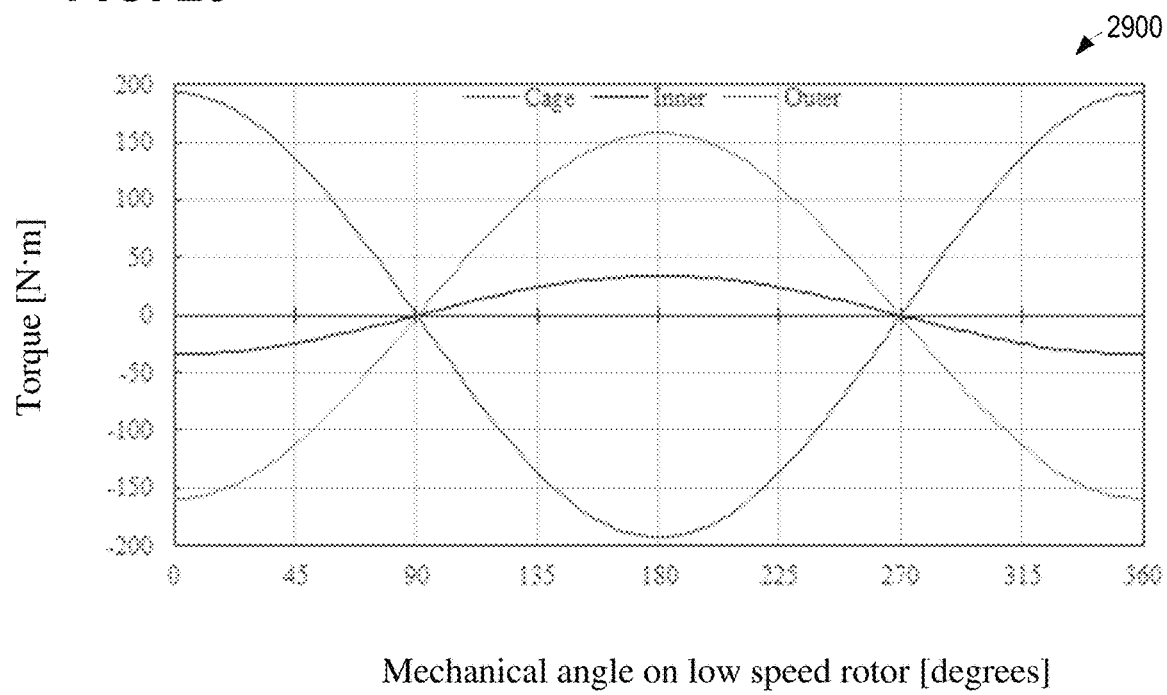
FIG. 29 shows example plots of torque as a function of mechanical angle for rotors of a magnetic gear with a bridgeless cage.
Figure 30:
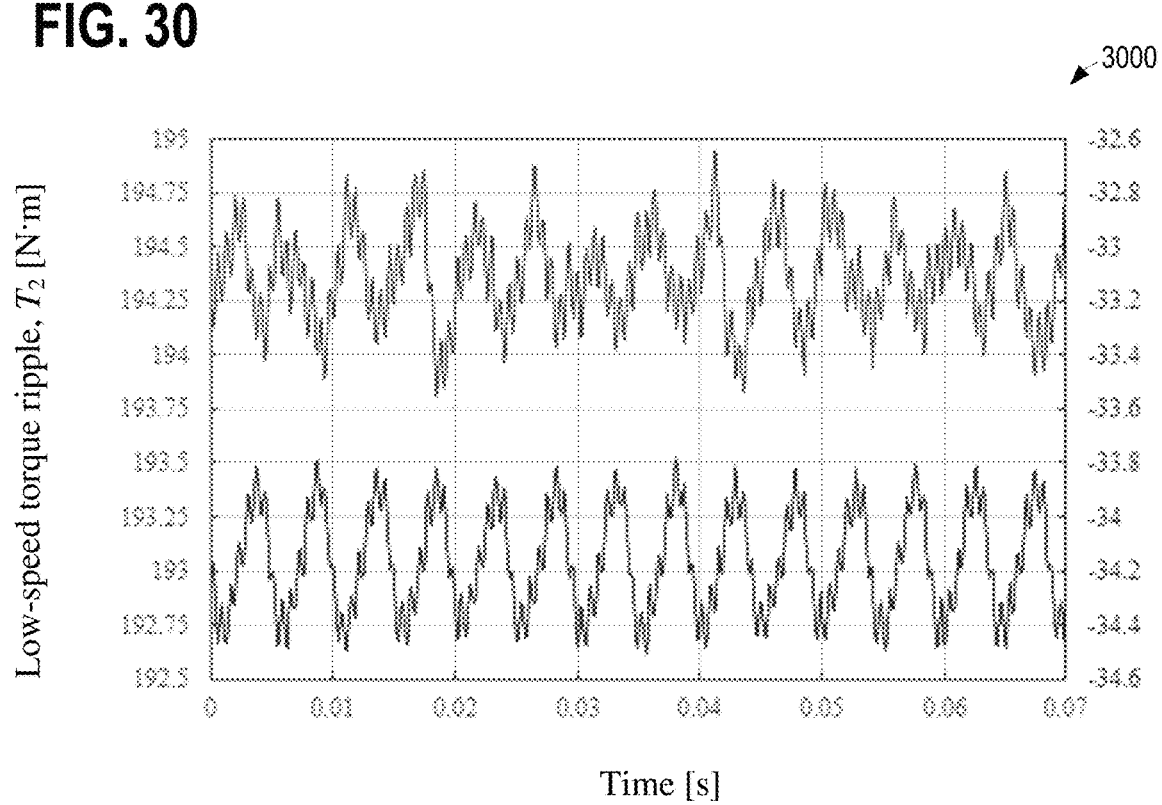
FIG. 30 shows example plots of torque ripple as a function of mechanical angle for rotors of a magnetic gear with a bridgeless cage.

FIG. 29 shows example plots 2900 of torque as a function of mechanical angle for rotors of a magnetic gear with a bridgeless cage, such as bridgeless cage 2702 of magnetic gear 2700. As shown, peak torque of the cage rotor is just under 200 N·m (approximately 193 N·m), peak torque of the outer rotor is just over 150 N·m (approximately 158 N·m), and peak torque of the inner rotor is approximately 35 N·m. FIG. 30 shows example plots 3000 of torque ripple as a function of mechanical angle for the rotors of the magnetic gear used in the analysis of FIG. 29.

Figure 31:
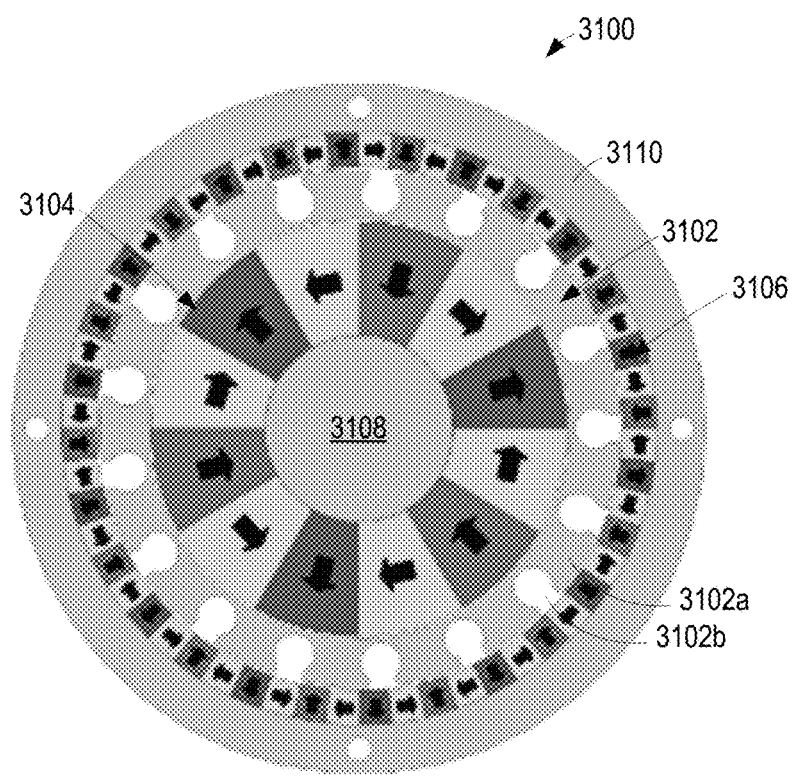
FIG. 31 shows an example half cut-away view of a Halbach rotor coaxial magnetic gear with a bridged cage.
Figure 32:
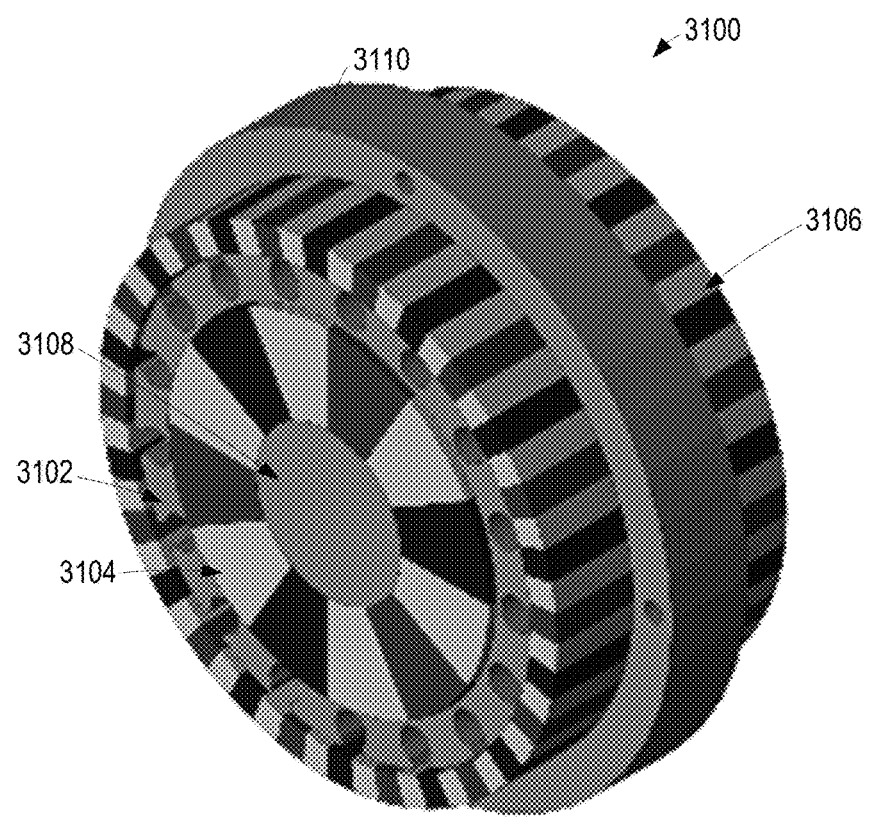
FIG. 32 shows an example isometric view of the Halbach rotor coaxial magnetic gear of FIG. 31.

FIG. 31 shows an example half cut-away view of a Halbach rotor coaxial magnetic gear 3100 with a bridged cage rotor 3102. FIG. 32 shows an example isometric view of the Halbach rotor coaxial magnetic gear 3100. The bridged cage rotor 3102 is positioned between inner rotor magnets 3104 and outer rotor magnets 3106. The inner rotor magnets are supported by an inner rotor support structure 3108 to form an inner rotor, while the outer rotor magnets are supported by an outer rotor support structure 3110 to form an outer rotor. It is to be understood that the configuration of magnets within the inner and outer rotor illustrated in FIGS. 31 and 32 is exemplary in nature, and any suitable configuration may be used with the bridged cage rotor 3102. In contrast to the bridgeless configuration of FIGS. 27 and 28, the bridged cage rotor 3102 comprises a single, continuous structure 3102a extending around an outer circumference of the inner rotor. The bridged cage rotor 3102 may include gaps along an outer circumference of the bridged cage (e.g., to accept non-conductive bars), an example of which is shown at 3102b. However, the inner circumference of the bridged cage is continuous and uninterrupted by gaps.

Figure 33:
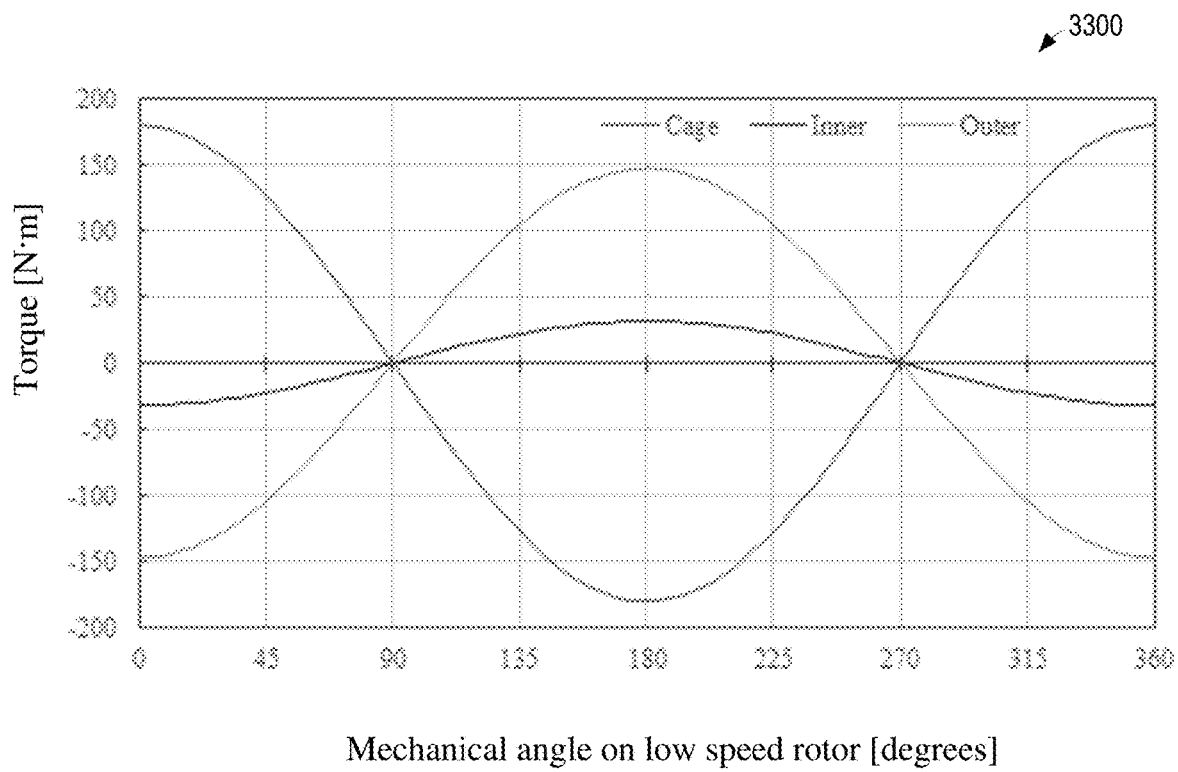
FIG. 33 shows example plots of torque as a function of mechanical angle for rotors of a magnetic gear with a bridged cage.
Figure 34:
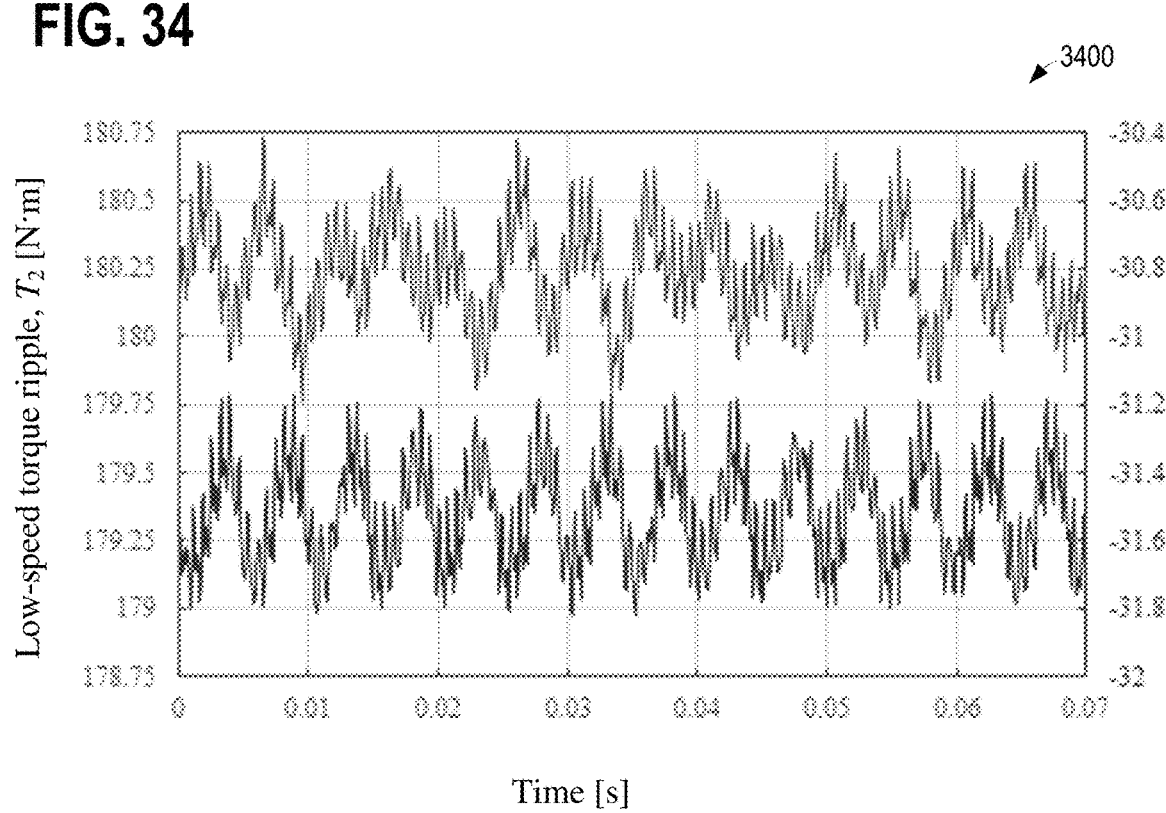
FIG. 34 shows example plots of torque ripple as a function of mechanical angle for rotors of a magnetic gear with a bridged cage.

FIG. 33 shows example plots 3300 of torque as a function of mechanical angle for rotors of a magnetic gear with a bridged cage. As shown, peak torque of the cage rotor in this analysis is well under 200 N·m (approximately 175 N·m), peak torque of the outer rotor is approximately 150 N·m, and peak torque of the inner rotor is approximately 33 N·m. Accordingly, peak torque for all rotors is lower than the peak torque measured for the bridgeless configuration as described above with respect to FIG. 29. FIG. 34 shows example plots 3400 of torque ripple as a function of mechanical angle for the rotors of the magnetic gear used in the analysis of FIG. 33. The results shown in FIGS. 29 and 30 versus FIGS. 33 and 34 are due to the absence or reduction of leakage flux in the bridgeless configuration.

Figure 35:
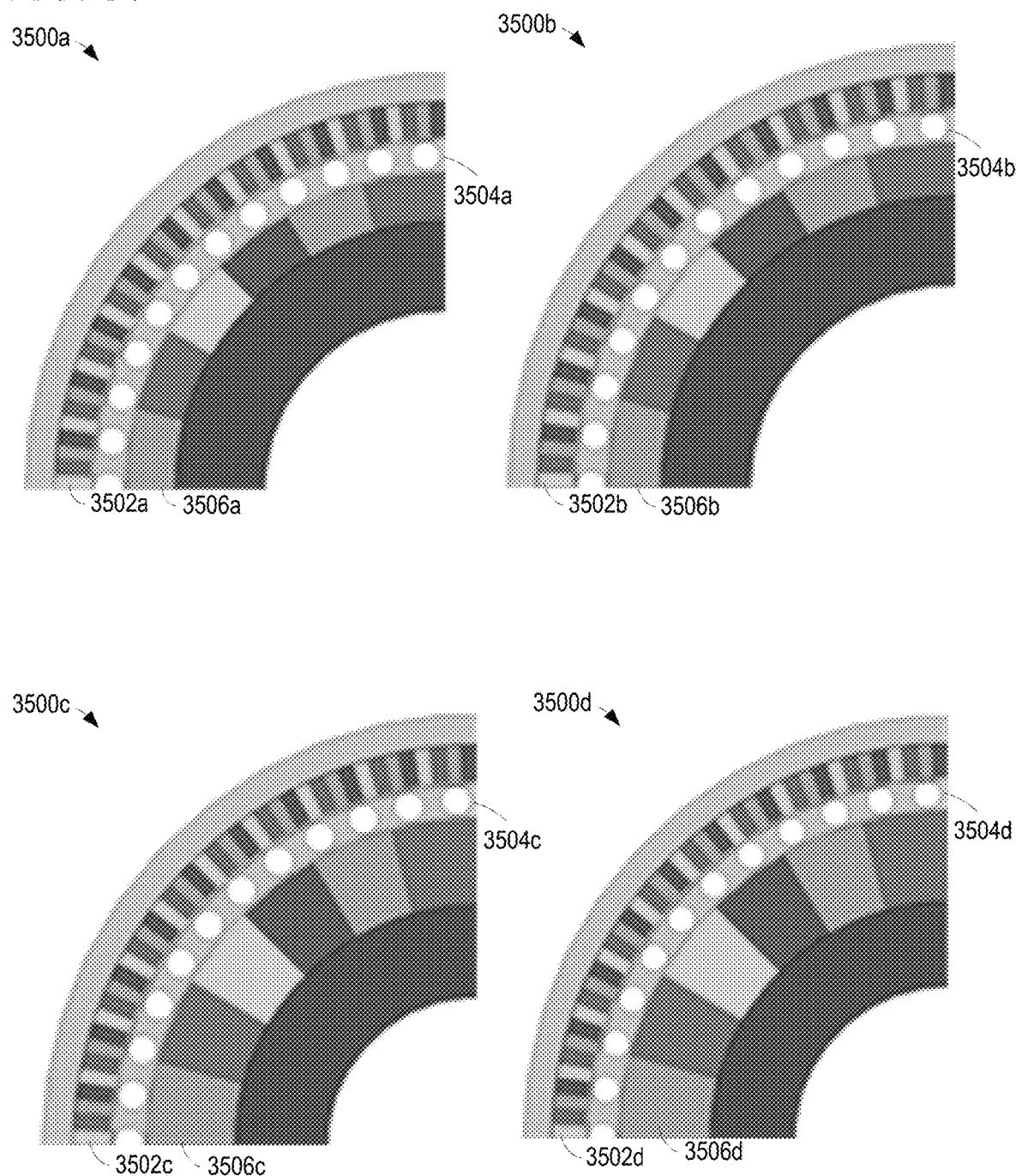
FIG. 35 shows quarter cut-away views of example bridgeless configurations for a magnetic gear.

FIG. 35 shows quarter cut-away views of example configurations for a magnetic gear. Configurations 3500a and 3500b show approaches for targeting maximum mass torque density and configurations 3500c and 3500d show approaches for targeting maximum volumetric torque density. In FIG. 35, an outer rotor is designated at 3502a-3502d, respectively, a cage rotor is designated at 3504a-3504d, respectively, and an inner rotor is designated at 3506a-3506d, respectively. It is to be understood that the arrangement of magnets in the inner and outer rotors of the configurations is exemplary, and any of the magnet configurations described herein may be used in the illustrated configurations. Example dimensions used for configuration 3500a are $(r_{o6}, l_6, l_5, l_4, d) = (130, 11.875, 10.525, 16, 155)$ mm, and example dimensions used for configuration 3500b are $(r_{o6}, l_6, l_5, l_4, d) = (140, 11.875, 10.525, 17.5, 128)$ mm. Example dimensions used for configuration 3500c are $(r_{o6}, l_6, l_5, l_4, d) = (130, 11.875, 10.525, 32, 130)$ mm and example dimensions used for configuration 3500d are $(r_{o6}, l_6, l_5, l_4, d) = (140, 11.9, 10.525, 32, 105)$ mm. As described above, $r_{o6}$ corresponds to the outer rotor radius, $l_6$ corresponds to the outer rotor radial length, $l_5$ corresponds to the cage slot radial length (e.g., the radial length of the cage rotor), $l_4$ corresponds to the inner rotor radial length, and d corresponds to the axial length of the respective magnetic gears. The cage rotors of the configurations shown in FIG. 35 provide circular gaps to accommodate cylindrical rods of non-conductive material, as well as bridged connections along both the inner and outer circumference of the cage rotor to increase the strength of the cage rotor. As discussed above, bridgeless cage configurations may have increased torque relative to bridged caged configurations, and may be easier to scale up. Accordingly, a cage configuration (e.g., bridged along only an inner or outer circumference of the cage rotor, bridged on both the inner and outer circumference of the cage rotor, or bridgeless along both circumferences of the cage rotor) may be selected based on a scale of the magnetic gear, a desired strength of the cage, and a desired torque for the magnetic gear.

As the magnetic gear axial length increases, it increases the eddy current loss within the magnets and makes the magnets more expensive and difficult to manufacture. The cage rotor is also expected to have higher deflection. A two section magnetic gear may help to address these issues. Such a configuration may utilize magnets that are axially shorter, less expensive, and easier to manufacture and cut the eddy current losses within the magnets. It also makes it possible to have an additional cage support in the middle of the magnetic gear.

Figure 36:
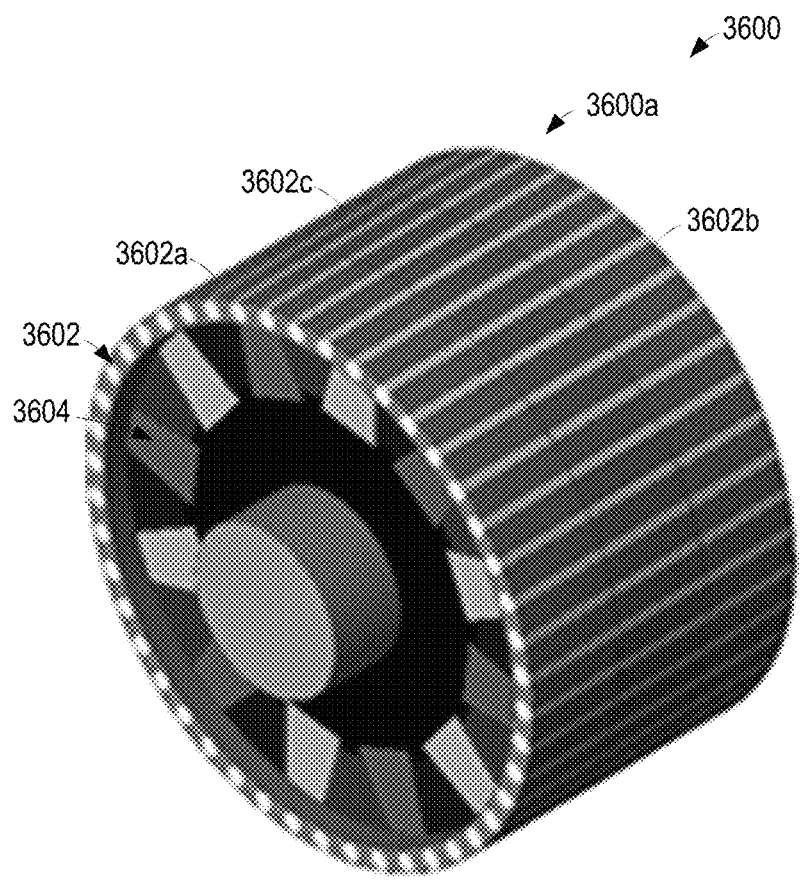
FIG. 36 shows isometric views of an example magnetic gear components.
Figure 36:
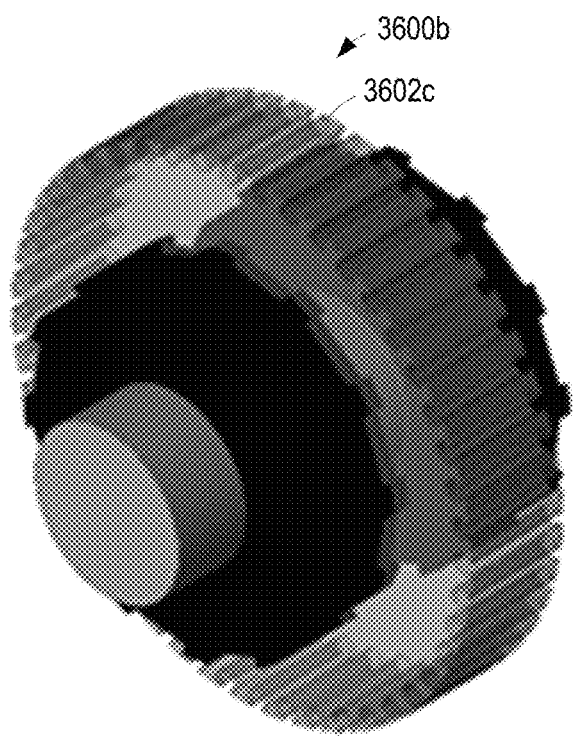

FIG. 36 shows isometric views of an example magnetic gear components of a portion of a two section magnetic gear 3600. For example, at 3600a, a two section cage rotor 3602 is shown, comprising a first cage rotor section 3602a, a second cage rotor section 3602b, and additional cage support section 3602c. A corresponding two section inner rotor 3604 is also shown though only the first section of the inner rotor is visible in the illustrated view of FIG. 36. It is to be understood that inner rotor 3604 may include two sections respectively aligned with the two sections of the cage rotor 3602. The sections of the cage rotor and/or inner rotor may be spaced from one another in some examples by a distance $d_5$. The additional cage support section 3602c may be positioned at least partially within this distance between the cage rotor and/or inner rotor sections and/or otherwise may be disposed between the two sections of the cage rotor. An isolated view of the additional cage support section 3602c is shown at 3600b of FIG. 36. It is to be understood that the two-stage cage rotor and inner rotor configuration may be used with any of the magnetic gears described herein (e.g., the two-stage inner rotor may have any suitable configuration of magnets, such as the configuration of magnets shown in FIG. 10 and/or any of the other configurations described herein, and the two-stage cage rotor may have any suitable configuration, such as the bridgeless configuration of FIGS. 27 and 28, the bridged configuration of FIGS. 31 and 32, and/or any of the other configurations described herein).

Figure 37:
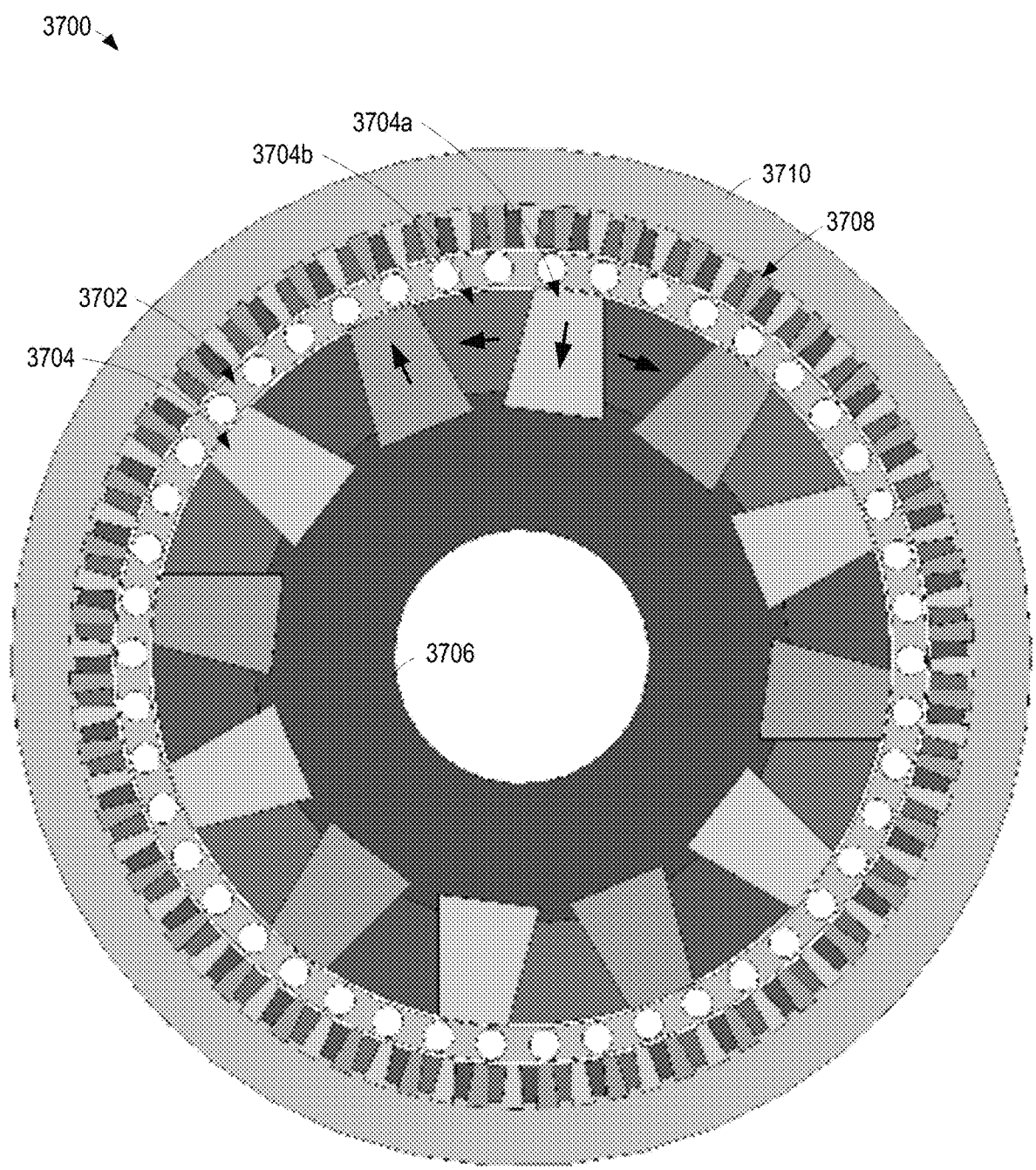
FIG. 37 shows a front view of an example magnetic gear including a bridgeless cage.

FIG. 37 shows a front cut-away view of an example magnetic gear 3700 including a bridgeless cage rotor 3702. The magnetic gear 3700 includes an inner rotor 3704 that includes a plurality of radially-magnetic magnets 3704a and a plurality of tangentially-magnetic magnets 3704b disposed between adjacent radially-magnetic magnets having opposing polarity to one another (e.g., such that adjacent magnets in the inner rotor have approximately perpendicular polarity to one another). The radially-magnetic magnets 3704a are inserted into grooves of an inner rotor support structure (e.g., back-iron) 3706.

The magnetic gear 3700 further includes an outer rotor 3708 that is coaxial with the inner rotor 3704 and includes a plurality of magnets arranged similarly to the magnets of the inner rotor 3704 (e.g., tangentially-magnetic magnets disposed between radially-magnetic magnets). The radially-magnetic magnets of outer rotor 3708 are inserted into grooves of an outer rotor support structure (e.g., back-iron) 3710.

The bridgeless cage rotor 3702 is coaxial with the inner rotor 3704 and the outer rotor 3708 and is disposed between the inner and outer rotors (e.g., between magnets of the inner and outer rotors). The bridgeless cage rotor 3702 may be comprised of a plurality of individual bridge segments that are spaced from one another by respective gaps, in which non-conductive material (e.g., non-conductive rods and/or Garolite bars) may be positioned. The bridgeless cage rotor 3702 may be configured as described above with respect to FIGS. 27 and 28.

Figure 38:
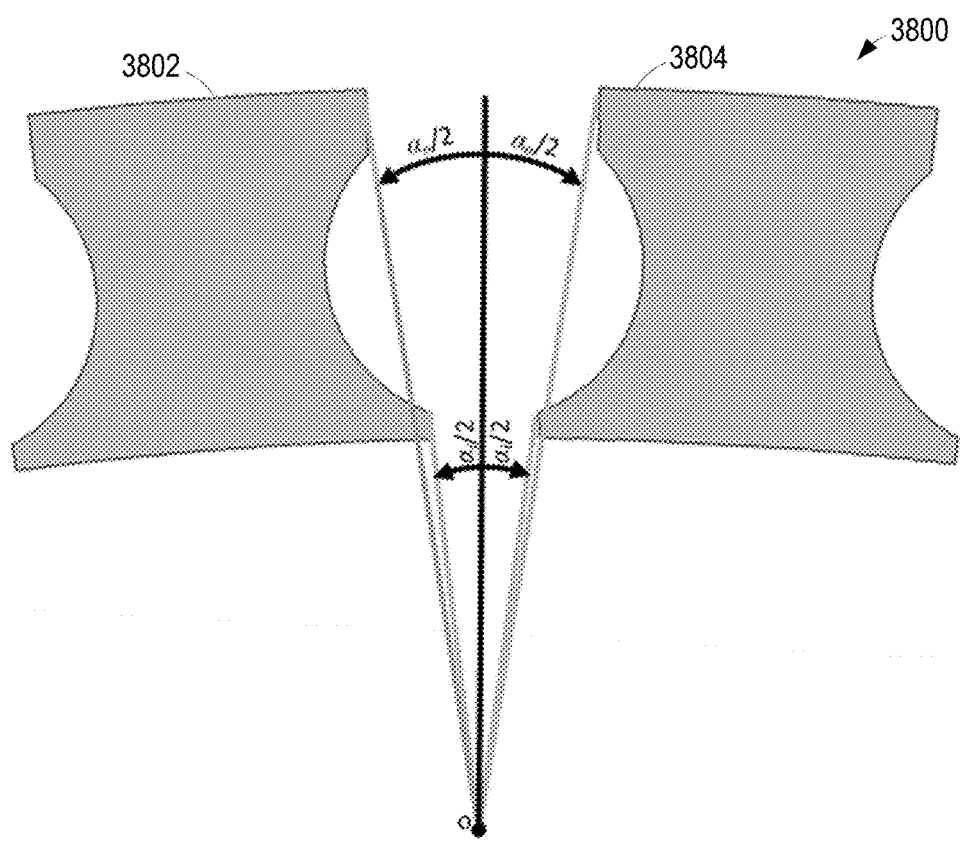
FIG. 38 shows an example representation of inner and outer opening angles between cage rotor steel pieces for a magnetic gear having a bridgeless cage configuration.
Figure 39:
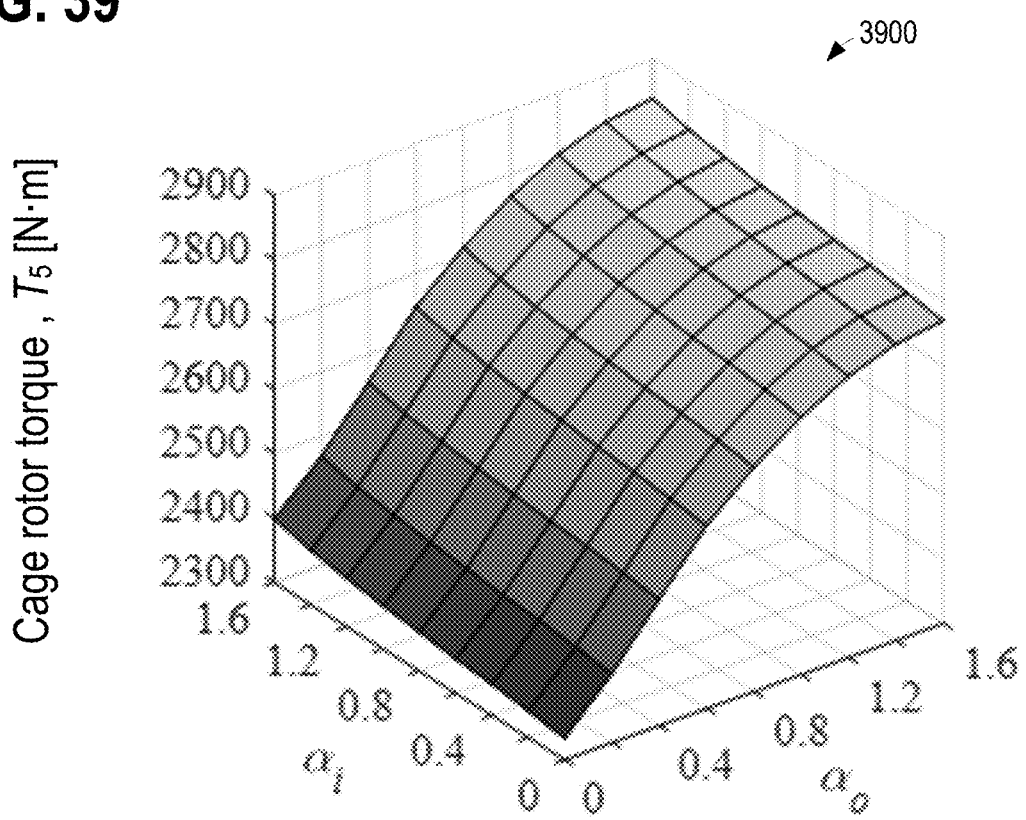
FIG. 39 shows an example plot of torque versus inner and outer opening angles for a magnetic gear.

FIG. 38 shows an example representation of inner ($\alpha_i$) and outer ($\alpha_o$) opening angles between cage rotor bridge segments (e.g., steel pieces) 3802 and 3804 for a cage rotor 3800 of a magnetic gear having a bridgeless cage configuration. An angle of 0 means that the two bridge segments are connected (e.g., in a bridged configuration). FIG. 39 shows an example plot 3900 of torque versus inner and outer opening angles for a magnetic gear. As shown, the inner opening angle ($\alpha_i$) affects the torque amplitude less than the outer opening angle ($\alpha_o$). Having an inner bridge (e.g., an inner opening angle, $\alpha_i$, of zero degrees) may improve the torque ripple, so an example configuration may include a cage rotor with a bridge on one side (e.g., an inner bridge; where the bridge segments are connected along an inner circumference of the cage rotor). The outer opening angle affects the ability of the cage rotor to hold the non-conductive rods at associated positions in that a smaller angle results in longer lips and having more support to hold the non-conductive cage rods. As shown in FIG. 39, after $\alpha_o$ of 1.2 degrees the torque does not benefit from increasing the angle in the example analysis, so an example configuration may include a cage rotor having inner and outer angles selected as ($\alpha_i$, $\alpha_o$)=(0, 1.2).

Figure 40:
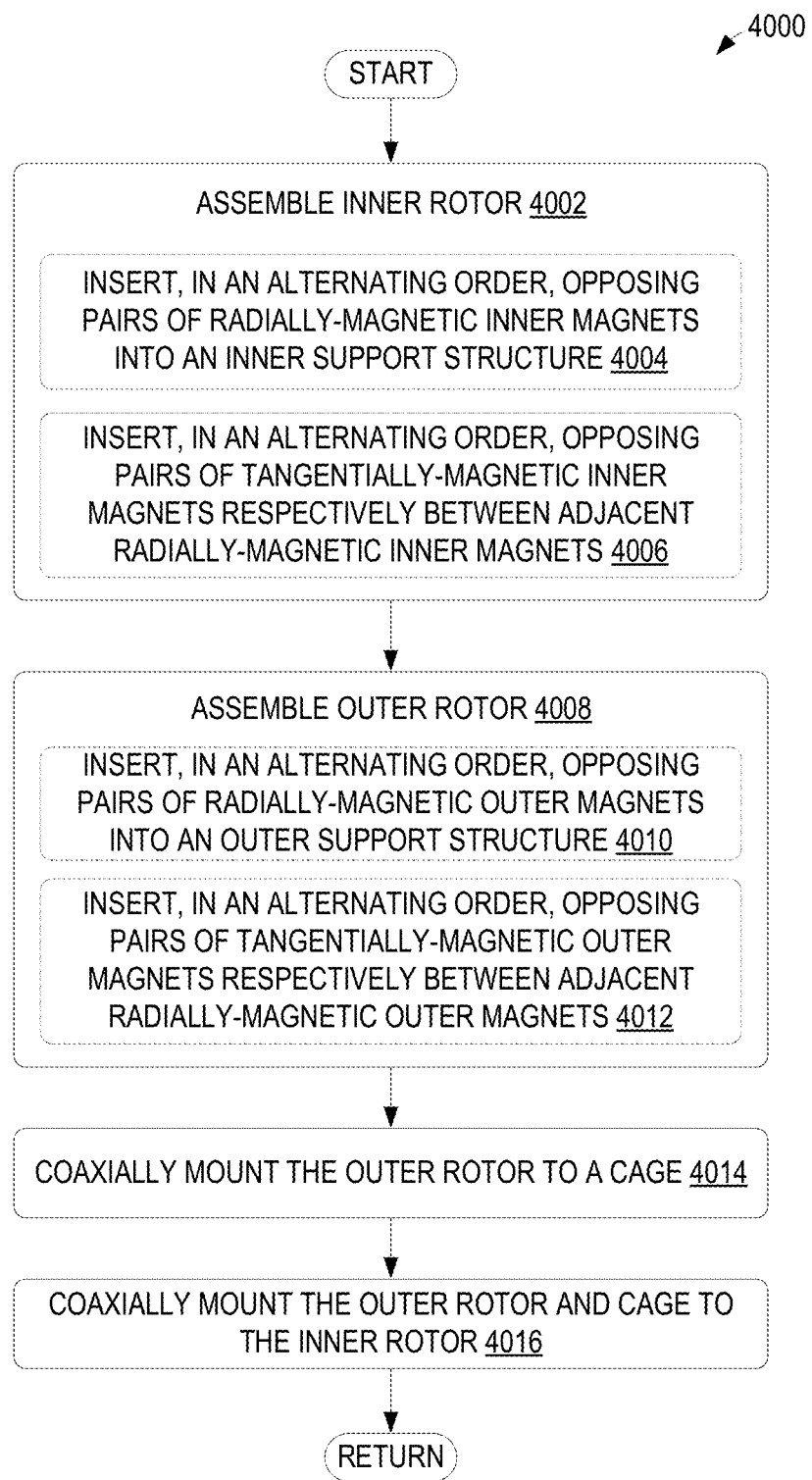
FIG. 40 is a flow chart of an example method of assembling a magnetic gear.

FIG. 40 is a flow chart of an example method 4000 of assembling a magnetic gear. For example, method 4000 may be used to assemble any of the magnetic gears described herein, such as magnetic gear 3700 of FIG. 37. At 4002, the method includes assembling an inner rotor of the magnetic gear. Assembling the inner rotor may include inserting, in an alternating order, opposing pairs of radially-magnetic inner magnets into an inner support structure, as indicated at 4004. Assembling the inner rotor may further include (e.g., after all radially-magnetic inner magnets are inserted according to 4004) inserting, in an alternating order, opposing pairs of tangentially-magnetic inner magnets respectively between adjacent radially-magnetic inner magnets, as indicated at 4006.

At 4008, the method includes assembling an outer rotor. Assembling the outer rotor may include inserting, in an alternating order, opposing pairs of radially-magnetic outer magnets into an outer support structure, as indicated at 4010. Assembling the outer rotor may further include (e.g., after all radially-magnetic magnets are inserted into the outer support structure according to 4010) inserting, in an alternating order, opposing pairs of tangentially-magnetic outer magnets respectively between adjacent radially-magnetic outer magnets, as indicated at 4012.

At 4014, the method includes coaxially mounting the outer rotor to a cage. At 4016, the method includes coaxially mounting the outer rotor and cage to the inner rotor (e.g., feeding the inner rotor into the outer rotor and cage assembly).

This disclosure has presented example configurations of a Halbach rotor magnetic gear for an MHK application and/or other applications that may utilize a magnetic gear. The presented Halbach rotor configurations are unique at least because the magnet arrangement provides tolerance-robustness and it both facilitates the assembly process and helps retain the magnets in place. An assembly approach for the Halbach rotors was also presented. A 2-D and 3-D FEA based design analysis was conducted and the calculated 3-D FEA torque and torque density were 227 N·m and 276.5 N·m/L respectively. The disclosure also includes further description of magnetic gear configurations and related analysis in the Further Example Implementations section below. It is to be understood that any of the features of the description, including those described in the Further Example Implementations section may be combined or otherwise used in combination without departing from the scope of the disclosure. For example, a magnetic gear in accordance with the disclosure may include any of the described inner, outer, and cage rotors, and the associated component features thereof, provided in any suitable combination.

In view of the many possible embodiments to which the principles of the disclosed invention may be applied, it should be recognized that the illustrated embodiments are only preferred examples of the invention and should not be taken as limiting the scope of the invention.

FURTHER EXAMPLE IMPLEMENTATIONS

Figure 41:
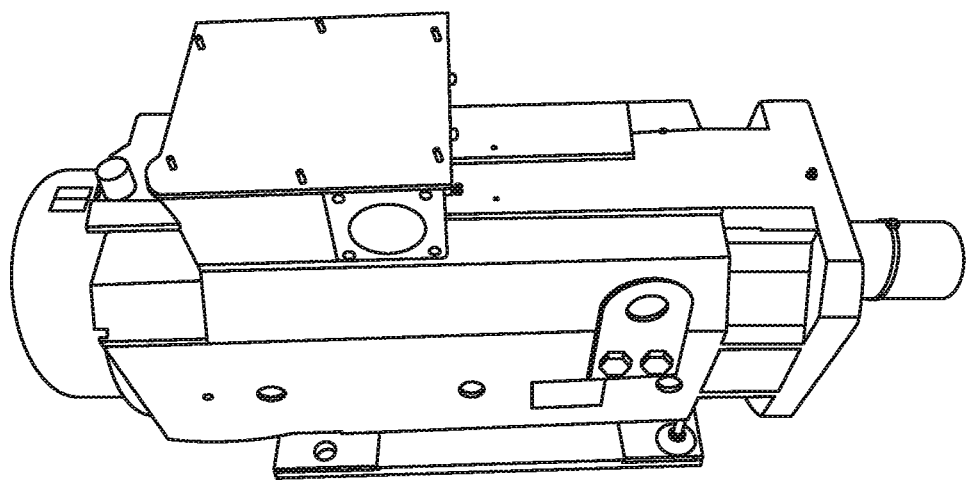
FIGS. 41-67 show example features of the configuration and experimental testing of an example multistage magnetic gear for a magnetically geared generator.
Figure 42:
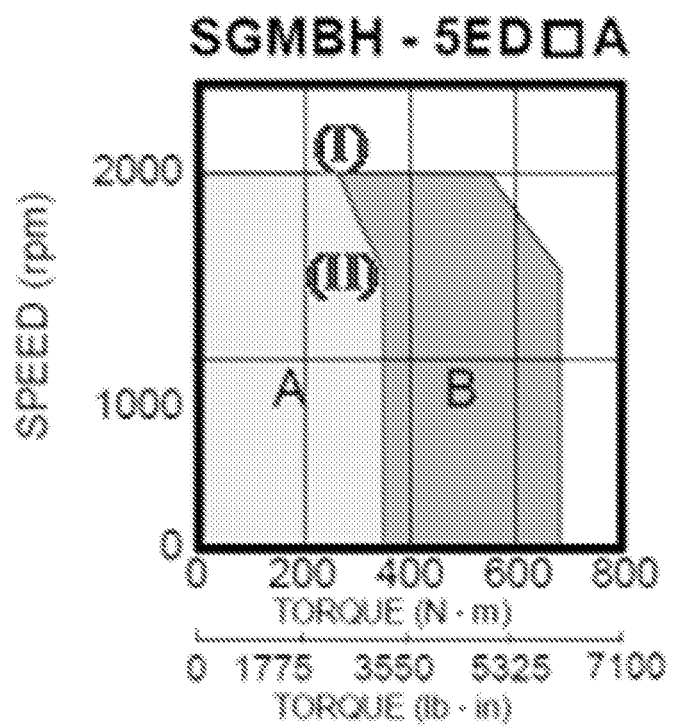

The Design and Experimental Testing of a 50 kW Multistage Magnetic Gear Marine Hydrokinetic Generator I. Design Requirement The permanent magnet generator that was selected to be used on the 50 kW MGG is shown in FIG. 41 (e.g., a YASKAWA 55 kW permanent magnet servo motor, SGMBH-5EDCAL). This generator was selected due to its cost and performance. The generator's torque-speed curve is shown in FIG. 42. FIG. 42 shows a torque-speed curve sheet for the PM servo generator (SGMBH-5EDCAL). The continuous operating region is marked as A and intermittent operating region is marked B. The rated operating knee points are noted as (I) 2000 r/min at 262 N·m and (II) at 1500 r/min at 350 N·m. The generator has a rated power of 55 kW. The generators specifications at rated conditions are shown in Table I. Based on the YASKAWA motor specifications the 50 kW magnetically geared generator (MGG) output speed going into the generator will be designed to be $T_4$=239 N·m at 2000 RPM. This therefore represents a de-rated of the generator operating condition by 9% (from 262 N·m to 239 N·m). Table II.

TABLE I

GENERATOR RATED VALUES

| Rated Specification | Value | Unit |
| --- | --- | --- |
| Rated power | 55 | kW |
| Rated speed | 1500 | r/min |
| Rated torque @ 1500 r/min | 350 | N · m |
| Rated torque @ 2000 r/min | 262 | N · m |
| Mass | 350 (772) | kg (lbs) |
| Mass torque density | 0.74 | N · m/kg |
| Volumetric torque density | 3.8 | N · m/L |
| Power density | 157 | W/kg |
| Outer diameter | 350 | mm |
| Axial length* | 684 | mm |

*excluding cooling fan

TABLE II

ASSUMED OPERATING SPECIFICATIONS

| | Design Specification | Value | Unit |
|---|---|---|---|
| Generator | Power | 50 | kW |
| | Rated speed | 2000 | r/min |
| | Torque | 239 | N · m |

In order to mate the generator to the multistage magnetic gear the two stage magnetic gear values shown below will be used. The stage 2 pole-combinations have been selected to be as shown in Table III and this gives a stage 2 gear ratio of $G_{45}$=7.66. Based on the requirements given in the stage 1 gear ratio must then be $G_{12} \geq 6.51$. The use of this gear ratio thereby requires that the input torque into the stage 2 MG needs to be $$T_5 = T_4 G_{45} = 1833 \text{N·m} \tag{1}$$

A safety factor defined as $$k_s = 1.2 \tag{2}$$

will also be used in this analysis. This will provide a design buffer so as to ensure that the torque requirements are met. This then results in the required input torque being $$T_5^{3D} = k_s T_5 \approx 2200 \text{N·m} \tag{3}$$

DESIGN REQUIREMENTS FOR 50 KW MAGNETICALLY GEARED GENERATOR

| | Requirement | Value | Unit |
|---|---|---|---|
| Input into Stage 1 | Input angular speed, $\omega_2$ | ≤40 | RPM |
| | Rated power | ≥50 | kW |
| | Input torque, $T_2$ | ≥11.93 | kN · m |
| | Output angular speed, $\omega_4$ | 2000 | RPM |
| | Efficiency | ≥93 | % |
| Generator | Torque ripple at ¼ load | ≤3 | % |
| | Input rotor torque, $T_4$ | ≥239 | N · m |
| | Required gear ratio, $G_{24}$ | ≥49.92 | — |

TABLE III

STAGE 2 GEAR POLE AND SLOT PARAMETERS

| Parameter | Value |
|---|---|
| Inner rotor pole-pairs, $p_4$ | 6 |
| Cage rotor slots, $n_5$ | 46 |
| Outer rotor pole-pairs, $p_6$ | 40 |
| Gear ratio, $G_{12} = n_5/p_4$ | 7.66 |
| Input rotor torque, $T_5$ | ≥1833 N · m |
| Output rotor torque, $T_4$ | ≥239 N · m |

I. 2-D Analysis for the Stage 2 Magnetic Gear

Figure 43:
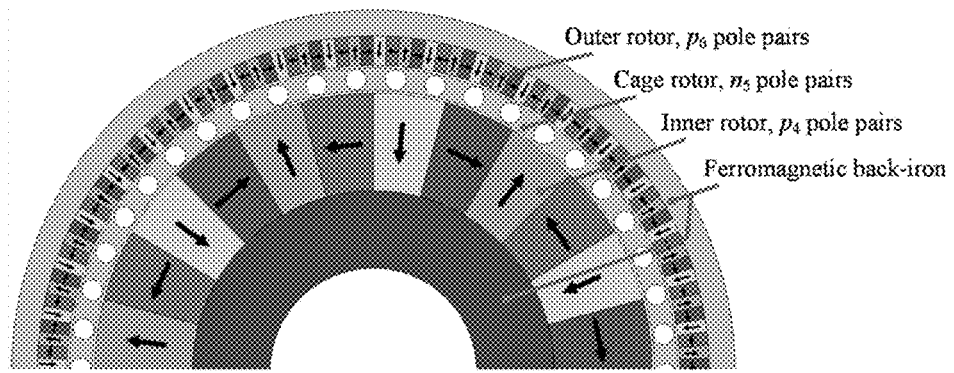
Figure 44:
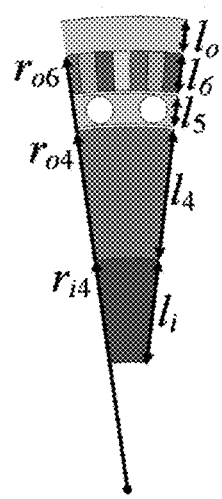

An illustration showing the Stage 2 MG design is shown in FIG. 43 and the geometric value definitions for the MG are shown in FIG. 44. For example, FIG. 43 shows a half-symmetry view of a Halbach rotor assembly with (p4,n5,p6)=(6, 46, 40). FIG. 44 shows example design variables. In order to reduce the computational burden, the stage 2 design analysis is initially conducted using 2-D finite element analysis (FEA). However, due to axial edge effects the 2-D models overestimate the actual torque values. Therefore, in the following the edge effect factor defined as $$k_d = T_5^{3D}/T_5^{2D} = 0.85 \tag{4}$$

will be used.

This will be applied so as to mitigate design risk associated with material and modeling uncertainty. Utilizing this edge effect factor the required 2-D calculated torque must then be $$T_5^{2D} = \frac{1}{k_d} T_5^{3D} = \frac{1}{0.85} 2200 = 2587 \, N \cdot m \tag{5}$$

Figure 45:
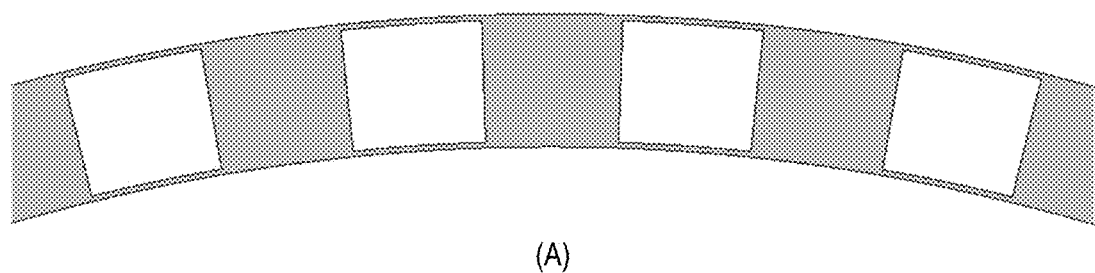
Figure 45:
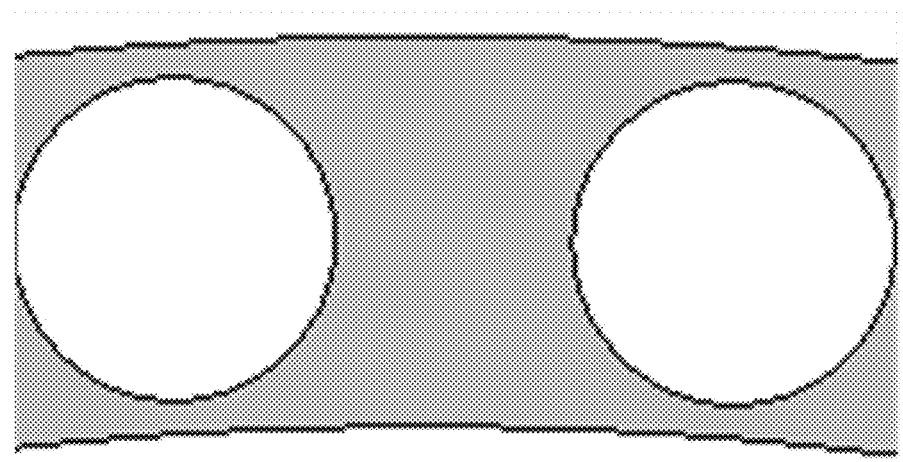

In this analysis the cage rotor will be made up of circular rods rather than rectangular rods, the difference between the two is illustrated in FIG. 45. FIG. 45 shows at (a) a rectangular rod, and at (b) a circular rod. This greatly reduces the end-plate cost and does not greatly reduce the torque relative to the rectangular design. It also improves the structural deflection performance. In order to reduce cost further the cage rod diameter support, $d_c$, will be limited to the rod sizes as specified in Table IV. These are off-the-shelf Garolite, G11, rods sizes. Replacing rectangular rod with cylindrical rods adds a new constraint since the cage rods can no longer have a greater angular width than radial length. The rod size affects the cage rotor angular pole span. The cage rotor length is specified as $$l_5 = d_c + 2l_b \tag{6}$$

where $d_c$=cage rotor rod diameter and $l_b$=0.5 mm cage rotor bridge thickness. This is the minimum bridge thickness that can be manufactured. Note that the outer rotor inner radius, $r_{i6}$, and inner rotor outer radius, $r_{o4}$, are related by $$r_{i6} = r_{o4} + 2g + l_5 \tag{7}$$

Therefore in this analysis the following four dependent parameters will need to be investigated:
(a) Inner rotor inner radius, $r_{i4}$
(b) Inner rotor outer radius, $r_{o4}$
(c) Cage slot radial length, $l_5$
(d) Outer rotor radius, $r_{o6}$

TABLE IV

SWEEP PARAMETERS

| Description | Sweep values [mm] |
|---|---|
| Inner radius, $r_{i4}$ | 50 |
| Inner rotor radial length, $l_4$ | [25, 28, . . . , $r_{o3}$ − $r_{i1}$ − 18] |
| Cage rod diameter, $d_c$ | 5/16, 3/8, 7/16, 1/2 |
| Cage bar length, $l_5$ | [8.94, 10.53, 12.11, 13.70, 16.88] |
| outer radius, $r_{o6}$ | [120, 130, 140, 150] |
| Inner and outer airgap, g | 0.8 |
| Cage rotor bridge thickness, $l_b$ | 0.5 |
| Axial length, d | 100 |

A. Maximizing Volumetric Torque Density

In the following analysis the volumetric torque density is first maximized this is achieved by keeping the inner radius of the inner rotor fixed at:

$$r_{i4} = 50 \text{ mm} \tag{8}$$

This results in the inner rotor magnet length being quite large (a minimum of $l_4$=45 mm). This then reduces the number of important parameters that influence the torque to just three, namely ($r_{o4}$, $l_5$, $r_{o6}$). Note that the influence of $r_{i4}$ on torque will be considered in the mass torque density analysis.

Figure 46:
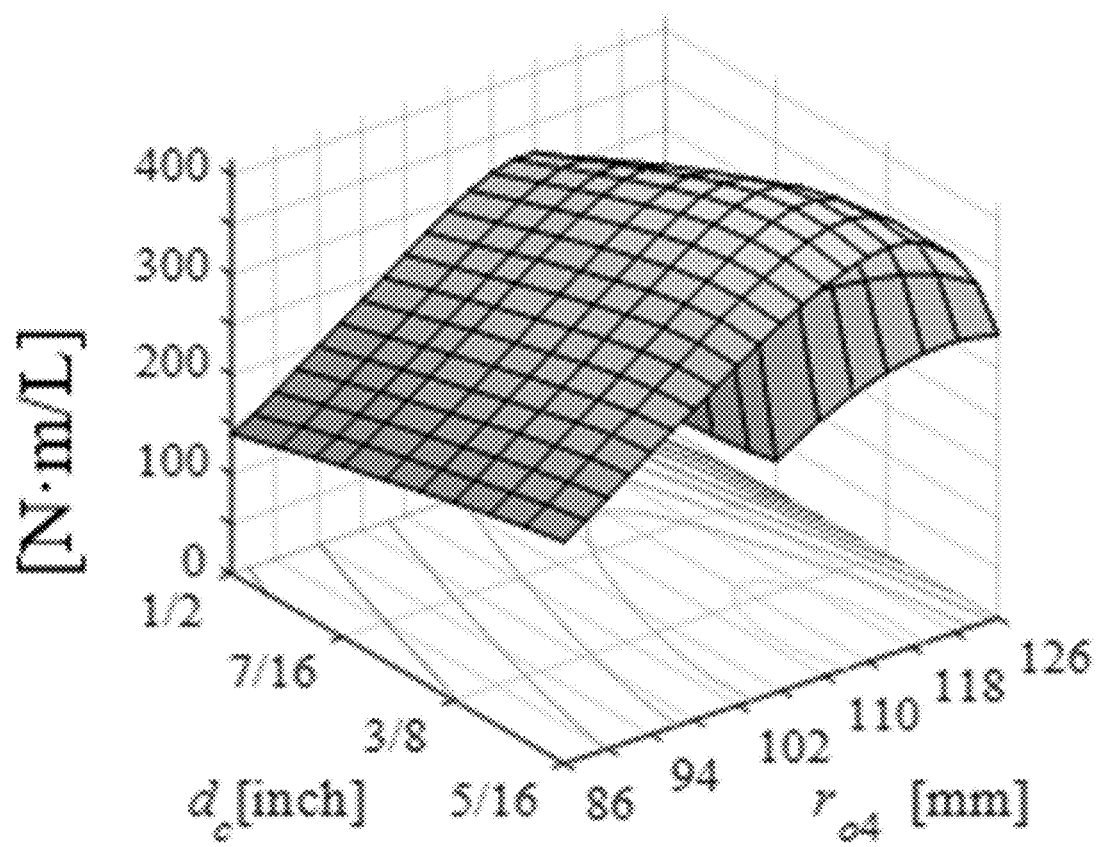

If $r_{o6}$ is held fixed at $r_{o6}$=140 mm then by varying the cage rotor length, $l_5$, and inner rotor outer radius, $r_{o4}$, the plot in FIG. 46 (showing a torque density plot for ($r_{i4}$, $r_6$)=(50, 140)) can be created an overlay showing the feasible values for the $l_5$ lengths that correspond to the cage rod sizes is also shown.

Figure 47:
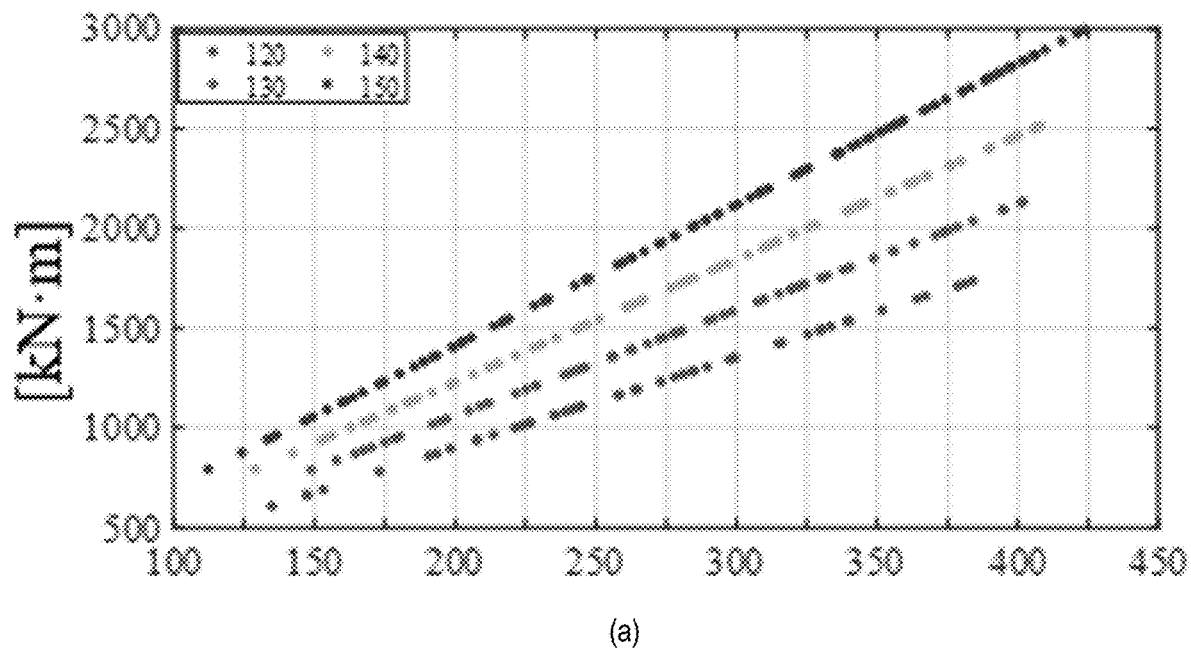
Figure 47:
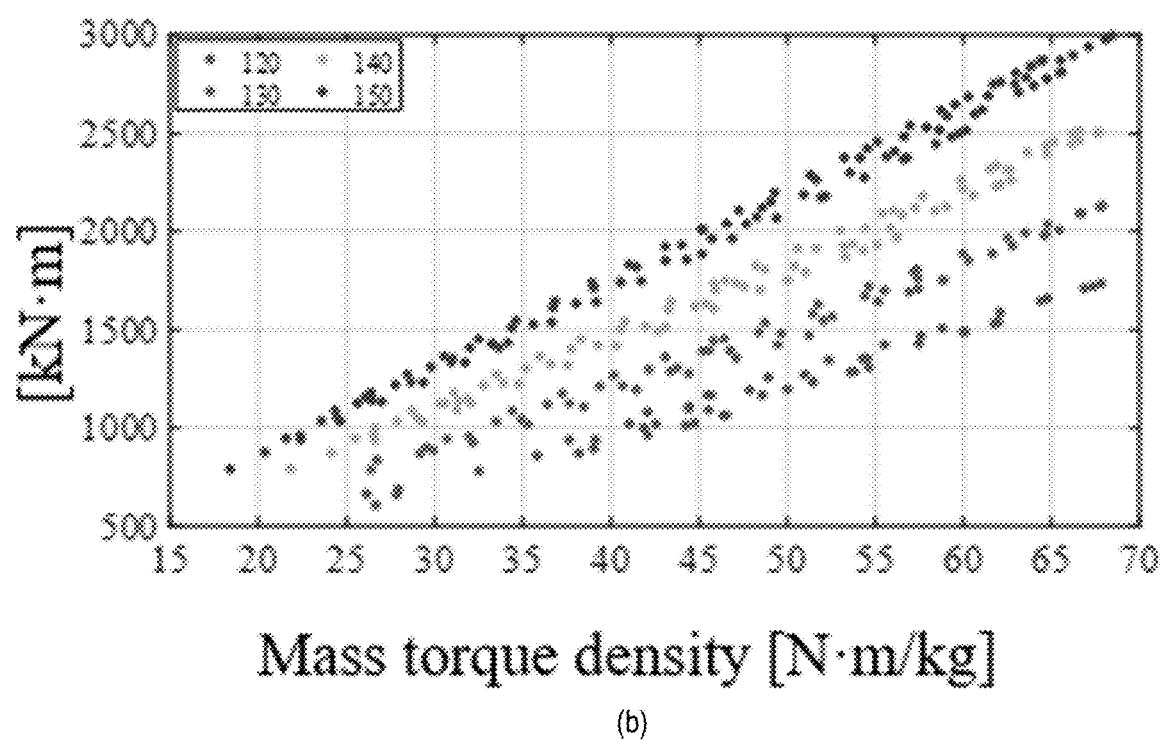

From FIG. 46, it can be seen that the peak volumetric torque density occurs within the region surrounding by yellow contour. The same analysis as shown in FIG. 46 was repeated for the other outer radius, $r_{o6}$ values and possible cage bar length values. The resulting torque and torque density plots for these other cases are shown in FIG. 47. FIG. 47 shows 2-D calculated (a) torque vs. volumetric torque density and (b) torque vs. mass torque density for different $r_{o3}$ when both the cage bar length, $l_5$, and inner rotor outer radius, $r_{o4}$, were both varied across the values shown in Table IV.

TABLE V

MAXIMUM TORQUE DENSITY VALUE [NM/L] BASED ON SWEEP ANALYSIS

| $d_c$ | Outer radius, $r_{o6}$ [mm] | | | |
|---|---|---|---|---|
| [inch] | 120 mm | 130 mm | 140 mm | 150 mm |
| 5/16 | 383.7 | 401.7 | 408.1 | 406.2 |
| 3/8 | 340.2 | 378.4 | 406.5 | 423.8 |
| 7/16 | 289.4 | 330.2 | 367.4 | 397.8 |
| 1/2 | 235.6 | 277.6 | 320.3 | 356.1 |

TABLE VI

OPTIMAL CAGE AND INNER ROTOR OUTER RADIUS LENGTH ($L_4$, $R_{o4}$)

| $d_c$ | Outer radius, $r_{o6}$ [mm] | | | |
|---|---|---|---|---|
| [inch] | 120 mm | 130 mm | 140 mm | 150 mm |
| 5/16 | (48, 98) | (58, 108) | (66, 116) | (76, 126) |
| 3/8 | (48, 98) | (56, 106) | (66, 116) | (74, 124) |
| 7/16 | (46, 96) | (54, 104) | (64, 114) | (72, 122) |
| 1/2 | (46, 96) | (54, 104) | (62, 112) | (72, 122) |

Table V shows that only designs with an outer radius $r_{o6}$ larger than 150 mm can have a reasonable performance by larger rod size. So in order to limit the outer radius to 140 mm, the study will be proceeded by the rod size of 5/16 and 3/8.

B. Maximizing Mass Torque Density

Figure 48:
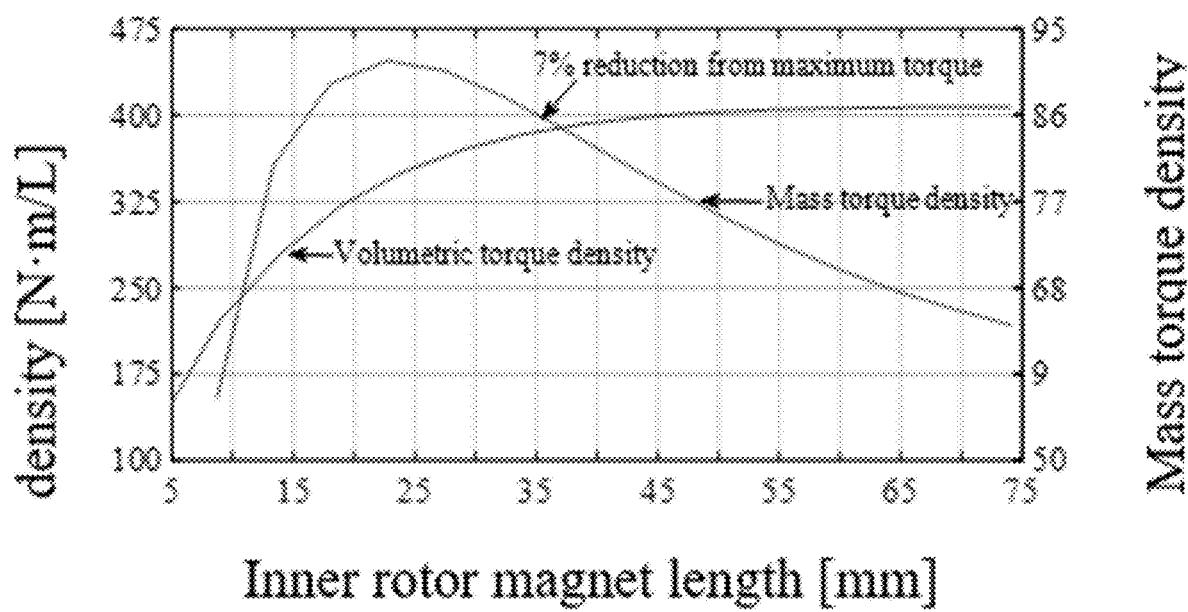

Before running the 3-D analysis, the $r_{i4}$ should be finalized. Based on previous experience, having a long inner rotor magnet does not benefit the torque and reduces the mass torque density after a specific length. FIG. 48 shows this by performing a trade-off analysis between volumetric and mass torque density for the case when $r_{o6}$=140 mm. While we are interested in a larger mass torque density, we try to not decrease the volumetric torque density less than 93% of its maximum value. Reduction in volumetric torque density (torque value) results in increasing the axial length which is not desirable. Later, we calculate the required axial length for maximum mass torque density design and will compare it to the above-mentioned approach.

Figure 49:
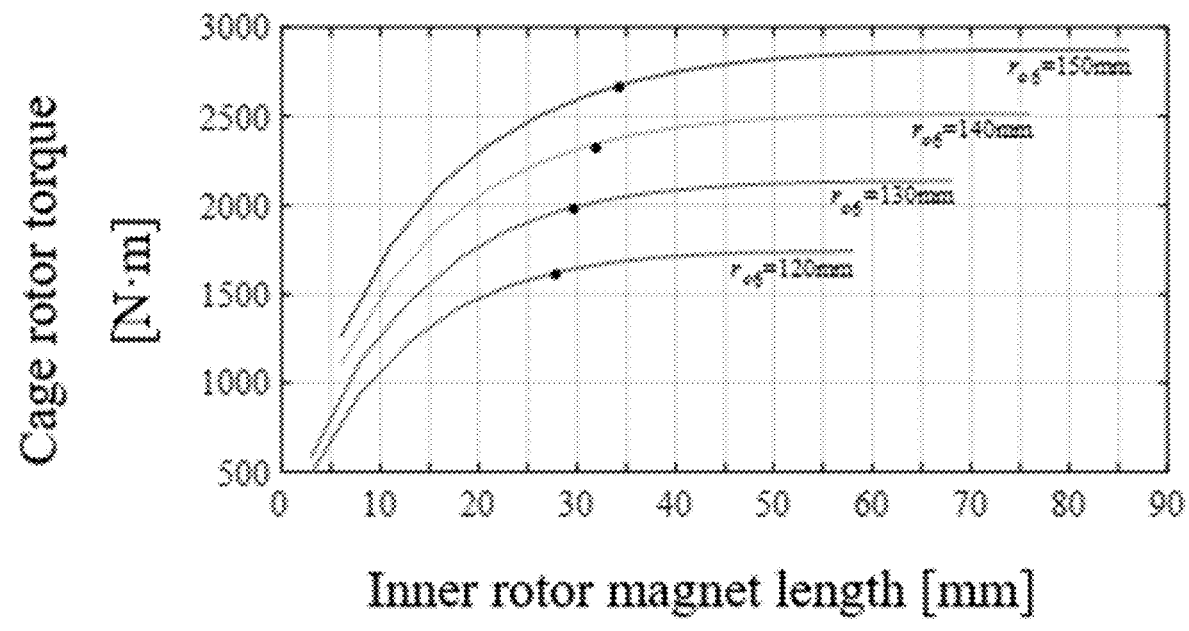
Figure 49:
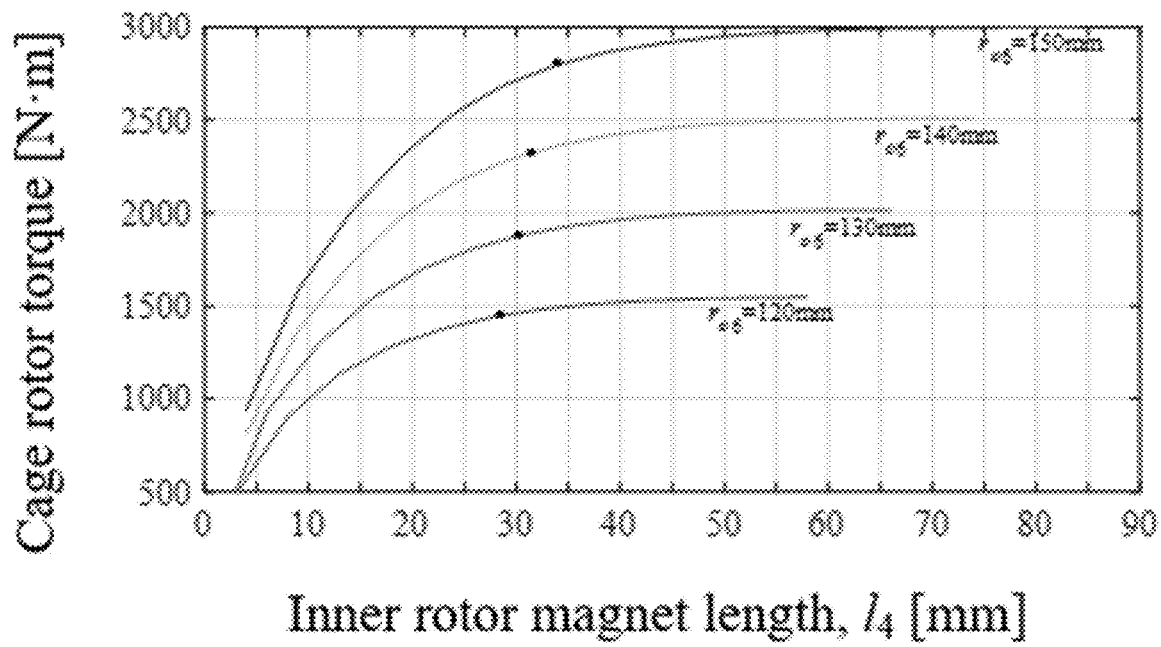

To have a better insight on how magnet length affects the torque, a plot of the volumetric torque density versus inner rotor magnet radial length, $l_4$ was created for each outer rotor radius. The value of $r_{o4}$ was kept fixed. FIG. 49 (a) and (b) show the analysis results for both the $d_c$=5/16 and $d_c$=3/8 case respectively. For example, FIG. 49 shows cage rotor torque vs inner rotor magnet length, $l_4$ for four different outer radii, $r_{o6}$ when (a) $d_c$=5/16 and (b) when $d_c$=3/8 inch.

It can be noted that the torque improvement greatly diminishes when the inner rotor magnet length becomes smaller than 25 mm. The selected magnet length values, $l_4$ for each outer rotor radius are marked with a dot and this magnet length gives 93% of the maximum volumetric torque density. This was selected based on the increased rate of torque reduction after this point, in a similar way that a signal to a low pass filter attenuates after crossover frequency. The 2-D geometric parameters are shown in Table VII.

TABLE VII

DESIGN OPTIONS - 3-D RESULT CONSIDERING SAFETY FACTOR OF 1.2

| $r_{o6}$ [mm] | $d_c$ [inch] | $r_{i4}$ [mm] | $l_4$ [mm] | Axial length [mm] | Torque density [N · m/L] |
|---|---|---|---|---|---|
| 120 | 5/16 | 70 | 28 | 147 | 330.8 |
|  | 3/8 | 70 | 28 | 164 | 296.5 |
| 130 | 5/16 | 78 | 30 | 122 | 339.6 |
|  | 3/8 | 78 | 30 | 130 | 318.7 |
| 140 | 5/16 | 84 | 32 | 104 | 343.5 |
|  | 3/8 | 84 | 32 | 105 | 340.2 |
| 150 | 5/16 | 92 | 34 | 95 | 327.6 |
|  | 3/8 | 92 | 34 | 92 | 338.3 |

II. 3-D Analysis

Using 3-D analysis Table VII shows the required axial length and corresponding torque density that meets the 3-D torque value, defined by Equation (3). The $r_{o6}$=130 mm and $r_{o6}$=140 mm radial were selected for further analysis. The $r_{o6}$=120 mm designs was not selected because it requires a very long axial length and the $r_{o6}$=150 mm design was not selected because it results in a lower torque density without reducing the axial length significantly enough relative to the 140 mm design. Using a larger outer diameter will also add to the construction cost. These values are summarized graphically in FIG. 49.

Figure 50:
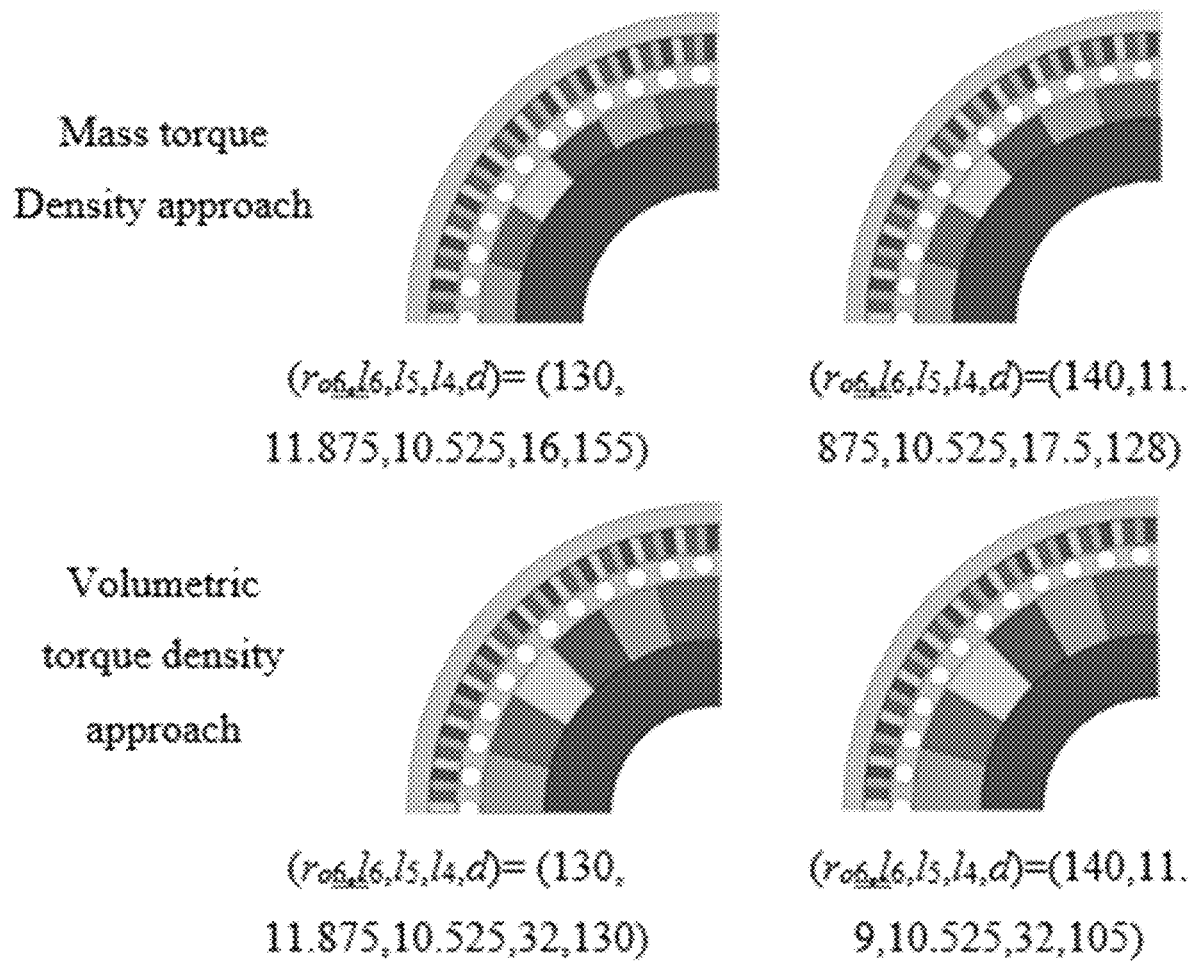

FIG. 50 shows the required axial length based on two approaches, targeting the maximum mass torque density or volumetric torque density. It proves that the taken approach (maximizing the volumetric torque density) gives the best result.

III. A Two Section Magnetic Gear

Figure 51:
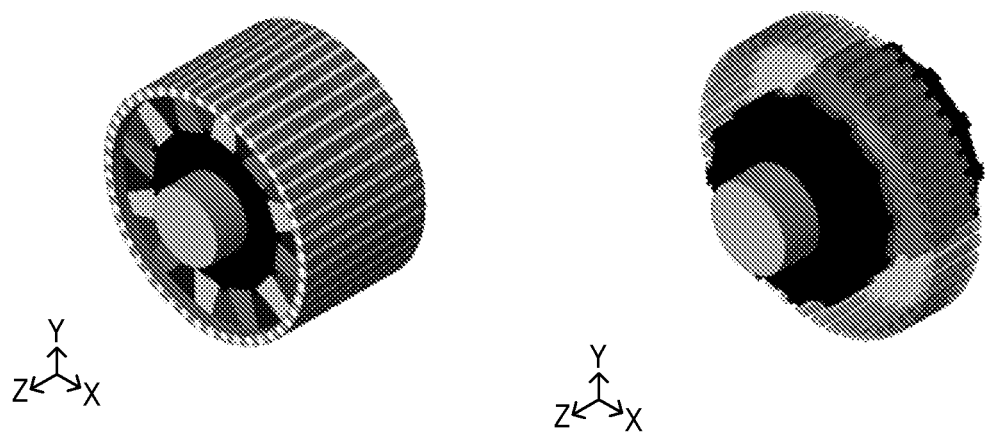

As the magnetic gear axial length increases, it increases the eddy current loss within the magnets and makes the magnets more expensive and difficult to manufacture. The cage rotor is also expected to have higher deflection. The idea is having a two section magnetic gear. That makes magnet axially shorter, less expensive and easier to manufacture and cut the eddy current losses within the magnet. It also makes it possible to have an additional cage support in the middle, as shown in FIG. 51. For example, FIG. 51 shows a two section magnetic gear, showing just inner and cage rotor and additional cage support between two sections.

There is a trade-off between axial force exerted on each section and the produced torque. The maximum total torque happens at minimum distance between the sections, but it results in having a large axial force.

Figure 52:
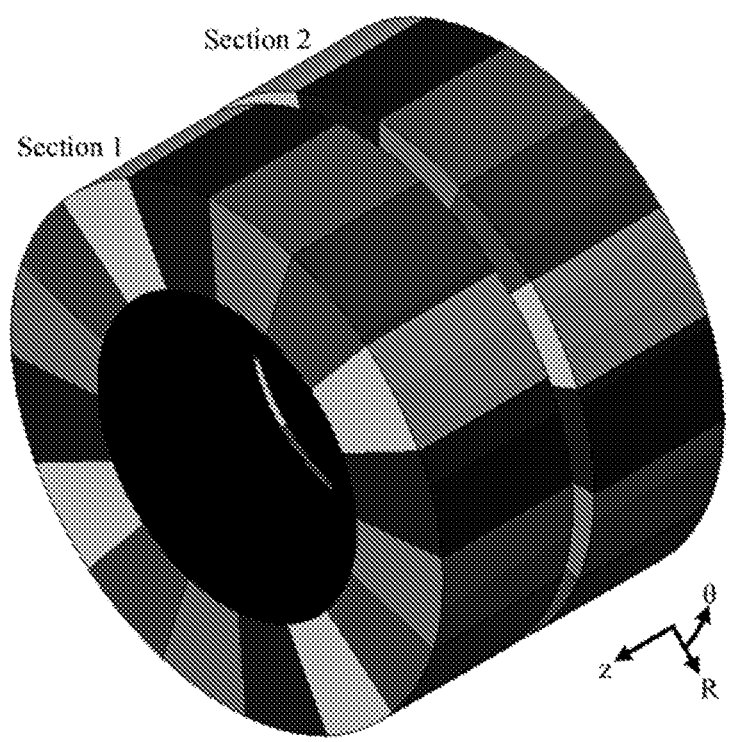
Figure 53:
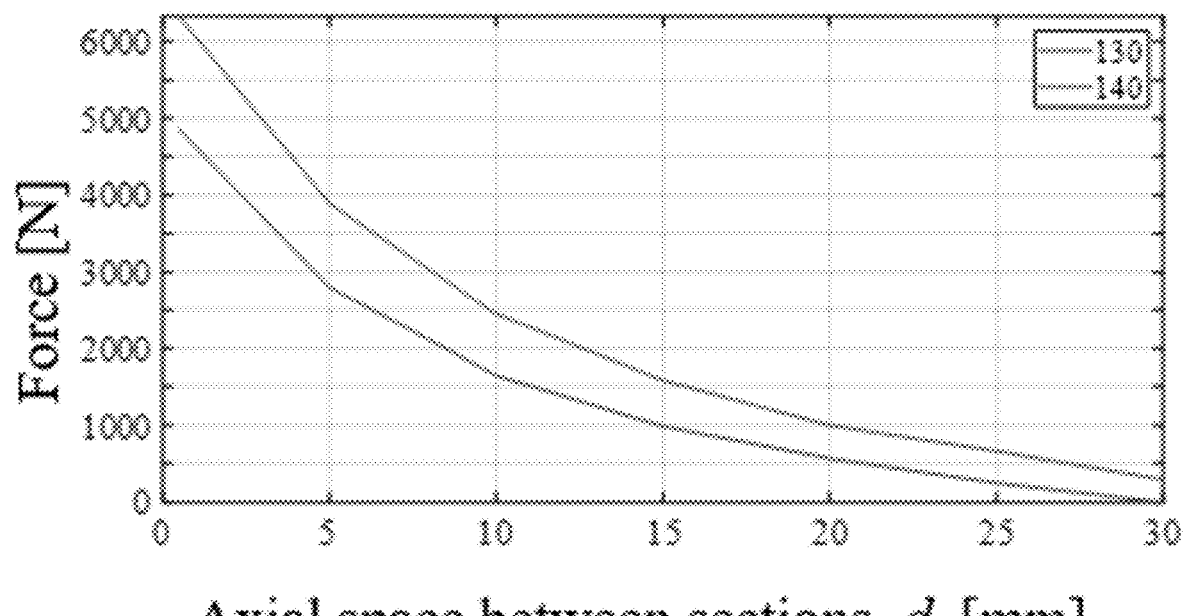

The inner rotors experience the highest axial force in compare to other rotors, so we just look at inner rotor axial force. FIG. 53 (depicting the force between inner rotor segments versus axial space between them, where the legend shows the MG outer radius corresponding to each inner rotor) shows how the axial force changes for different axial distance between two inner rotors shown in FIG. 52 (showing two inner rotors at distance $d_s$). In this model, just the inner rotors are considered. Note that if two MGs were fully assembled with associate cage and outer rotors, the interacting force between the two inner rotors would decrease. Such is caused by magnetic field were mainly concentrating toward radially to cage rotors instead of axially due to smaller air gap.

Figure 54:
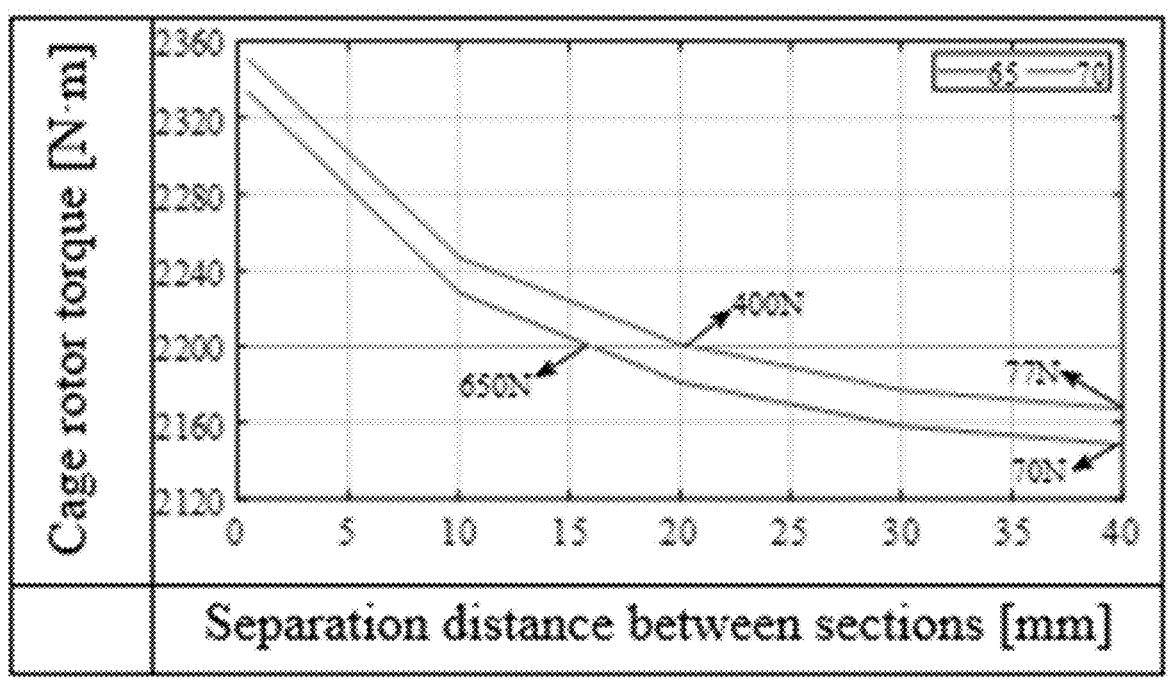

Following 3-D analysis result shows how the torque and axial force on the inner rotors change versus axial space between sections, $d_s$ for both designs with $r_{o6}$=130 mm and 140 mm. FIG. 54 shows torque versus separation distance between segments. The legend shows the axial length of each segments for $r_{o6}$=130 mm. The gray line at 2200 N·m shows the torque requirement.

From FIG. 54, for $r_{o6}$=130 mm, the maximum allowable axial separation between sections is 20 mm which results in an axial force of 400N. Increasing the $d_s$ (to make more room for additional cage support and reduce the axial force) leads to an axial length larger than 70 mm, possibly 75 mm.

Figure 55:
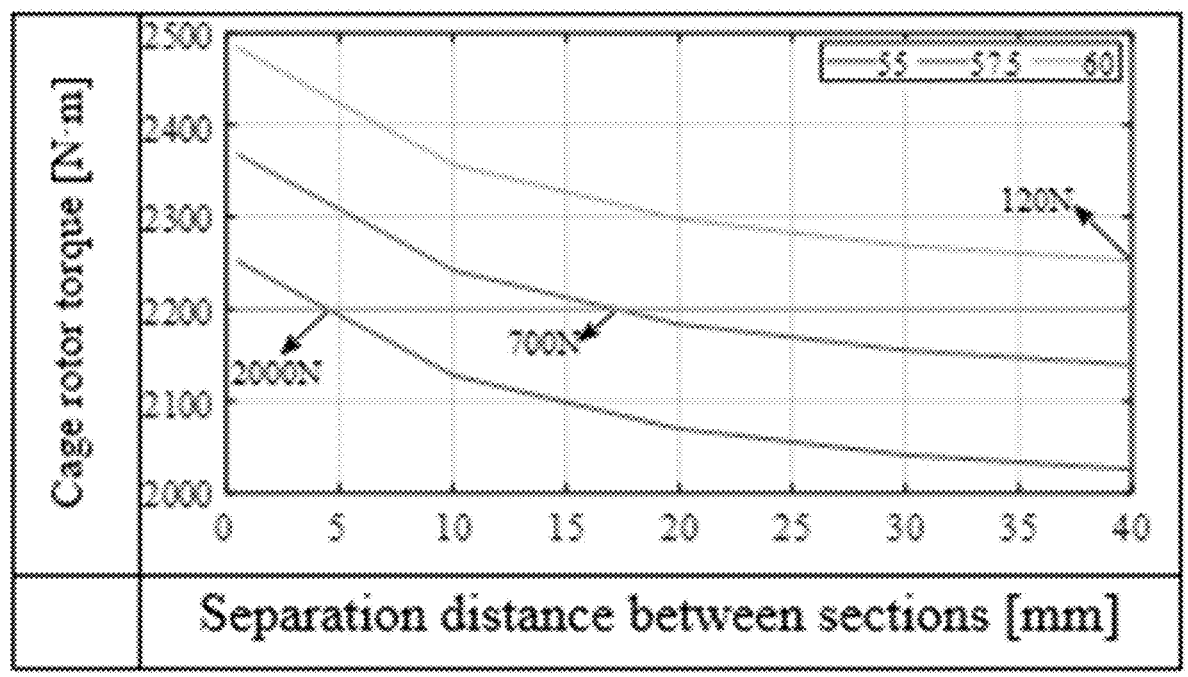

For $r_{o6}$=140 mm, the axial force on each inner rotor is 120N by using two segments of 60 mm each at separation distance of 40 mm. This design satisfies both the torque requirement, addresses axial force issue and has smaller active axial length while provide enough space for middle cage support. FIG. 55 shows torque versus separation distance between segments. The legend shows the axial length of each segments for $r_{o6=140}$ mm. The gray line at 2200 N·m shows the torque requirement.

IV. Cage Rotor Design

Figure 56:
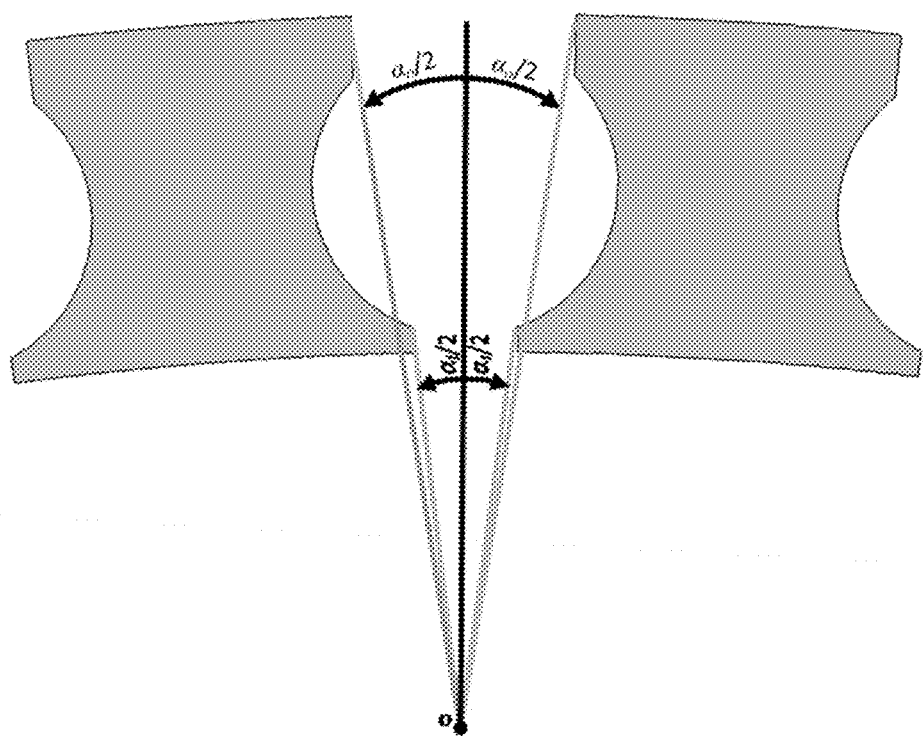

The cage rotor bridges have a huge impact on the magnetic performance of the MG. FIG. 56 shows the inner and outer opening angle between steel pieces of the rotor. An angle of zero means that two pieced are connected. (Bridged design).

Figure 57:
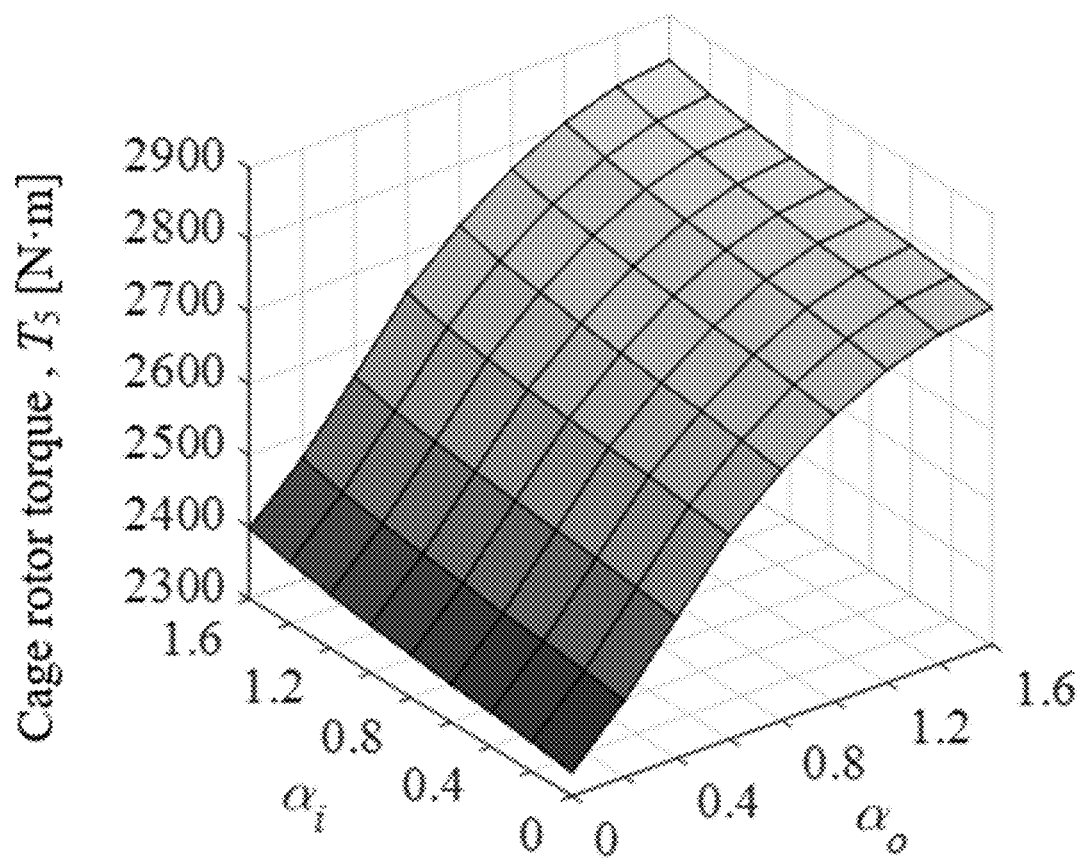
Figure 58:
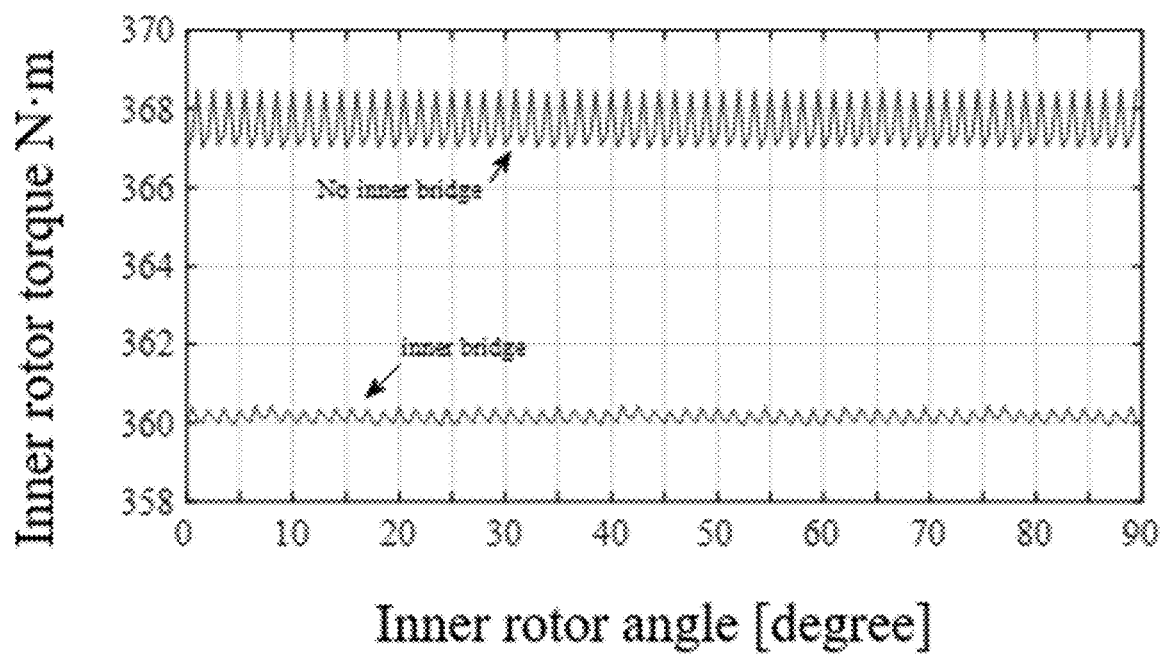

FIG. 57 shows how the opening angles affect the torque of the design with $r_{o6}$=140 mm. interestingly, the inner opening angle, $\alpha_i$ does not affect the torque amplitude as much as the outer opening angle, $\alpha_o$. If we also consider FIG. 58, which shows a torque ripple comparison for having/not having bridge on the inner side (2D FEA −100 mm axial length), having an inner bridge can greatly improve the torque ripple, so we decided to have the inner bridge, $\alpha_i$=0°.

Figure 59:
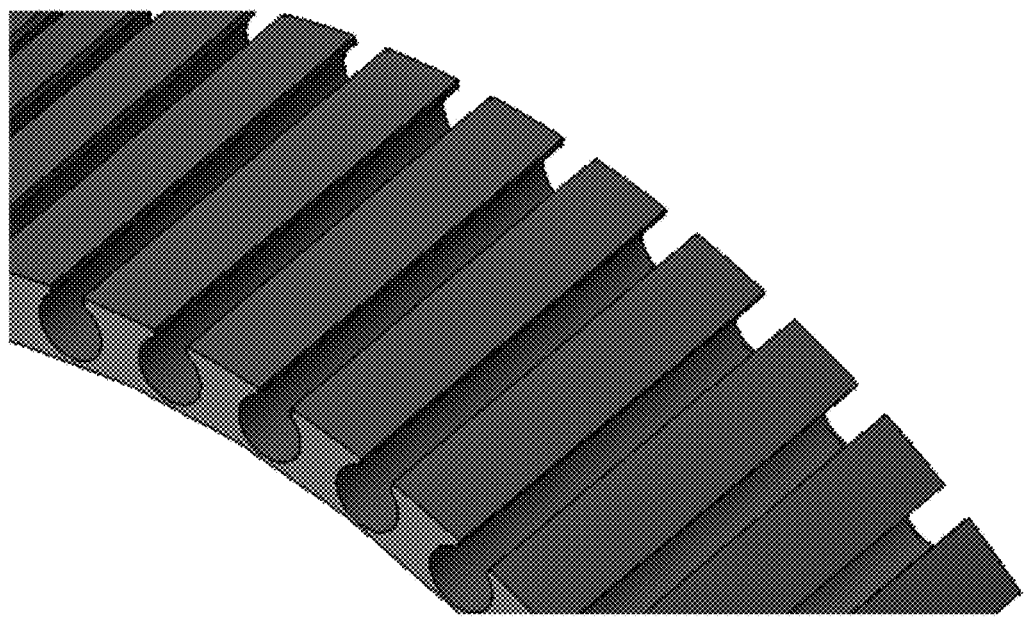

The outer opening angle plays an important role to hold the cage rotor rods at their position. Smaller angle results in longer lips and having more support to hold the cage rods. Based on FIG. 57, after $\alpha_o$=1.2° the torque does not benefit from increasing the angle, so we select the inner and outer angle as $(\alpha_i, \alpha_o)$=(0, 1.2), shown in FIG. 59.

A. Two Separated Section Design

Figure 60:
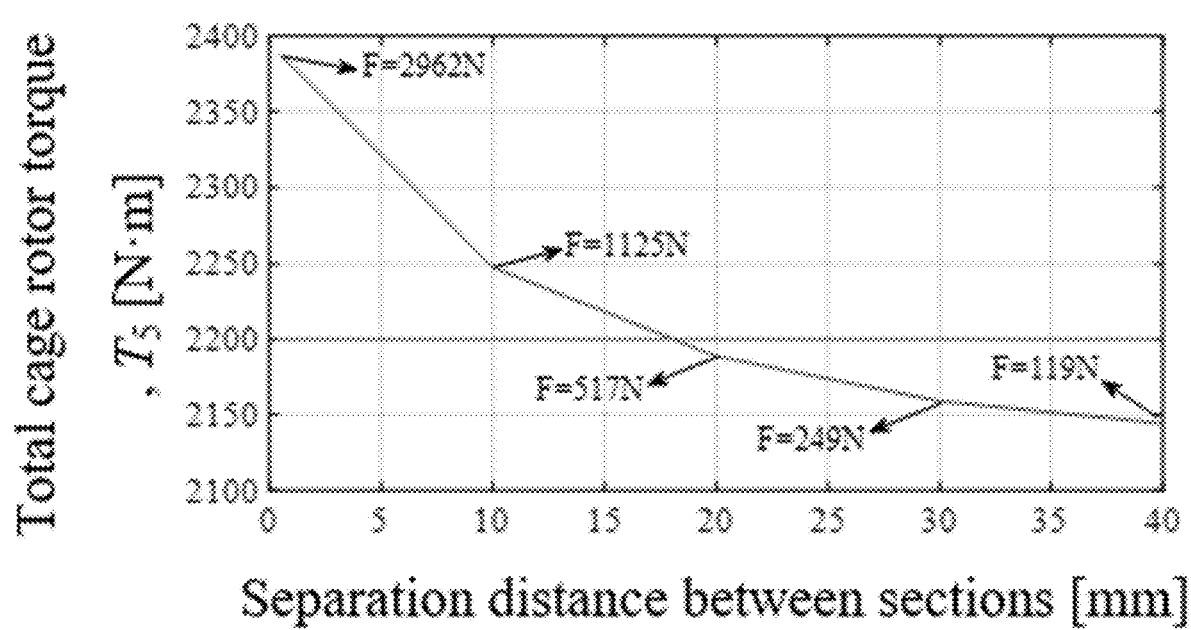

FIG. 60 shows the total cage rotor torque along with the axial force on each inner rotor for the design with $r_{o6}$=140 mm and axial length of 50 mm for each section for a design with two separated section design shown in FIG. 51.

Based on FIG. 60 the separation distance of 18 mm results in an axial force of 600N. In order to increase the separation distance to 40 mm (to reduce the axial force and make room for cage support), the each section axial length needs to be increases from 50 mm to 51 mm.

Figure 61:
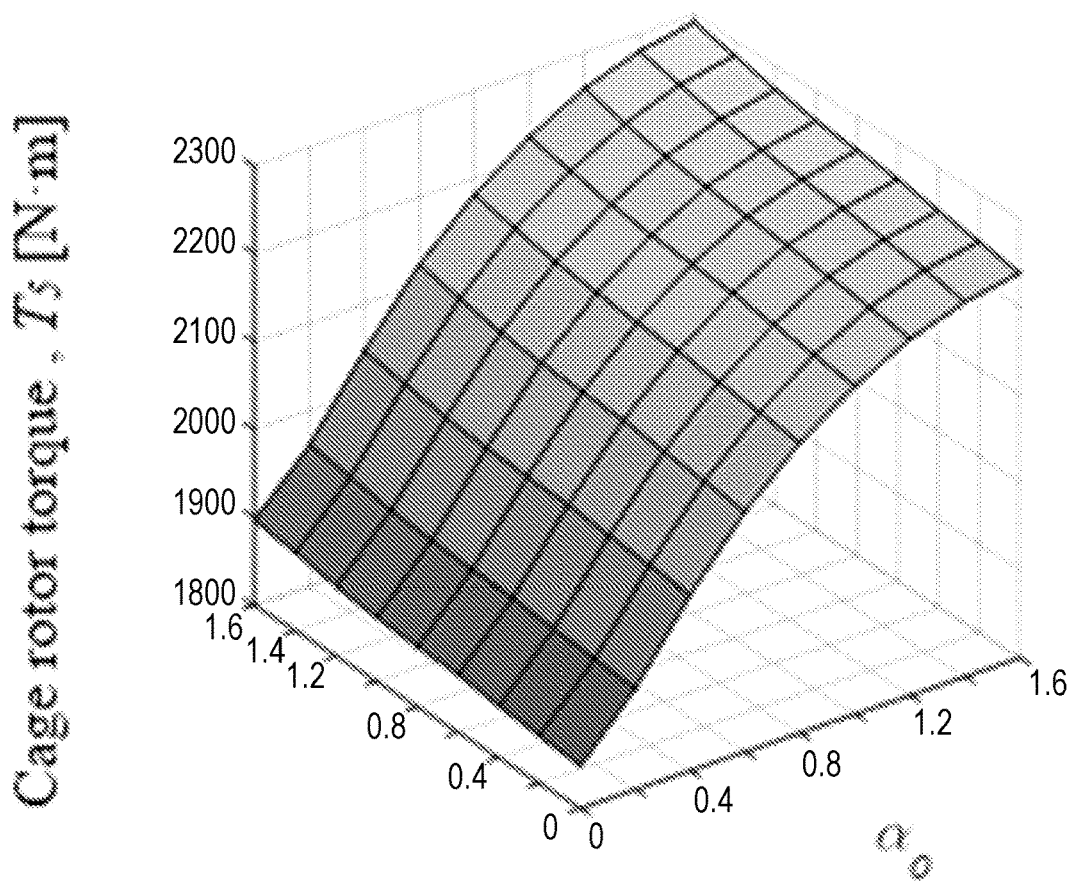

Performing the same analysis for $r_{o6}$=130 mm, based on FIG. 61, which shows torque versus opening angles for the design with $r_{o6}$=130 mm (2D FEA −100 mm axial length), the inner opening angle is selected to be zero (having inner bridge) and the outer opening angle is 1.2° as the torque is almost constant after that angle.

Figure 62:
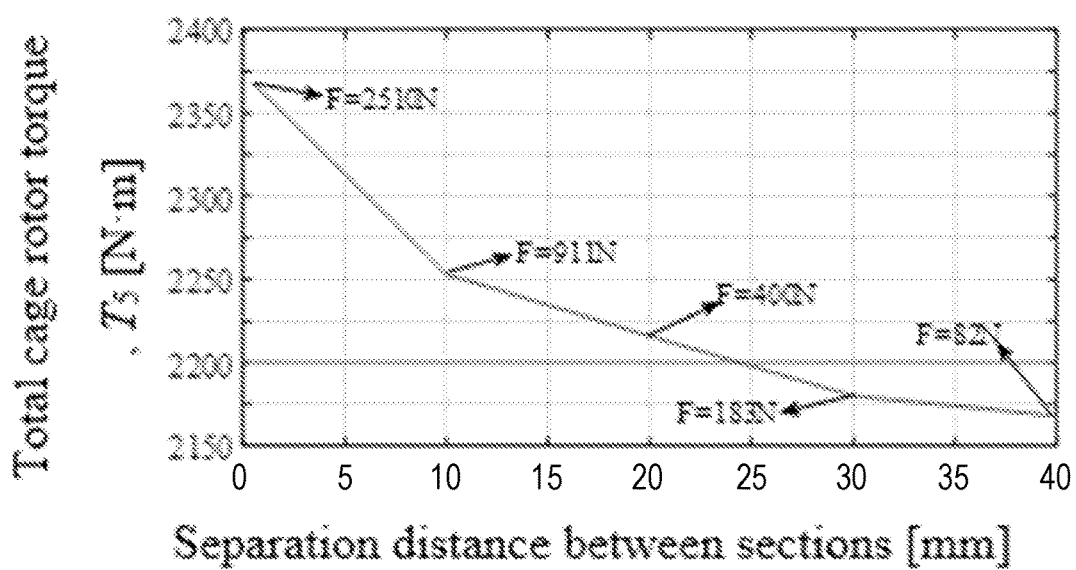

FIG. 62 shows the total cage rotor torque along with the axial force on each inner rotor for the design with $r_{o6}$=130 mm and axial length of 60 mm for each section.

Based on FIG. 62 the separation distance of 24 mm results in an axial force of 300N. In order to increase the separation distance to 40 mm (to reduce the axial force and make room for cage support), the each section axial length needs to be increases from 60 mm to 62 mm.

B. Two Segment Magnet Design

Having the cage rotor with bridges only on one side improves the torque and let the axial length to be smaller. The main constraint for a large axial length design is the cage rotor deflection and eddy current loss and manufacturing limits for the magnets.

Figure 63:
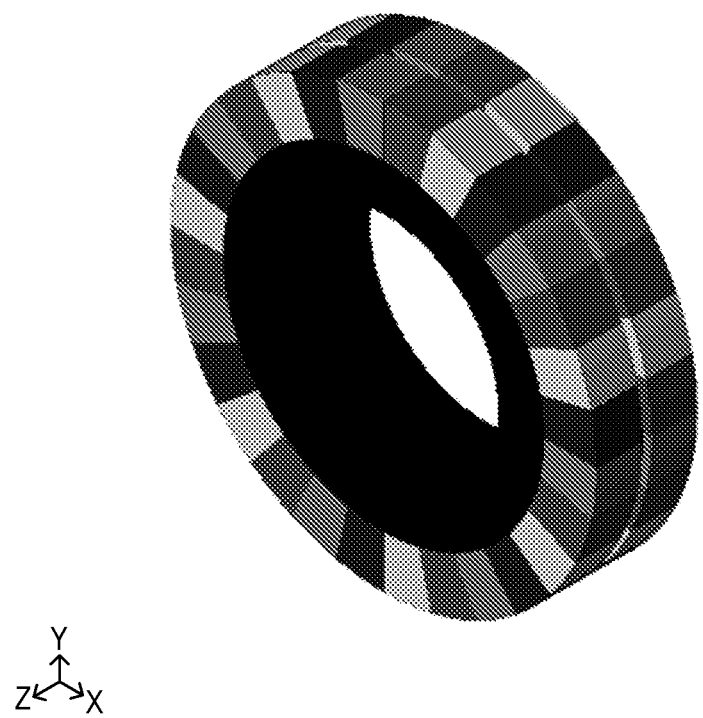

Assuming no deflection issue for the cage rotor, the magnet rotors can be made by segmenting the magnets. As the inner rotor magnets are not completely separated and will not be assembled as two separate rotors, the axial force between two fully assembled rotors will reduce to the axial force between two individual magnets. An axial space between magnets will be considered to limit the axial force, Assembling the rotor shown in FIG. 63, which shows a two segment magnet configuration with 10 mm distance between magnets, requires some studies to investigate the best magnet assembly sequence. The inner rotor back iron makes the radially inward force more dominant rather than axial force for each individual magnets which helps with sticking each magnet on its designated position. Considering this design, the FIG. 60 shows a 10 mm span between magnets segments and 49 mm magnet axial length can satisfy the torque requirement.

V. Design Options

All to all, we have the following options. The rod size is selected to be ⅜ inches for all designs.

| Design | Description | $r_{o6}$ [mm] | d [mm] | $T_d$ [N · m/L] |
|---|---|---|---|---|
| A | One section (cage fully bridged) | 130 | 130 | 318 |
|   |  | 140 | 105 | 340 |
| B | Two sections (cage fully bridged) | 130 | 150 | 276 |
|   |  | 140 | 120 | 304 |
| C | Two sections (bridges on one side) | 130 | 124 | 334 |
|   |  | 140 | 102 | 350 |
| D | Two segment magnet (bridges on one side) | 130 | 118 | 351 |
|   |  | 140 | 98 | 364 |

| Design | Torque density | Magnet loss & manufacturability | Cage deflection | Assembling axial force |
|---|---|---|---|---|
| A | medium torque density | High loss and difficult to manufacture | Possible cage rotor deflection | Not applicable |
| B | Low torque density | Medium loss, possible manufacturing problem | No issue | High axial force |
| C | High torque density | Low loss, easy to manufacture | No issue | High axial force |
| D | High torque density | Low loss, easy to manufacture | Possible cage rotor deflection | Not applicable |

Among these options, the design C and D have the best performance. If the design D passes the deflection test, that would be the best option, if not, the design C with $r_{o6}$=140 mm will be selected as the second best design.

VI. Design Realization

Figure 64:
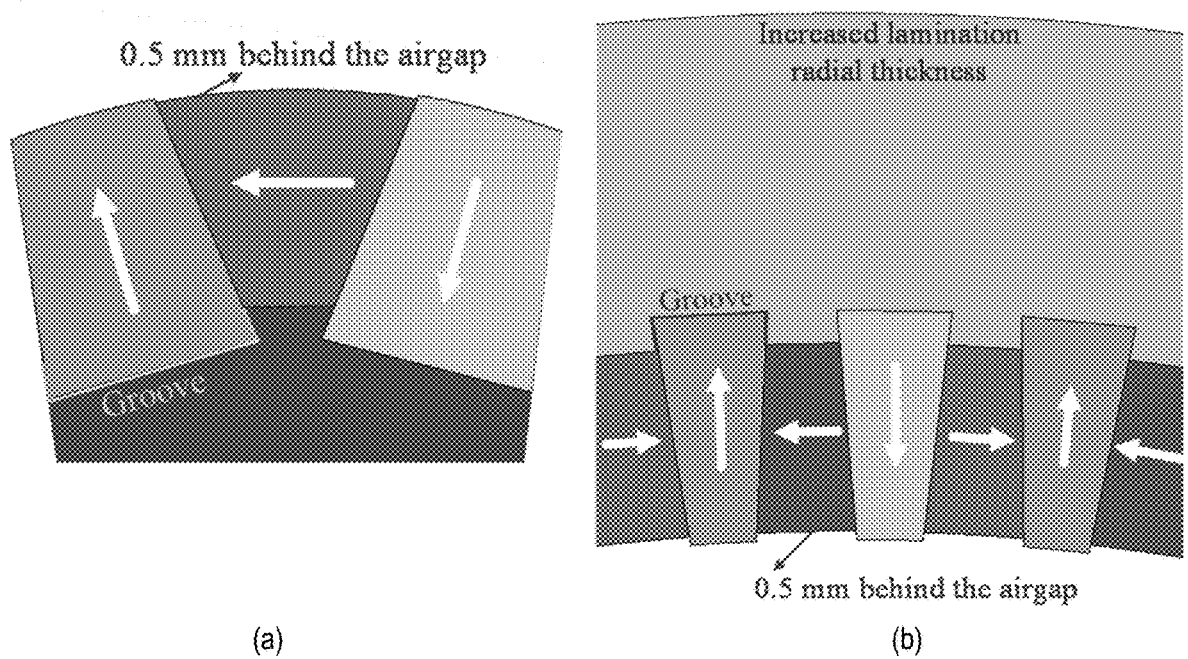

The final step is to reshape the magnets and finalize the back iron design to enhance rotor tolerance robustness, to ease the assembly and to minimize the glue usage. The inner and outer rotor magnets were reshaped according to what it was done in ECCE2019 paper. That helps with tolerance inaccuracies of the magnets by moving the azimuthal magnets outward. As the azimuthal magnets sit on adjacent radial magnets, the radially inward force on them will be applied on their adjacent magnets and helps to minimizing the glue usage. The inner rotor groove depth increased from 1 mm to 5 mm and the outer rotor groove depth from 1 mm to 2 mm. The inner rotor magnets are exposed to centrifugal force, so a deeper groove prevents the radial magnets from being flung. FIG. 64 shows final configuration changes on (a) inner rotor magnets and the back iron and (b) outer rotor magnets and the back iron.

While the outer rotor back iron is not needed from magnetic point of view and it even reduces the magnetic performance, it eases the magnet assembly process. After increasing the outer rotor back outer radius to 160 mm for mechanical purpose, the axial thickness is decreased to 30 mm to improve the performance slightly while it still benefits the assembly process.

Figure 65:
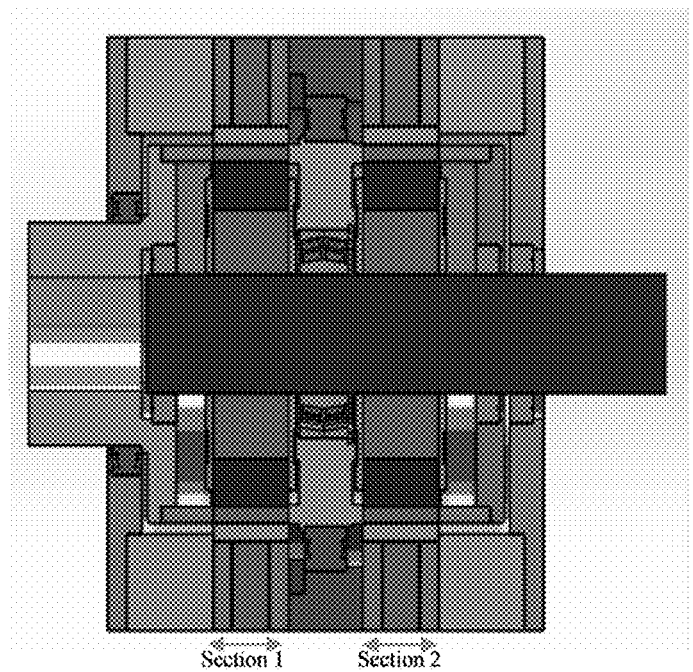
Figure 66:
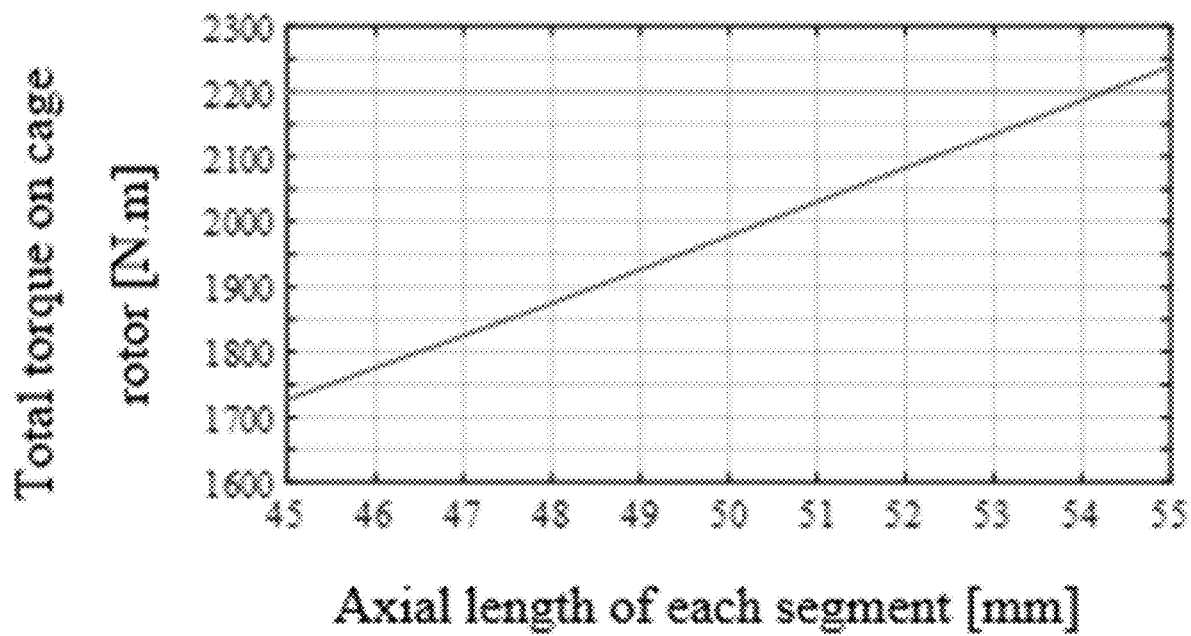

Considering the changes shown in FIG. 64 and the mechanical design shown in FIG. 65 which requires the separation distance to be 50 mm, using the simulation result shown in FIG. 66 (which shows total cage rotor torque versus axial length of each segment), the final axial length can be defined.

Figure 67:
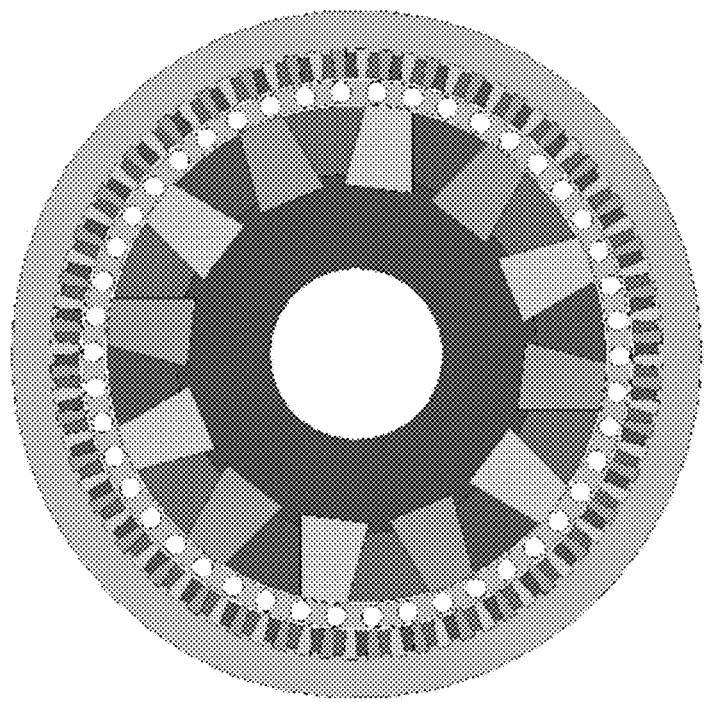

Based on FIG. 66, the final design is a two section magnetic gear with 55 mm axial length for each section. FIG. 67 shows the final Halbach magnet rotor typology.

I claim:

1. A magnetic gear comprising:
an inner rotor formed of a first group of opposing pairs of radially-magnetic magnets and a second group of opposing pairs of tangentially-magnetic magnets arranged sequentially around an outer circumference of an inner support structure;
an outer rotor axially aligned with the inner rotor and formed of a third group of opposing pairs of radially-magnetic magnets and a fourth group of opposing pairs of tangentially-magnetic magnets arranged sequentially around an inner circumference of an outer support structure; and
a cage rotor axially aligned with the inner rotor and the outer rotor and positioned between the inner rotor and the outer rotor, wherein the cage rotor comprises a cage structure forming a plurality of circular gaps, the cage rotor comprising a plurality of bridge segments circumferentially spaced from one another via respective circular gaps of the plurality of circular gaps, the plurality of bridge segments having inner opening angles and outer opening angles between one another, the outer opening angles being greater than the inner opening angles,
wherein the magnets in the first group of magnets and third group of magnets have a longer radial length than the magnets in the second group of magnets and fourth group of magnets, respectively, wherein the magnets in the first group of magnets extend from an outer circumference of the inner rotor and are inserted into respective grooves in the inner support structure, and wherein the magnets in the second group of magnets extend from the outer circumference of the inner rotor to the outer circumference of the inner support structure,
wherein the cage rotor further comprises a plurality of cylindrical electrically non-conductive rods, each cylindrical electrically non-conductive rod of the plurality of cylindrical electrically non-conductive rods positioned in a respective circular gap of the plurality of gaps of the cage structure, and
wherein the tangentially-magnetic magnets in the second and fourth groups increase in width along a respective radial length in a direction extending away from the respective inner and outer support structures.

2. The magnetic gear of claim 1, wherein the outer circumference of the inner support structure includes a plurality of grooves and wherein each magnet of the first group of radially-magnetic magnets is inserted into a respective one of the plurality of grooves and each magnet of the second group of opposing pairs of tangentially-magnetic magnets is positioned between a respective pair of grooves of the plurality of grooves.

3. The magnetic gear of claim 1, wherein the inner circumference of the outer support structure includes a plurality of grooves and wherein each magnet of the third group of radially-magnetic magnets is inserted into a respective one of the plurality of grooves and each magnet of the fourth group of opposing pairs of tangentially-magnetic magnets is positioned between a respective pair of grooves of the plurality of grooves.

4. The magnetic gear of claim 1, wherein the tangentially-magnetic magnets in the second and fourth groups have a greater width along an outer circumference of the inner and outer rotors, respectively, than the radially-magnetic magnets of the first and third groups.

5. The magnetic gear of claim 1, wherein the radially-magnetic magnets in the first and third groups decrease in width along a respective radial length in the direction extending away from the respective inner and outer support structures.

6. The magnetic gear of claim 1, wherein each bridge section of the plurality of bridge sections is spaced from each other bridge section of the plurality of bridge sections along both an inner circumference and an outer circumference of the cage rotor.

7. The magnetic gear of claim 1, wherein the plurality of bridge sections are coupled to one another along only an inner circumference or an outer circumference of the cage rotor.

8. The magnetic gear of claim 1, wherein the plurality of bridge sections are coupled along both an inner circumference and an outer circumference of the cage rotor.

9. The magnetic gear of claim 1, wherein the plurality of bridge sections of the cage structure have inwardly-curving sides that form the plurality of circular gaps.

10. A device comprising a two-section magnetic gear, the two section magnetic gear comprising:
a first inner rotor and a second inner rotor, each of the first and second inner rotor respectively formed of a first group of opposing pairs of radially-magnetic inner magnets and a second group of opposing pairs of tangentially-magnetic inner magnets arranged sequentially around an outer circumference of an inner support structure, the radially-magnetic inner magnets being inserted into grooves in the outer circumference of the inner support structure;
a first outer rotor and a second outer rotor, each of the first and second outer rotor respectively axially aligned with the corresponding first or second inner rotor and formed of a third group of opposing pairs of radially-magnetic outer magnets and a fourth group of opposing pairs of tangentially-magnetic outer magnets arranged sequentially around an inner circumference of an outer support structure, the radially-magnetic outer magnets being inserted into grooves in the inner circumference of the outer support structure; and
a first cage axially aligned with the first inner rotor and the first outer rotor and positioned between the first inner rotor and the first outer rotor, a second cage axially aligned with the second inner rotor and the second outer rotor and positioned between the second inner rotor and the second outer rotor, the first and second cage each respectively including a plurality of bridge segments and a plurality of circular slots, each circular slot of the plurality of circular slots comprising a respective electrically non-conductive, non-magnetic, cylindrical rod positioned therein, a respective outer opening angle between adjacent bridge segments of the plurality of bridge segments being greater than a respective inner opening angle between adjacent bridge segments of the plurality of bridge segments,
wherein the tangentially-magnetic magnets in the respective second and fourth groups of the first and second inner and outer rotors increase in width along a respective radial length in a direction extending away from the respective inner and outer support structures, and
wherein the first cage and the second cage are spaced from one another.

11. The device of claim 10, wherein the device comprises a marine hydrokinetic generator.

12. The device of claim 10, wherein the first cage comprises a plurality of individual bridge sections, wherein each bridge section of the plurality of individual bridge sections is spaced from each other bridge section of the plurality of individual bridge sections along both an inner circumference and an outer circumference of the first cage.

13. The device of claim 10, wherein the first cage comprises a plurality of bridge sections that are coupled to one another along only an inner circumference or an outer circumference of the first cage.

14. The device of claim 10, wherein the first cage comprises a plurality of bridge sections that are coupled along both an inner circumference and an outer circumference of the first cage.

15. A method of assembling a magnetic gear, the method comprising:
forming an inner rotor by:
inserting, in an alternating order, opposing pairs of radially-magnetic inner magnets into grooves of an inner support structure of the magnetic gear, the grooves being spaced apart along an outer circumference of the inner support structure; and
inserting, in an alternating order, opposing pairs of tangentially-magnetic inner magnets respectively between adjacent opposing pairs of the radially-magnetic inner magnets to contact the outer circumference of the inner support structure, the tangentially-magnetic inner magnets having a shorter length than the radially-magnetic inner magnets;
forming an outer rotor by:
inserting, in an alternating order, opposing pairs of radially-magnetic outer magnets into grooves of an outer support structure of the magnetic gear, the grooves being spaced apart along an inner circumference of the outer support structure; and
inserting, in an alternating order, opposing pairs of tangentially-magnetic outer magnets respectively between adjacent opposing pairs of the radially-magnetic outer magnets to contact the inner circumference of the outer support structure, the tangentially-magnetic outer magnets having a shorter length than the radially-magnetic outer magnets;
forming a cage rotor comprising a plurality of bridge sections by coupling the plurality of bridge sections to one another along an inner circumference of the cage rotor, a respective outer opening angle between adjacent bridge sections of the plurality of bridge sections being greater than a respective inner opening angle between adjacent bridge sections of the plurality of bridge sections;
inserting a plurality of cylindrical, non-electrically conductive rods into respective circular slots of the cage rotor formed between the bridge sections;
coaxially mounting the outer rotor to the cage rotor; and
coaxially mounting the outer rotor and the cage rotor to the inner rotor.

16. The method of claim 15, wherein the grooves are spaced apart by a width of the tangentially-magnetic inner magnets where the tangentially-magnetic inner magnets contact the outer circumference of the inner support structure.

17. The method of claim 15, wherein the grooves have respective depths that are less than the length of the radially-magnetic inner magnets.

18. The device of claim 11, further comprising an additional cage support section positioned at least partially within a distance between the first cage and the second cage.

* * * * *